US012618953B2

(12) United States Patent
Imaki et al.

(10) Patent No.: US 12,618,953 B2
(45) Date of Patent: May 5, 2026

(54) LIDAR CONTROL DEVICE, LIDAR CONTROL METHOD, AND LIDAR DEVICE

(71) Applicant: Mitsubishi Electric Corporation, Tokyo (JP)

(72) Inventors: Masaharu Imaki, Tokyo (JP); Takayuki Nakano, Tokyo (JP); Masahiro Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1049 days.

(21) Appl. No.: 17/727,422

(22) Filed: Apr. 22, 2022

(65) Prior Publication Data

US 2022/0244361 A1 Aug. 4, 2022

Related U.S. Application Data

(63) Continuation of application No. PCT/JP2019/043297, filed on Nov. 5, 2019.

(51) Int. Cl.
*G01S 7/497* (2006.01)
*G01S 7/486* (2020.01)
(Continued)

(52) U.S. Cl.
CPC ............ *G01S 7/497* (2013.01); *G01S 7/4865* (2013.01); *G01S 7/4868* (2013.01); *G01S 17/08* (2013.01)

(58) Field of Classification Search
CPC ........ G01S 7/08; G01S 7/4868; G01S 7/4865; G01S 7/497

(Continued)

(56) References Cited

U.S. PATENT DOCUMENTS 11,965,990 B2 * 4/2024 Eom ..................... G01S 7/4911
2003/0108353 A1 6/2003 Nasu et al.
(Continued)

FOREIGN PATENT DOCUMENTS

CN 110109084 A 8/2019
CN 110998365 * 4/2020 ............. G01S 17/88
(Continued)

OTHER PUBLICATIONS

German Office Action for German Application No. 11 2019 007 770.8, dated Oct. 31, 2023, with English translation.
(Continued)

*Primary Examiner* — Tarifur R Chowdhury
(74) *Attorney, Agent, or Firm* — Birch, Stewart, Kolasch & Birch, LLP

(57) ABSTRACT

A lidar control device controls a lidar device including a background light cut filter that allows transmission of reflected laser light that is laser emission light reflected by an object and suppresses transmission of background light incident on the lidar device, the lidar control device including: a filter temperature acquiring unit to acquire a filter temperature of the background light cut filter; a filter characteristic acquiring unit to acquire a filter temperature characteristic of the background light cut filter; a transmission wavelength acquiring unit to acquire a transmission wavelength of the background light cut filter on the basis of the filter temperature and the filter temperature characteristic; and a control signal generating unit to generate a control signal for causing the lidar device to emit the laser emission light having a wavelength corresponding to the transmission wavelength acquired by the transmission wavelength acquiring unit.

12 Claims, 25 Drawing Sheets

(51) Int. Cl.
G01S 7/4865 (2020.01)
G01S 17/08 (2006.01)

(58) Field of Classification Search
USPC ........................................................ 356/1.01
See application file for complete search history.

(56) References Cited

U.S. PATENT DOCUMENTS

| | | | |
|---|---|---|---|
| 2017/0276546 A1 | 9/2017 | Sakai et al. | |
| 2019/0078934 A1 | 3/2019 | Weber | |
| 2019/0257927 A1* | 8/2019 | Yao ........................ | G01S 7/4815 |
| 2022/0283275 A1 | 9/2022 | Beuth et al. | |

FOREIGN PATENT DOCUMENTS

| | | |
|---|---|---|
| DE | 10 2017 207 928 A1 | 11/2018 |
| DE | 10 2019 122 774 A1 | 3/2021 |

| | | | | | |
|---|---|---|---|---|---|
| EP | 1967865 | * | 9/2006 | ............ | G01S 7/497 |
| JP | 2001-168805 A | | 6/2001 | | |
| JP | 2003-188468 A | | 7/2003 | | |
| JP | 2008292370 | * | 12/2008 | ............ | G01S 17/89 |
| JP | 2017-183690 A | | 10/2017 | | |
| JP | 2018-44853 A | | 3/2018 | | |
| WO | WO2022244508 | * | 11/2022 | ............ | G01S 17/10 |
| WO | WO-2025009044 A1 | * | 1/2025 | | |

OTHER PUBLICATIONS

Chinese Office Action and Search Report for Chinese Application No. 201980101776.3, dated Oct. 21, 2024, with English translation of the Office Action.
International Search Report for PCT/JP2019/043297 mailed on Jan. 28, 2020.
Written Opinion of the International Searching Authority for PCT/JP2019/043297 (PCT/ISA/237) mailed on Jan. 28, 2020.

* cited by examiner

FIG. 5

```
        ┌───────────┐
        │   START   │
        └───────────┘
              │
              ▼
┌─────────────────────────────┐
│ Acquire Filter Temperature  │───ST501
│ Characteristic Information  │
└─────────────────────────────┘
              │
              ▼
┌─────────────────────────────┐
│ Acquire Filter Temperature  │───ST502
│         Information          │
└─────────────────────────────┘
              │
              ▼
┌─────────────────────────────┐
│   Acquire Transmission      │───ST503
│        Wavelength           │
└─────────────────────────────┘
              │
              ▼
┌─────────────────────────────┐
│ Generate Control Signal and │
│   Output Control Signal     │───ST504
│  That Has Been Generated    │
└─────────────────────────────┘
              │
              ▼
        ┌───────────┐
        │    END    │
        └───────────┘
```

FIG. 6

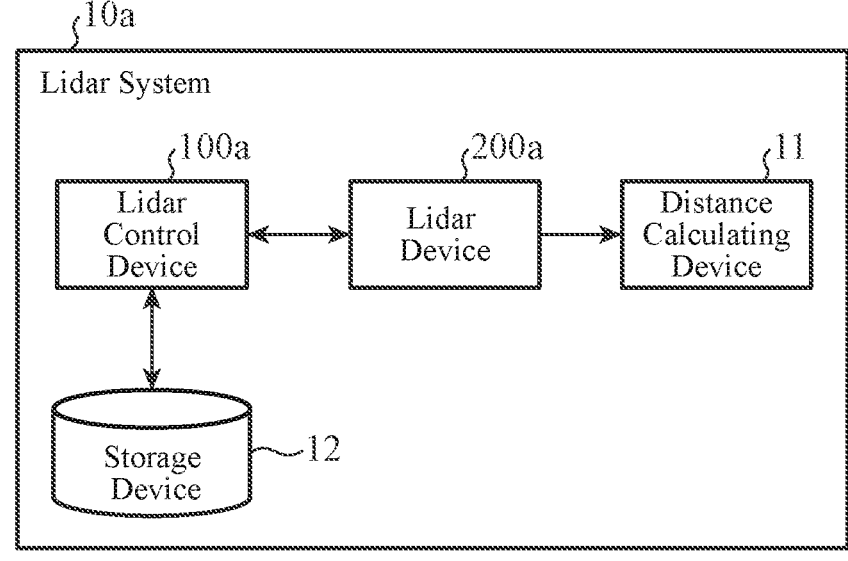

FIG. 9

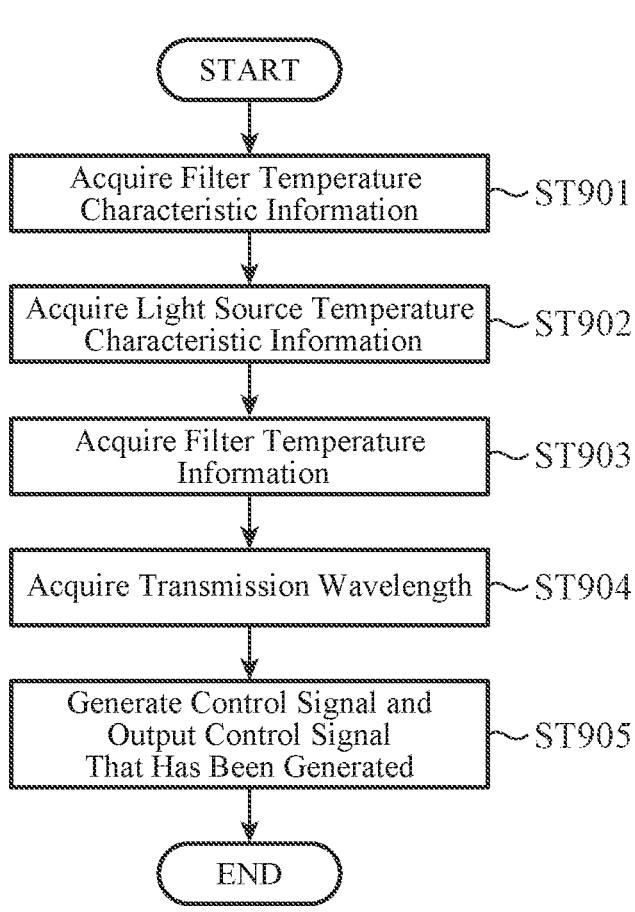

START

Acquire Filter Temperature
Characteristic Information  ~ST901

Acquire Light Source Temperature
Characteristic Information  ~ST902

Acquire Filter Temperature
Information  ~ST903

Acquire Transmission Wavelength  ~ST904

Generate Control Signal and
Output Control Signal
That Has Been Generated  ~ST905

END

FIG. 10

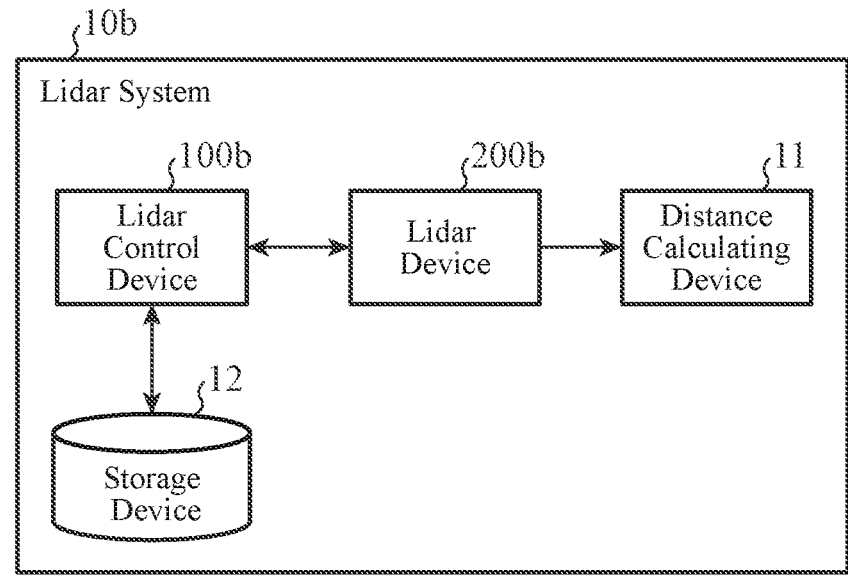

10b

Lidar System 100b     200b     11

Lidar
Control
Device

Lidar
Device

Distance
Calculating
Device

12

Storage
Device

FIG. 13

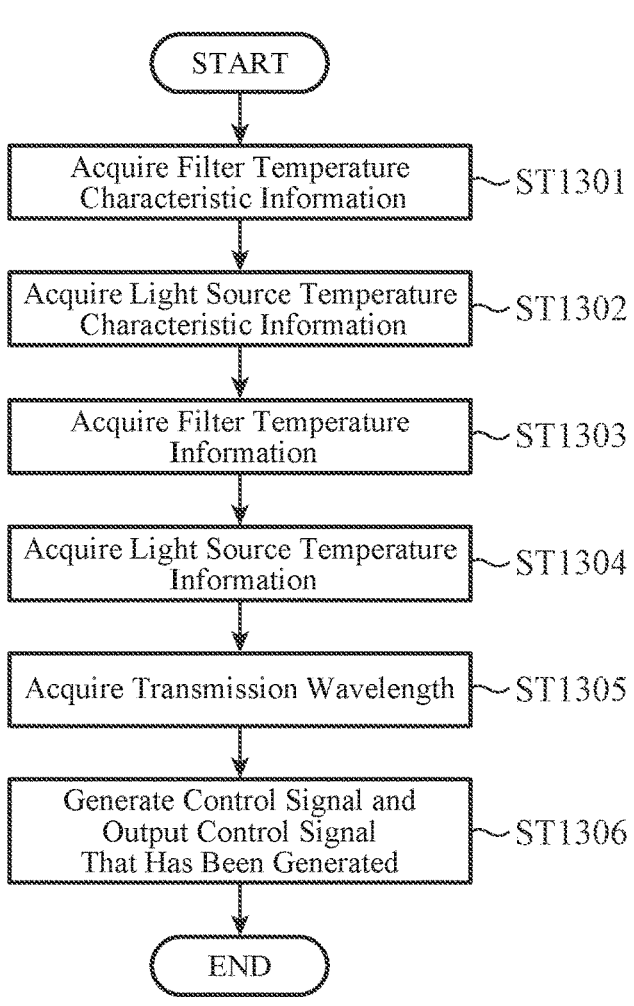

START

Acquire Filter Temperature Characteristic Information ~ST1301

Acquire Light Source Temperature Characteristic Information ~ST1302

Acquire Filter Temperature Information ~ST1303

Acquire Light Source Temperature Information ~ST1304

Acquire Transmission Wavelength ~ST1305

Generate Control Signal and Output Control Signal That Has Been Generated ~ST1306

END

FIG. 14

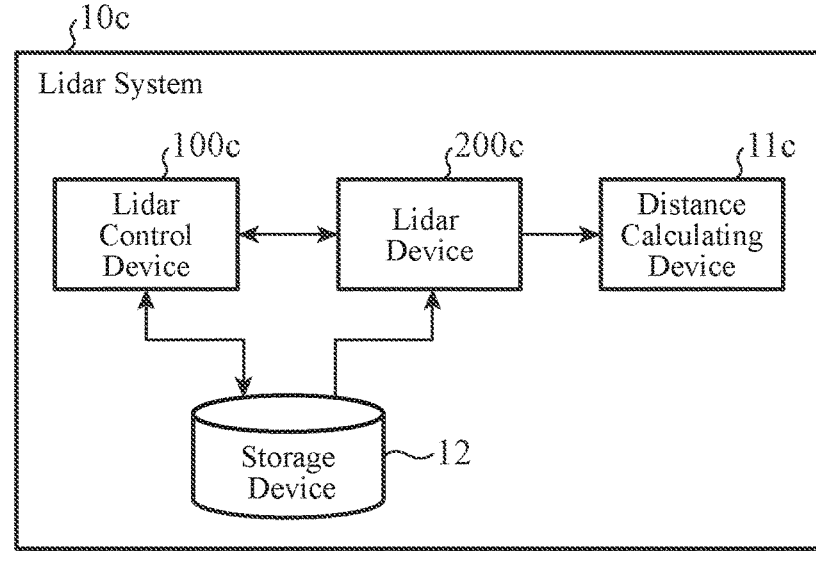

10c

Lidar System

100c

Lidar Control Device

200c

Lidar Device

11c

Distance Calculating Device

Storage Device — 12

FIG. 17

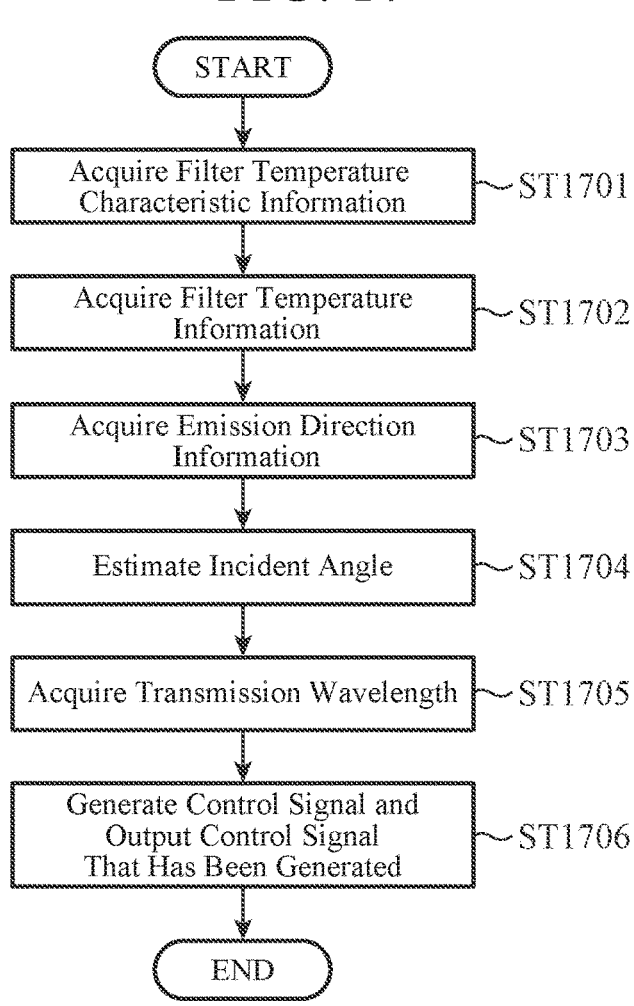

START

Acquire Filter Temperature
Characteristic Information ～ST1701

Acquire Filter Temperature
Information ～ST1702

Acquire Emission Direction
Information ～ST1703

Estimate Incident Angle ～ST1704

Acquire Transmission Wavelength ～ST1705

Generate Control Signal and
Output Control Signal
That Has Been Generated ～ST1706

END

FIG. 18

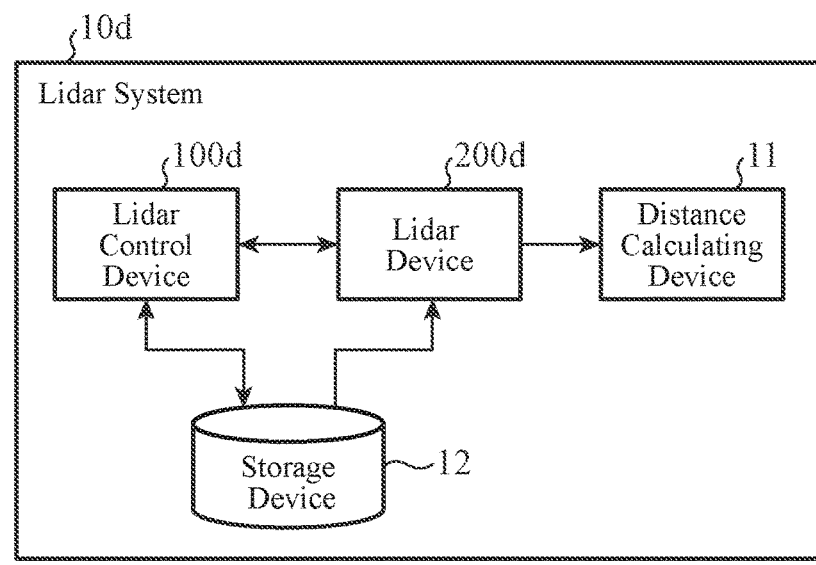

10d

Lidar System 100d 200d 11

Lidar
Control
Device

Lidar
Device

Distance
Calculating
Device

Storage
Device ～12

LIDAR CONTROL DEVICE, LIDAR CONTROL METHOD, AND LIDAR DEVICE

CROSS REFERENCE TO RELATED APPLICATIONS

This application is a Continuation of PCT International Application No. PCT/JP2019/043297, filed on Nov. 5, 2019, all of which is hereby expressly incorporated by reference into the present application.

TECHNICAL FIELD

The present invention relates to a lidar control device, a lidar control method, and a lidar device.

BACKGROUND ART

Lidar devices that measure a distance from a predetermined reference point to an object to be measured (hereinafter, simply referred to as "object") by a time of flight (ToF) method are known. In such lidar devices, in order to reduce background noise, there is a lidar device (see, for example, Patent Literature 1) that includes an optical filter (hereinafter referred to as "background light cut filter") that suppresses background light from reaching a light receiving unit that receives reflected laser light that is reflected light of laser light reflected by an object (hereinafter, simply referred to as "reflected laser light").

CITATION LIST

Patent Literatures

Patent Literature 1: JP 2018-44853 A

SUMMARY OF INVENTION

Technical Problem

A background light cut filter may include an optical filter having a temperature characteristic (hereinafter, referred to as "filter temperature characteristic"), such as an etalon. A filter temperature characteristic here refers to a characteristic that the wavelength of light transmitted through an optical filter (hereinafter, referred to as "transmission wavelength") changes when the temperature of the optical filter (hereinafter referred to as "filter temperature") changes.

In a case where the background light cut filter includes an optical filter having a filter temperature characteristic, when the filter temperature of the background light cut filter changes due to the influence of the environmental temperature or the like, the transmission wavelength of the background light cut filter changes. When the transmission wavelength of the background light cut filter changes, the transmission wavelength of the background light cut filter becomes different from the wavelength (hereinafter, referred to as "emission wavelength") of the laser light emitted by the lidar device. When the transmission wavelength of the background light cut filter is different from the emission wavelength, the background light cut filter suppresses transmission of reflected laser light incident on the background light cut filter.

In a case where the background light cut filter includes an optical filter having a filter temperature characteristic, the background light cut filter suppresses transmission of reflected laser light incident on the background light cut filter, and thus a light receiving unit of the lidar device cannot receive the reflected laser light of an intensity sufficient for performing distance measurement. In a case where the light receiving unit cannot receive reflected laser light of an intensity sufficient for performing distance measurement, the lidar device cannot perform distance measurement in high accuracy or cannot perform distance measurement itself.

The present invention is intended to solve the above problem, and an object of the present invention is to provide a lidar control device capable of controlling a lidar device so that a background light cut filter included in the lidar device does not suppress transmission of reflected laser light incident on the background light cut filter even when the background light cut filter has a filter temperature characteristic and the filter temperature of the background light cut filter changes.

Solution to Problem

A lidar control device of the present invention controls a lidar device, the lidar device including a background light cut filter that allows transmission of reflected laser light and suppresses transmission of background light out of the reflected laser light that is reflected light of laser emission light reflected by an object to be measured and the background light incident on the lidar device, the lidar control device comprising: a filter temperature acquirer to acquire filter temperature information indicating a filter temperature of the background light cut filter comprised in the lidar device; a filter characteristic acquirer to acquire filter temperature characteristic information indicating a filter temperature characteristic of the background light cut filter; a transmission wavelength acquirer to acquire a transmission wavelength of the background light cut filter on the basis of the filter temperature information acquired by the filter temperature acquirer and the filter temperature characteristic information acquired by the filter characteristic acquirer; and a control signal generator to generate a control signal for causing the lidar device to emit the laser emission light having a wavelength corresponding to the transmission wavelength acquired by the transmission wavelength acquirer.

Advantageous Effects of Invention

According to the present invention, it is possible to control a lidar device so that a background light cut filter included in the lidar device does not suppress transmission of reflected laser light incident on the background light cut filter even when the background light cut filter has a filter temperature characteristic and the filter temperature of the background light cut filter changes.

BRIEF DESCRIPTION OF DRAWINGS

FIG. 5 is a flowchart illustrating an example of processes of the lidar control device according to the first embodiment.

FIG. 6 is a block diagram illustrating an example of the configuration of the main part of a lidar system according to a second embodiment.

FIG. 9 is a flowchart illustrating an example of processes of the lidar control device according to the second embodiment.

FIG. 10 is a block diagram illustrating an example of the configuration of the main part of a lidar system according to a third embodiment.

FIG. 13 is a flowchart illustrating an example of processes of the lidar control device according to the third embodiment.

FIG. 14 is a block diagram illustrating an example of the configuration of the main part of a lidar system according to a fourth embodiment.

FIG. 17 is a flowchart illustrating an example of processes of the lidar control device according to the fourth embodiment.

FIG. 18 is a block diagram illustrating an example of the configuration of the main part of a lidar system according to a fifth embodiment.

DESCRIPTION OF EMBODIMENTS

Figure 1:
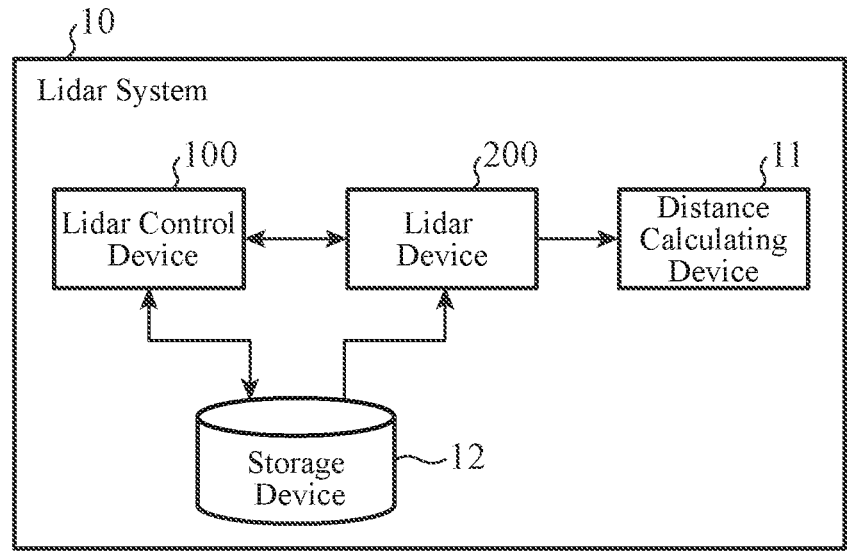
FIG. 1 is a block diagram illustrating an example of the configuration of the main part of a lidar system according to a first embodiment.

Hereinafter, embodiments of the present invention will be described in detail by referring to the drawings.

First Embodiment

A lidar system 10 to which a lidar control device 100 according to a first embodiment is applied will be described with reference to FIG. 1.

FIG. 1 is a block diagram illustrating an example of a configuration of the main part of the lidar system 10 to which the lidar control device 100 and a lidar device 200 according to the first embodiment are applied.

The lidar system 10 includes the lidar control device 100, the lidar device 200, a distance calculating device 11, and a storage device 12.

The lidar control device 100 controls the lidar device 200. Specifically, the lidar control device 100 generates a control signal for causing the lidar device 200 to emit laser light (hereinafter, referred to as "laser emission light") having a predetermined wavelength. The lidar control device 100 outputs the generated control signal to the lidar device 200.

The lidar device 200 emits the laser emission light toward an object to be measured (hereinafter, simply referred to as "object") and receives reflected light (hereinafter, referred to as "reflected laser light") which is the laser emission light reflected by the object. The lidar device 200 outputs, to the distance calculating device 11, an electric signal based on the reflected laser light and a trigger signal indicating a time point as a reference for the lidar device 200 to emit the laser emission light toward the object. In addition, the lidar device 200 acquires the control signal output from the lidar control device 100, adjusts the wavelength of the laser emission light on the basis of the control signal, and emits the laser emission light having the adjusted wavelength toward the object.

The distance calculating device 11 receives the trigger signal indicating a time point as a reference for the lidar device 200 to emit the laser emission light toward the object, the trigger signal being output from the lidar device 200, and an electric signal based on the reflected laser light output from the lidar device 200 and calculates a distance from a predetermined reference point to the object by, for example, a time of flight (ToF) method. Since the method in which the distance calculating device 11 calculates the distance from a predetermined reference point to an object by the ToF method or the like is known, description of the method is omitted.

The storage device 12 stores predetermined information necessary for the lidar control device 100 or the lidar device 200 to operate. Each of the lidar control device 100 and the lidar device 200 reads information necessary for operation from the storage device 12.

By referring to FIG. 2, the lidar device 200 of the first embodiment will be described.

Figure 2:
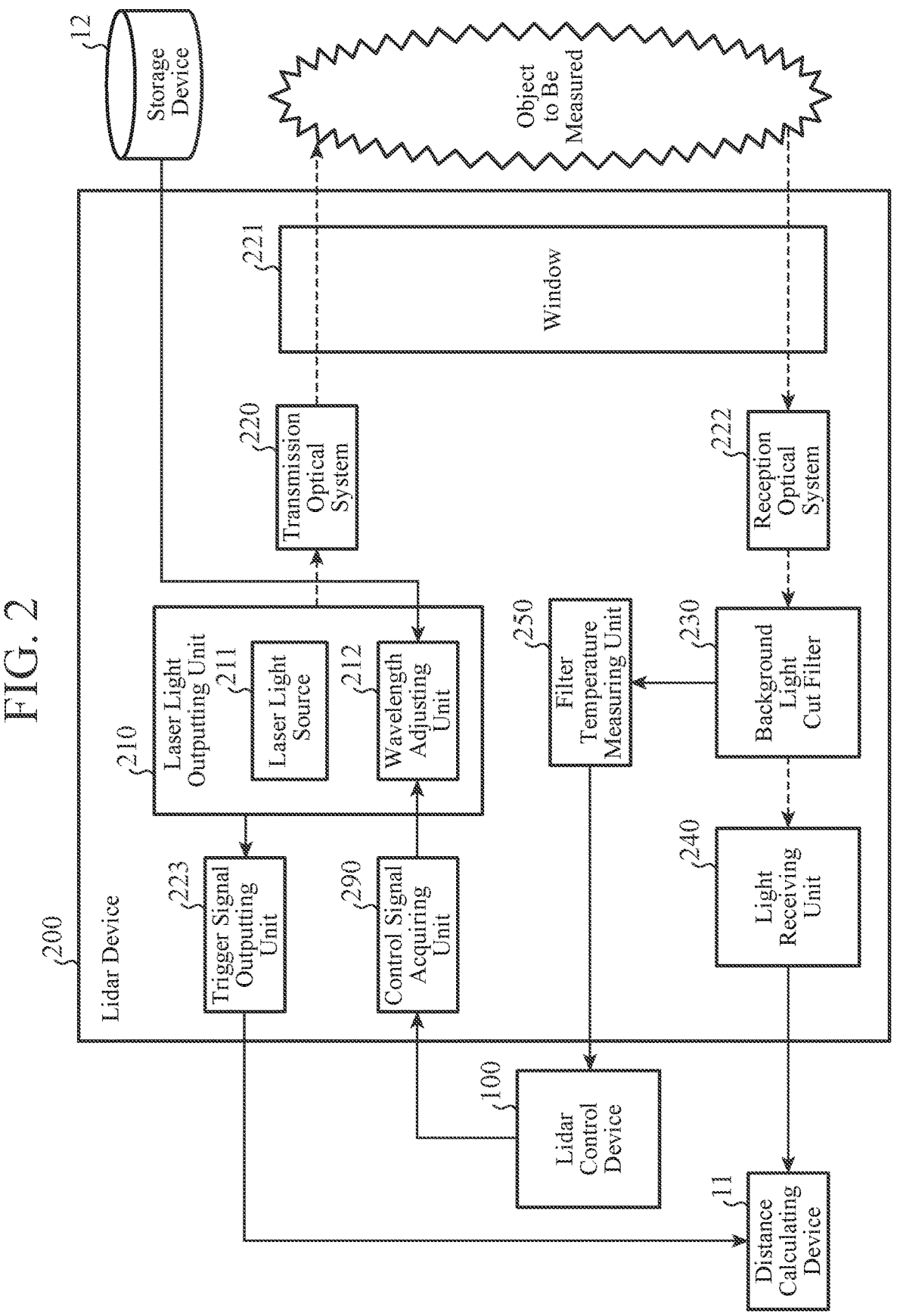
FIG. 2 is a block diagram illustrating an example of the configuration of the main part of a lidar device according to the first embodiment.

FIG. 2 is a block diagram illustrating an example of the configuration of the main part of the lidar device 200 according to the first embodiment.

The lidar device 200 includes a laser light outputting unit 210, a transmission optical system 220, a window 221, a reception optical system 222, a trigger signal outputting unit 223, a background light cut filter 230, a light receiving unit 240, a filter temperature measuring unit 250, and a control signal acquiring unit 290.

The control signal acquiring unit 290 acquires the control signal output from the lidar control device 100.

In the first embodiment, the control signal acquired by the control signal acquiring unit 290 indicates, for example, the wavelength of laser light.

The laser light outputting unit 210 outputs laser light (hereinafter, referred to as "laser output light"). The laser output light output by the laser light outputting unit 210 is transmitted through the transmission optical system 220 and the window 221 and emitted from the lidar device 200. That is, the wavelength of the laser output light corresponds to the wavelength (hereinafter, referred to as "emission wavelength") of the laser emission light of the lidar device 200. Since the wavelength of the laser output light corresponds to the emission wavelength, hereinafter, the wavelength of the laser output light is also referred to as the emission wavelength.

The laser light outputting unit 210 adjusts the wavelength of the laser output light on the basis of the control signal acquired by the control signal acquiring unit 290 and outputs the laser output light having the adjusted wavelength.

As illustrated in FIG. 2 as an example, the laser light outputting unit 210 includes, for example, a laser light source 211 and a wavelength adjusting unit 212.

The laser light source 211 outputs laser light (hereinafter, referred to as "laser light source light") having a predetermined wavelength. The laser light source 211 includes, for example, a light emitting element that converts an electric signal received from a power supply unit (not illustrated) into an optical signal.

The laser light outputting unit 210 outputs, as the laser output light, laser light based on the laser light source light output from the laser light source 211.

On the basis of the control signal acquired by the control signal acquiring unit 290, the wavelength adjusting unit 212 adjusts the emission wavelength so as to be the wavelength indicated by the control signal.

The laser light outputting unit 210 outputs, as the laser output light based on the laser light source light, laser output light obtained when the wavelength adjusting unit 212 adjusts the wavelength of the laser light source light (hereinafter, referred to as "light source wavelength") so as to be the wavelength indicated by the control signal.

Specifically, for example, the wavelength adjusting unit 212 includes: a diffraction grating (not illustrated) that receives laser light and oscillates laser light having a wavelength different from a light source wavelength; and an angle adjusting mechanism (not illustrated) that adjusts an incident angle of laser light source light when the diffraction grating receives the laser light source light.

The angle adjusting mechanism adjusts the incident angle of the laser light source light received by the diffraction grating so that the laser light outputting unit 210 outputs, by the angle adjusting mechanism, the laser output light having the wavelength indicated by the control signal on the basis of angle adjustment information indicating the relationship between the incident angle of the laser light source light on the diffraction grating and the wavelength of the laser light oscillated by the diffraction grating and the control signal acquired by the control signal acquiring unit 290. With the angle adjusting mechanism adjusting the incident angle of the laser light source light received by the diffraction grating, the laser light outputting unit 210 outputs the laser output light having the wavelength indicated by the control signal.

For example, the wavelength adjusting unit 212 acquires the angle adjustment information by reading the angle adjustment information from the storage device 12.

Since the method of adjusting the wavelength of the laser light oscillated by the diffraction grating by adjusting the incident angle of the laser light received by the diffraction grating is known, description of the method is omitted.

The wavelength adjusting unit 212 may include a temperature adjusting mechanism (not illustrated) having a temperature control device (not illustrated) for adjusting the temperature of the laser light source 211 (hereinafter, referred to as "light source temperature") such as a Peltier element or an electric heating wire. A light source that outputs laser light generally has a temperature characteristic (hereinafter referred to as "light source temperature characteristic"). The light source temperature characteristic mentioned here refers to a characteristic that the wavelength of laser light output from the light source changes in correspondence with the temperature of the light source.

The wavelength adjusting unit 212 adjusts the light source temperature so that the light source wavelength matches the wavelength indicated by the control signal on the basis of predetermined light source temperature characteristic information indicating the light source temperature characteristic and the control signal acquired by the control signal acquiring unit 290 by the temperature adjusting mechanism.

Since the method of adjusting the temperature of the light source using a temperature control device such as a Peltier element or an electric heating wire is known, description of the method is omitted.

The wavelength adjusting unit 212 acquires the light source temperature characteristic information by, for example, reading the light source temperature characteristic information from the storage device 12. The light source temperature characteristic information is provided from, for example, a manufacturer of the laser light source 211.

The light source temperature characteristic information acquired by the wavelength adjusting unit 212 is, for example, information in which the light source temperature and the light source wavelength are associated with each other.

Furthermore, for example, the light source temperature characteristic information may indicate a relational expression between the light source temperature and the light source wavelength which enables calculation of the light source wavelength by substituting the light source temperature which is a variable.

In the first embodiment, the light source temperature characteristic information indicates a relational expression between the light source temperature and the light source wavelength, and description will be given on the premise that the relational expression is the following Equation (1).

$$\lambda_L = a_L \times T_L + b_L \qquad \text{Equation (1)}$$

Here, $\lambda_L$ denotes the light source wavelength, $T_L$ denotes the light source temperature, and $a_L$ and $b_L$ are predetermined constants.

When Equation (1) is solved for $T_L$, Equation (1) is transformed into the following Equation (2).

$$T_L = \{\lambda_L - b_L\}/a_L \qquad \text{Equation (2)}$$

The wavelength adjusting unit 212 calculates $T_L$, which is a target value of the light source temperature to be adjusted, by substituting the wavelength indicated by the control signal acquired by the control signal acquiring unit 290 into $\lambda_L$ of Equation (2). The wavelength adjusting unit 212 adjusts the light source temperature using the temperature control device so that the light source temperature matches $T_L$ that has been calculated.

Furthermore, the wavelength adjusting unit 212 may include a current adjusting mechanism (not illustrated) that adjusts the magnitude of the current (hereinafter, referred to as a "light source current value") flowing through the laser light source 211. A light source that outputs laser light generally has a current characteristic (hereinafter, "light source current characteristic"). The light source current characteristic mentioned here refers to a characteristic that the wavelength of the laser light output from the light source changes in correspondence with the magnitude of the current flowing through the light source.

The wavelength adjusting unit 212 adjusts the light source current value flowing in the laser light source 211 so that the light source wavelength matches the wavelength indicated by the control signal on the basis of predetermined light source current characteristic information indicating the light source current characteristic and the control signal acquired by the control signal acquiring unit 290 by the current adjusting mechanism.

The wavelength adjusting unit 212 acquires the light source current characteristic information by, for example, reading the light source current characteristic information from the storage device 12.

As examples of the method in which the wavelength adjusting unit 212 adjusts the emission wavelength to match the wavelength indicated by the control signal acquired by the control signal acquiring unit 290, the above three methods have been described. However, the method in which the wavelength adjusting unit 212 adjusts the emission wavelength to match the wavelength indicated by the control signal acquired by the control signal acquiring unit 290 is not limited to the above three methods.

Furthermore, the method in which the wavelength adjusting unit 212 adjusts the emission wavelength to match the wavelength indicated by the control signal acquired by the control signal acquiring unit 290 may be, for example, a method obtained by combining two or more methods different from each other from among the above three methods.

The transmission optical system 220 includes one or more combinations of optical members such as a lens and a mirror. The transmission optical system 220 guides the laser output light toward the object to be measured via the window 221.

The window 221 suppresses foreign matters from entering the inside of the lidar device 200 from the outside of the lidar device 200. The window 221 transmits the laser output light guided by the transmission optical system 220 and emits the laser output light as the laser emission light in the direction of the object to be measured. The laser emission light emitted from the window 221 is reflected by the object, and reflected laser light that is reflected by the object enters the window 221 as reflected laser light. The window 221 transmits the reflected laser light that is incident thereon.

The reception optical system 222 includes one or more combinations of optical members such as a lens and a mirror. The reception optical system 222 guides the reflected laser light transmitted through the window 221 to the light receiving unit 240 via the background light cut filter 230.

The background light cut filter 230 is an optical filter that allows transmission of the reflected laser light and suppresses transmission of the background light out of the reflected laser light guided by the reception optical system 222 and the background light incident on the lidar device 200 via the window 221 and the reception optical system 222.

The light receiving unit 240 receives the reflected laser light transmitted through the background light cut filter 230 and outputs an electric signal based on the reflected laser light that has been received. The light receiving unit 240 includes, for example, a light receiving element that converts a received optical signal into an electric signal. Specifically, the light receiving unit 240 converts the received optical signal into an electric signal and thereby outputs the electric signal based on the received reflected laser light to the distance calculating device 11.

The trigger signal outputting unit 223 outputs, to the distance calculating device 11, a trigger signal indicating a reference time point when the lidar device 200 emits laser emission light toward an object, such as a time point when the laser light source 211 outputs the laser light source light, a time point when the laser light outputting unit 210 outputs the laser output light, or a time point when the lidar device 200 emits the laser emission light.

The filter temperature measuring unit 250 measures the temperature of the background light cut filter 230 (hereinafter referred to as "filter temperature"). The filter temperature measuring unit 250 outputs the measured filter temperature to the lidar control device 100 as filter temperature information indicating the filter temperature.

By referring to FIG. 3, the lidar control device 100 of the first embodiment will be described.

Figure 3:
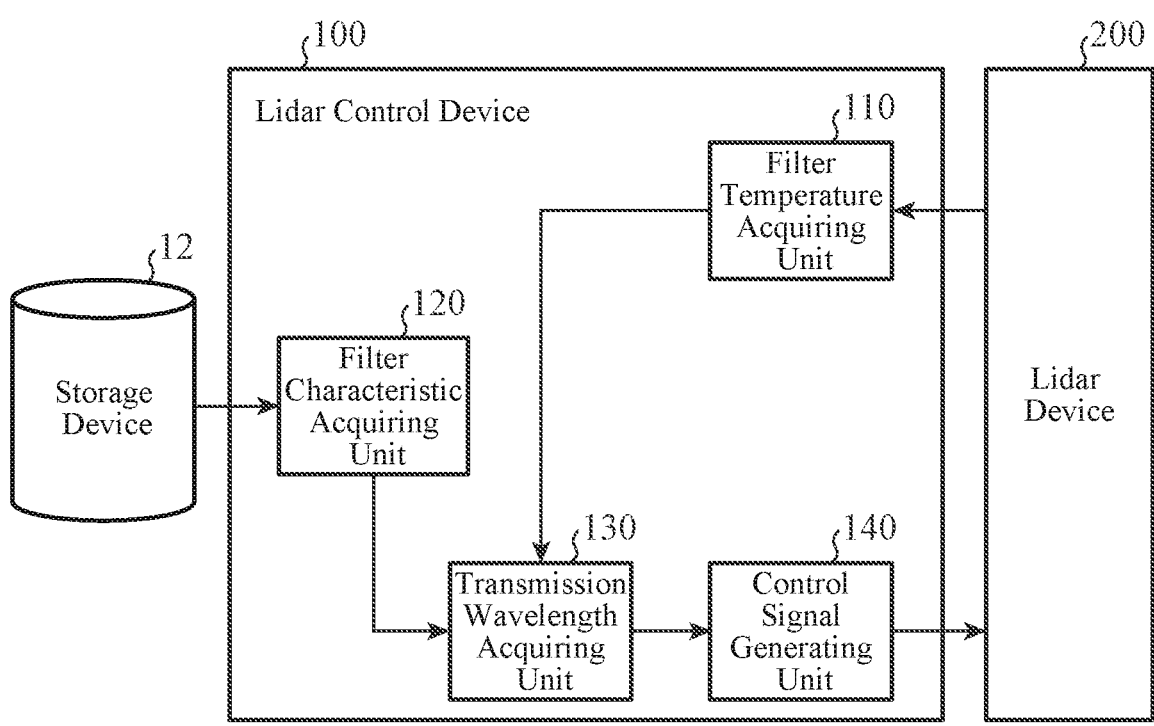
FIG. 3 is a block diagram illustrating an example of the configuration of the main part of a lidar control device according to the first embodiment.

FIG. 3 is a block diagram illustrating an example of the configuration of the main part of the lidar control device 100 according to the first embodiment.

The lidar control device 100 includes a filter temperature acquiring unit 110, a filter characteristic acquiring unit 120, a transmission wavelength acquiring unit 130, and a control signal generating unit 140.

The filter temperature acquiring unit 110 acquires the filter temperature information indicating the filter temperature of the background light cut filter 230 included in the lidar device 200. Specifically, the filter temperature acquiring unit 110 acquires the filter temperature information from the filter temperature measuring unit 250 included in the lidar device 200.

The filter characteristic acquiring unit 120 acquires filter temperature characteristic information indicating a filter temperature characteristic of the background light cut filter 230. Here, the filter temperature characteristic refers to a characteristic that the wavelength of the reflected laser light transmitted by the background light cut filter 230 (hereinafter, referred to as "transmission wavelength") changes in correspondence with the temperature of the background light cut filter 230.

The filter characteristic acquiring unit 120 acquires the filter temperature characteristic information by, for example, reading the filter temperature characteristic information from the storage device 12. The filter temperature characteristic information acquired by the filter characteristic acquiring unit 120 is provided from, for example, the manufacturer of the background light cut filter 230.

The filter temperature characteristic information acquired by the filter characteristic acquiring unit 120 is, for example, information in which the filter temperature and the transmission wavelength are associated with each other.

Furthermore, for example, the filter temperature characteristic information may indicate a relational expression between the filter temperature and the transmission wavelength which enables calculation of the transmission wavelength by substituting the filter temperature which is a variable.

In the first embodiment, the filter temperature characteristic information indicates a relational expression between the filter temperature and the transmission wavelength, and description will be given on the premise that the relational expression is the following Equation (3).

$$\lambda_F = a_F \times T_F + b_F \qquad \text{Equation (3)}$$

Here, $\lambda_F$ denotes the transmission wavelength, $T_F$ denotes the filter temperature, and $a_F$ and $b_F$ are predetermined constants.

The transmission wavelength acquiring unit 130 acquires the transmission wavelength of the background light cut filter 230 on the basis of the filter temperature information acquired by the filter temperature acquiring unit 110 and the filter temperature characteristic information acquired by the filter characteristic acquiring unit 120. Specifically, for example, the transmission wavelength acquiring unit 130 acquires the transmission wavelength of the background light cut filter 230 by substituting the filter temperature indicated by the filter temperature information acquired by the filter temperature acquiring unit 110 into Equation (3) indicated by the filter temperature characteristic information acquired by the filter characteristic acquiring unit 120 and calculating the transmission wavelength.

The control signal generating unit 140 generates the control signal for causing the lidar device 200 to emit laser emission light having a wavelength corresponding to the transmission wavelength acquired by the transmission wavelength acquiring unit 130. The control signal generating unit 140 outputs the control signal that has been generated to the lidar device 200.

The control signal acquiring unit 290 in the lidar device 200 acquires the control signal output from the control signal generating unit 140.

Note that, as described above, in the first embodiment, the control signal generated by the control signal generating unit 140 indicates, for example, the wavelength of laser light.

Figure 4A:
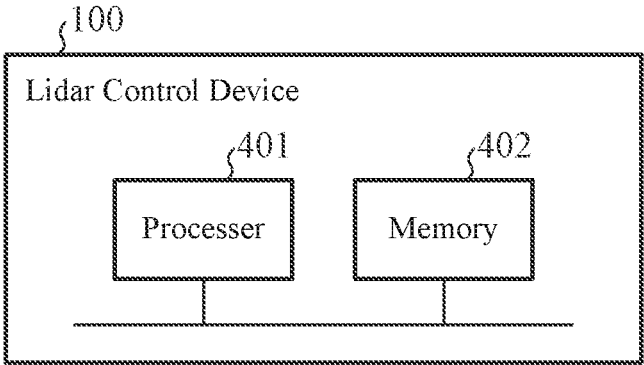
FIGS. 4A and 4B are diagrams each illustrating an example of the hardware configuration of the lidar control device according to the first embodiment.
Figure 4B:
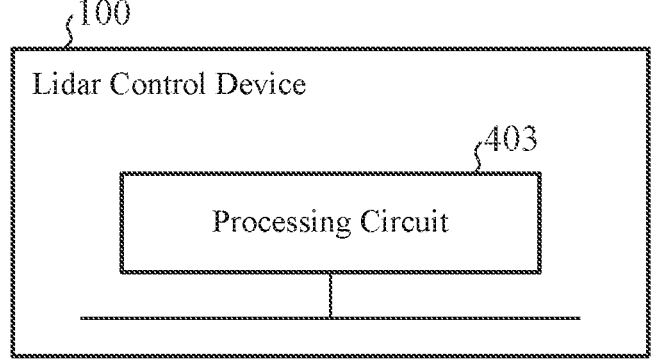

FIGS. 4A and 4B are diagrams each illustrating an example of the hardware configuration of the lidar control device 100 according to the first embodiment.

By referring to the drawings, the hardware configuration of the main part of the lidar control device 100 according to the first embodiment will be described.

As illustrated in FIG. 4A, the lidar control device 100 includes a computer, and the computer includes a processor 401 and a memory 402. The memory 402 stores a program for causing the computer to function as the filter temperature acquiring unit 110, the filter characteristic acquiring unit 120, the transmission wavelength acquiring unit 130, and the control signal generating unit 140. With the processor 401 reading out and executing the program stored in the memory 402, the functions of the filter temperature acquiring unit 110, the filter characteristic acquiring unit 120, the transmission wavelength acquiring unit 130, and the control signal generating unit 140 are implemented.

Alternatively, as illustrated in FIG. 4B, the lidar control device 100 may include a processing circuit 403. In this case, the functions of the filter temperature acquiring unit 110, the filter characteristic acquiring unit 120, the transmission wavelength acquiring unit 130, and the control signal generating unit 140 may be implemented by the processing circuit 403.

Further alternatively, the lidar control device 100 may include the processor 401, the memory 402, and the processing circuit 403 (not illustrated). In this case, some of the functions of the filter temperature acquiring unit 110, the filter characteristic acquiring unit 120, the transmission wavelength acquiring unit 130, and the control signal generating unit 140 may be implemented by the processor 401 and the memory 402, and the remaining functions may be implemented by the processing circuit 403.

As the processor 401, for example, a central processing unit (CPU), a graphics processing unit (GPU), a microprocessor, a micro controller, or a digital signal processor (DSP) is used.

As the memory 402, for example, a semiconductor memory or a magnetic disk is used. More specifically, as the memory 402, for example, a random access memory (RAM), a read only memory (ROM), a flash memory, an erasable programmable read only memory (EPROM), an electrically erasable programmable read-only memory (EE-PROM), a solid state drive (SSD), or a hard disk drive (HDD) is used.

The processing circuit 403 includes, for example, an application specific integrated circuit (ASIC), a programmable logic device (PLD), a field-programmable gate array (FPGA), a system-on-a-chip (SoC), or a system large-scale integration (LSI).

The operation of the lidar control device 100 according to the first embodiment will be described with reference to FIG. 5.

FIG. 5 is a flowchart illustrating an example of processes of the lidar control device 100 according to the first embodiment. The lidar control device 100 repeatedly executes, for example, processes of the flowchart.

First, in step ST501, the filter characteristic acquiring unit 120 acquires the filter temperature characteristic information.

Next, in step ST502, the filter temperature acquiring unit 110 acquires the filter temperature information.

Then, in step ST503, the transmission wavelength acquiring unit 130 acquires the transmission wavelength.

Next, in step ST504, the control signal generating unit 140 generates the control signal and outputs the control signal that has been generated.

After step ST504, the lidar control device 100 ends the processes of the flowchart. After finishing the processes of the flowchart, the lidar control device 100 returns to step ST501 and repeatedly executes the processes of the flowchart.

Note that the lidar control device 100 may omit the process of step ST501 when the lidar control device 100 repeatedly executes the processes of the flowchart for a second time and thereafter.

In addition, the processes of steps ST501 and ST502 may be in any order.

As described above, the lidar control device 100 according to the first embodiment controls the lidar device 200 including the background light cut filter 230 that allows transmission of reflected laser light and suppresses transmission of background light out of the reflected laser light that is reflected light of laser emission light reflected by an object to be measured and the background light incident on the lidar device 200, the lidar control device 100 including: the filter temperature acquiring unit 110 to acquire filter temperature information indicating the filter temperature of the background light cut filter 230 included in the lidar device 200; the filter characteristic acquiring unit 120 to acquire filter temperature characteristic information indicating the filter temperature characteristic of the background light cut filter 230; the transmission wavelength acquiring unit 130 to acquire the transmission wavelength of the background light cut filter 230 on the basis of the filter temperature information acquired by the filter temperature acquiring unit 110 and the filter temperature characteristic information acquired by the filter characteristic acquiring unit 120; and the control signal generating unit 140 to generate a control signal for causing the lidar device 200 to emit the laser emission light having a wavelength corresponding to the transmission wavelength acquired by the transmission wavelength acquiring unit 130.

With such a configuration, the lidar control device 100 can control the lidar device 200 so that the background light cut filter 230 included in the lidar device 200 does not suppress transmission of the reflected laser light incident on the background light cut filter 230 even when the background light cut filter 230 has a filter temperature characteristic and the filter temperature of the background light cut filter 230 changes.

Furthermore, as described above, the lidar device 200 according to the first embodiment includes: the background light cut filter 230; the laser light outputting unit 210 to output the laser output light based on the laser light source light output from the laser light source 211; and the light receiving unit 240 to receive the reflected laser light transmitted through the background light cut filter 230 and to output an electric signal based on the reflected laser light that has been received. The lidar device 200 further includes: the filter temperature measuring unit 250 to measure the filter temperature of the background light cut filter 230 and to output the filter temperature that has been measured to the lidar control device 100 as the filter temperature information indicating the filter temperature; and the wavelength adjusting unit 212 to receive the control signal generated and output by the lidar control device 100 on the basis of the filter temperature information output by the filter temperature measuring unit 250 and to adjust the wavelength of the laser emission light emitted on the basis of the control signal.

With such a configuration, the lidar device 200 can prevent the background light cut filter 230 included in the lidar device 200 from suppressing transmission of the reflected laser light incident on the background light cut filter 230 even when the background light cut filter 230 has a filter temperature characteristic and the filter temperature of the background light cut filter 230 changes.

Second Embodiment

A lidar control device 100a, a lidar device 200a, and a lidar system 10a according to a second embodiment will be described with reference to FIGS. 6 to 8.

FIG. 6 is a block diagram illustrating an example of a configuration of the main part of the lidar system 10a to which the lidar control device 100a and a lidar device 200a according to the second embodiment are applied.

The lidar system 10a is obtained by replacing the lidar control device 100 and the lidar device 200 in the lidar system 10 according to the first embodiment with the lidar control device 100a and the lidar device 200a.

That is, the lidar system 10a includes the lidar control device 100a, the lidar device 200a, the distance calculating device 11, and the storage device 12.

The lidar system 10a and the lidar system 10 according to the first embodiment are different in that, in the lidar system 10, the control signal output from the lidar control device 100 to the lidar device 200 indicates the wavelength of the laser light, whereas in the lidar system 10a, a control signal output from the lidar control device 100a to the lidar device 200a indicates a target value of the light source temperature.

Note that in FIG. 6 the same symbol is given to a block similar to that illustrated in FIG. 1, and description thereof is omitted.

The lidar control device 100a controls the lidar device 200a. Specifically, in the lidar control device 100a, the lidar control device 100a generates a control signal for causing the lidar device 200a to emit laser light (hereinafter, referred to as "laser emission light") having a predetermined wavelength. The control signal that has been generated is output to the lidar device 200a.

The lidar device 200a emits the laser emission light toward an object and receives reflected light (hereinafter, referred to as "reflected laser light") which is the laser emission light reflected by the object. The lidar device 200a outputs, to the distance calculating device 11, an electric signal based on the reflected laser light and a trigger signal indicating a time point as a reference for the lidar device 200a to emit the laser emission light toward the object. In addition, the lidar device 200a acquires the control signal output from the lidar control device 100a, adjusts the wavelength of the laser emission light emitted on the basis of the control signal (hereinafter referred to as "emission wavelength"), and emits the laser emission light having the adjusted wavelength toward the object.

The distance calculating device 11 receives the trigger signal indicating a time point as a reference for the lidar device 200a to emit the laser emission light toward the object, the trigger signal being output from the lidar device 200a, and an electric signal based on the reflected laser light output from the lidar device 200a and calculates a distance from a predetermined reference point to the object by, for example, the ToF method.

The storage device 12 stores predetermined information necessary for the lidar control device 100a to operate. The lidar control device 100a reads information necessary for operation from the storage device 12.

Figure 7:
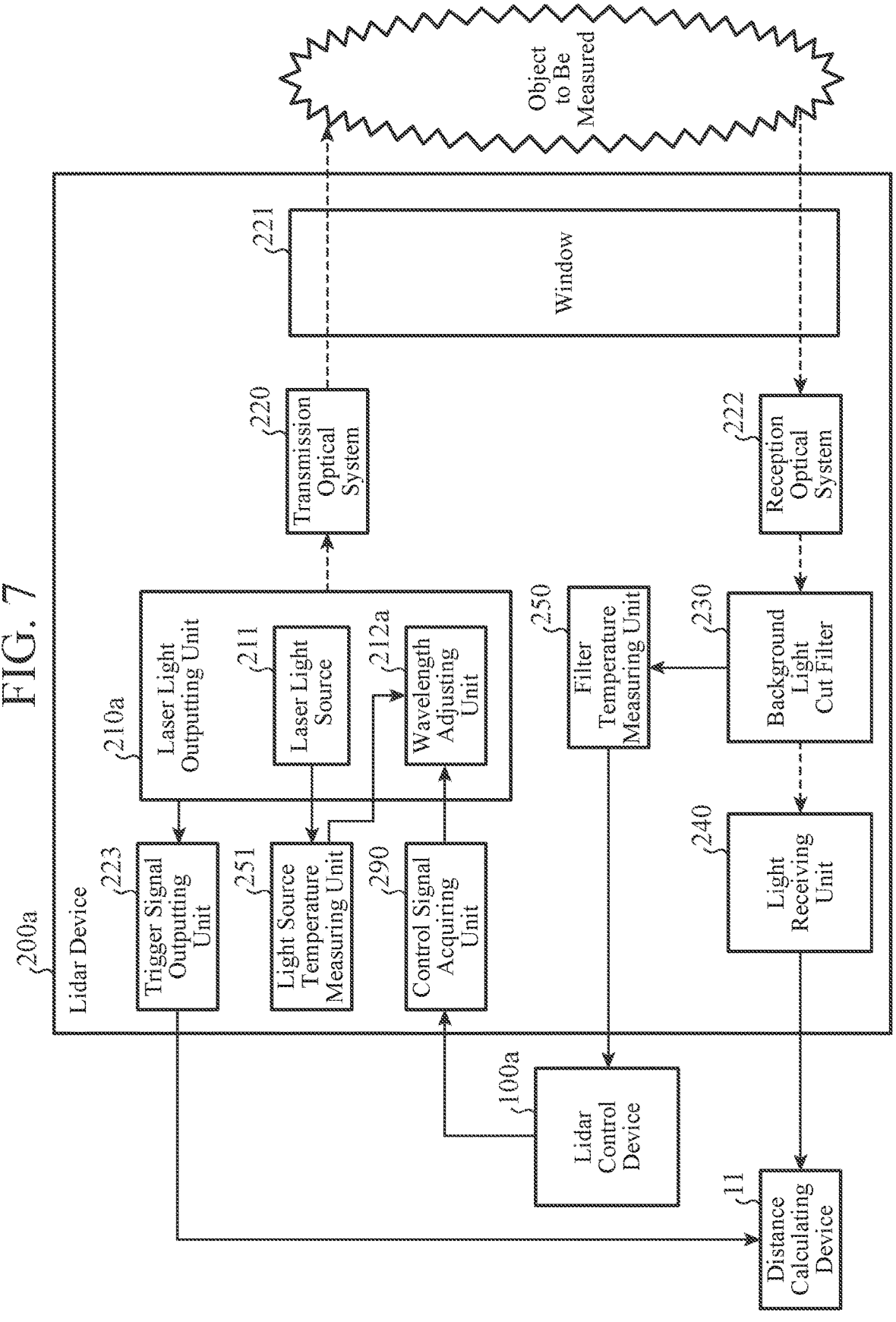
FIG. 7 is a block diagram illustrating an example of the configuration of the main part of a lidar device according to the second embodiment.

FIG. 7 is a block diagram illustrating an example of the configuration of the main part of the lidar device 200a according to the second embodiment.

The lidar device 200a is obtained by replacing the laser light outputting unit 210 in the lidar device 200 according to the first embodiment with a laser light outputting unit 210a and further adding a light source temperature measuring unit 251.

That is, the lidar device 200a includes the laser light outputting unit 210a, the transmission optical system 220, the window 221, the reception optical system 222, the trigger signal outputting unit 223, the background light cut filter 230, the light receiving unit 240, the filter temperature measuring unit 250, the light source temperature measuring unit 251, and the control signal acquiring unit 290.

Note that in FIG. 7 the same symbol is given to a block similar to that illustrated in FIG. 2, and description thereof is omitted.

The laser light outputting unit 210a outputs laser light (hereinafter, referred to as "laser output light"). The laser output light output by the laser light outputting unit 210a is transmitted through the transmission optical system 220 and the window 221 and emitted from the lidar device 200a. That is, the wavelength of the laser output light corresponds to the emission wavelength of the laser emission light of the lidar device 200a. Since the wavelength of the laser output light corresponds to the emission wavelength, hereinafter, the wavelength of the laser output light is also referred to as the emission wavelength.

The laser light outputting unit 210a adjusts the wavelength of the laser output light on the basis of the control signal acquired by the control signal acquiring unit 290 and outputs the laser output light having the adjusted wavelength.

As illustrated in FIG. 7 as an example, the laser light outputting unit 210a includes the laser light source 211 and a wavelength adjusting unit 212a.

The laser light outputting unit 210a outputs, as the laser output light, laser light based on laser light source light output from the laser light source 211.

The light source temperature measuring unit 251 measures the light source temperature of the laser light source 211. The light source temperature measuring unit 251 outputs the light source temperature that has been measured as light source temperature information. Specifically, for example, the light source temperature measuring unit 251 outputs the light source temperature information to the laser light outputting unit 210a. More specifically, for example, the light source temperature measuring unit 251 outputs the light source temperature information to the wavelength adjusting unit 212a in the laser light outputting unit 210a.

On the basis of the control signal acquired by the control signal acquiring unit 290 and the light source temperature information output by the light source temperature measuring unit 251, the wavelength adjusting unit 212a adjusts the wavelength of the laser output light output by the laser light outputting unit 210a, that is, the emission wavelength of the laser emission light emitted by the lidar device 200a.

Specifically, for example, while referring to the light source temperature indicated by the light source temperature information output by the light source temperature measuring unit 251, the wavelength adjusting unit 212a adjusts the light source temperature to match the target value of the light source temperature indicated by the control signal acquired by the control signal acquiring unit 290.

More specifically, for example, the wavelength adjusting unit 212a adjusts the light source temperature indicated by the light source temperature information output by the light source temperature measuring unit 251 to match the target value of the light source temperature indicated by the control signal acquired by the control signal acquiring unit 290 using a temperature control device (not illustrated) such as a Peltier element or an electric heating wire.

With the wavelength adjusting unit 212a adjusting the light source temperature, the wavelength of the laser light source light output from the laser light source 211 having a light source temperature characteristic changes. With the wavelength adjusting unit 212a adjusting the light source temperature to match the target value of the light source temperature indicated by the control signal acquired by the control signal acquiring unit 290, the laser light source 211 outputs the laser light source light having the light source wavelength corresponding to the target value of the light source temperature, and thus the laser light outputting unit 210a can output the laser light having the light source wavelength corresponding to the target value of the light source temperature as the laser output light.

Figure 8:
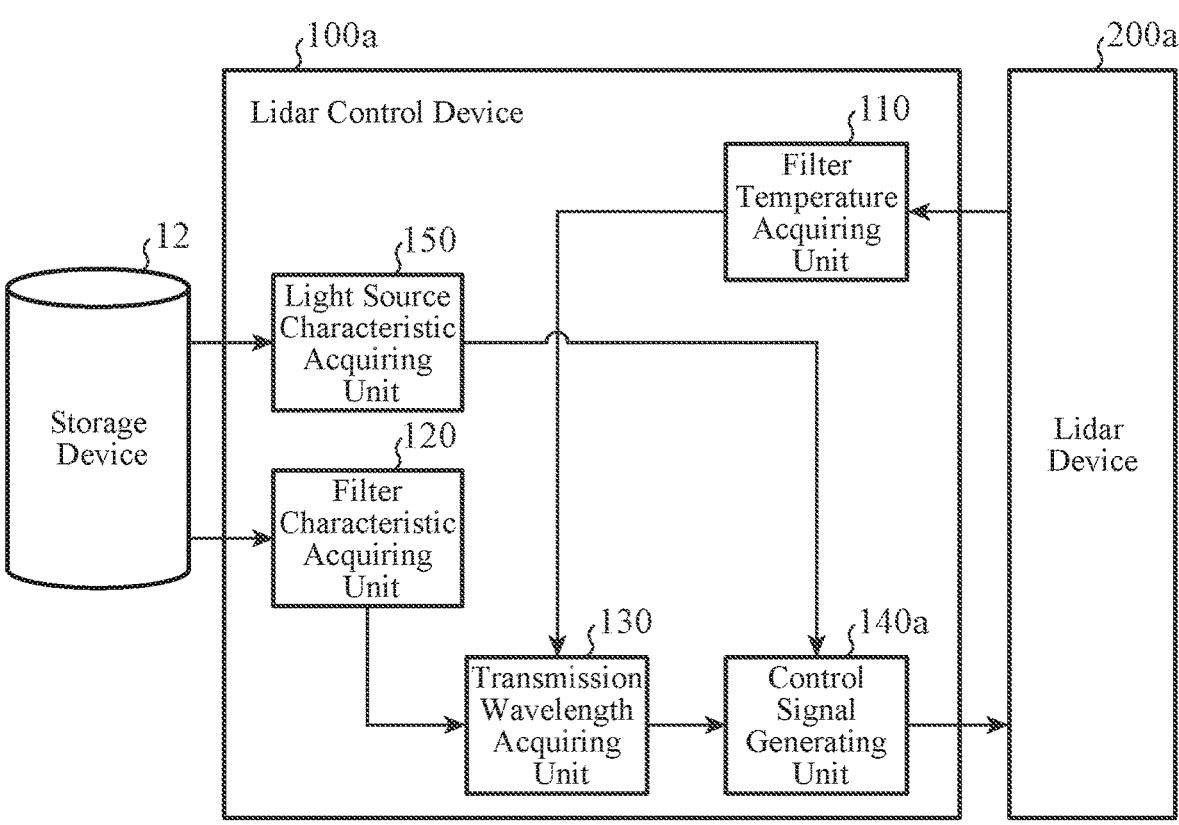
FIG. 8 is a block diagram illustrating an example of the configuration of the main part of a lidar control device according to the second embodiment.

FIG. 8 is a block diagram illustrating an example of the configuration of the main part of the lidar control device 100a according to the second embodiment.

The lidar control device 100a is obtained by replacing the control signal generating unit 140 in the lidar control device 100 according to the first embodiment with a control signal generating unit 140a and further adding a light source characteristic acquiring unit 150.

That is, the lidar control device 100a includes the filter temperature acquiring unit 110, the filter characteristic acquiring unit 120, the transmission wavelength acquiring unit 130, the light source characteristic acquiring unit 150, and the control signal generating unit 140a.

Note that in FIG. 8 the same symbol is given to a block similar to that illustrated in FIG. 3, and description thereof is omitted.

The light source characteristic acquiring unit 150 acquires light source temperature characteristic information indicating a light source temperature characteristic of the laser light source 211. The light source characteristic acquiring unit 150 acquires the light source temperature characteristic information by reading the light source temperature characteristic information from the storage device 12.

Since the light source temperature characteristic information has been described in the first embodiment, the description thereof will be omitted.

In the second embodiment, the light source temperature characteristic information indicates a relational expression between the light source temperature and the light source wavelength, and description will be given on the premise that the relational expression is Equation (1) or Equation (2).

On the basis of the light source temperature characteristic information acquired by the light source characteristic acquiring unit 150 and the transmission wavelength acquired by the transmission wavelength acquiring unit 130, the control signal generating unit 140a generates a control signal for causing the lidar device 200a to emit laser emission light having a wavelength corresponding to the transmission wavelength acquired by the transmission wavelength acquiring unit 130.

More specifically, for example, the control signal generating unit 140a calculates the target value of the light source temperature by substituting the transmission wavelength acquired by the transmission wavelength acquiring unit 130 into $\lambda_L$ of Equation (1) or Equation (2), which are relational expressions between the light source temperature and the light source wavelength indicated by the light source temperature characteristic information. The control signal generating unit 140a generates a control signal indicating the calculated target value of the light source temperature. The control signal generating unit 140a outputs the control signal that has been generated to the lidar device 200a.

The control signal acquiring unit 290 in the lidar device 200a acquires the control signal output from the control signal generating unit 140a.

Note that the functions of the filter temperature acquiring unit 110, the filter characteristic acquiring unit 120, the transmission wavelength acquiring unit 130, the light source characteristic acquiring unit 150, and the control signal generating unit 140a in the lidar control device 100a according to the second embodiment may be implemented by the processor 401 and the memory 402 or may be implemented by the processing circuit 403 in the hardware configurations exemplified in FIGS. 4A and 4B in the first embodiment.

The operation of the lidar control device 100*a* according to the second embodiment will be described with reference to FIG. 9.

FIG. 9 is a flowchart illustrating an example of processes of the lidar control device 100*a* according to the second embodiment. The lidar control device 100*a* repeatedly executes, for example, processes of the flowchart.

First, in step ST901, the filter characteristic acquiring unit 120 acquires the filter temperature characteristic information.

Next, in step ST902, the light source characteristic acquiring unit 150 acquires the light source temperature characteristic information.

Then, in step ST903, the filter temperature acquiring unit 110 acquires the filter temperature information.

Next, in step ST904, the transmission wavelength acquiring unit 130 acquires the transmission wavelength.

Next, in step ST905, the control signal generating unit 140*a* generates the control signal and outputs the control signal that has been generated.

After step ST905, the lidar control device 100*a* ends the processes of the flowchart. After finishing the processes of the flowchart, the lidar control device 100*a* returns to step ST901 and repeatedly executes the processes of the flowchart.

Note that the lidar control device 100*a* may omit the processes of steps ST901 and ST902 when the lidar control device 100*a* repeatedly executes the processes of the flowchart for a second time and thereafter.

In addition, the processes of steps ST901 to ST903 may be in any order.

As described above, the lidar control device 100*a* according to the second embodiment controls the lidar device 200*a* including the background light cut filter 230 that allows transmission of reflected laser light and suppresses transmission of background light out of the reflected laser light that is reflected light of laser emission light reflected by an object to be measured and the background light incident on the lidar device 200*a*, the lidar control device 100*a* including: the filter temperature acquiring unit 110 to acquire filter temperature information indicating the filter temperature of the background light cut filter 230 included in the lidar device 200*a*; the filter characteristic acquiring unit 120 to acquire filter temperature characteristic information indicating the filter temperature characteristic of the background light cut filter 230; the transmission wavelength acquiring unit 130 to acquire the transmission wavelength of the background light cut filter 230 on the basis of the filter temperature information acquired by the filter temperature acquiring unit 110 and the filter temperature characteristic information acquired by the filter characteristic acquiring unit 120; and the control signal generating unit 140*a* to generate a control signal for causing the lidar device 200*a* to emit the laser emission light having a wavelength corresponding to the transmission wavelength acquired by the transmission wavelength acquiring unit 130.

In particular, in addition to the above configuration, the lidar control device 100*a* according to the second embodiment includes the light source characteristic acquiring unit 150 to acquire the light source temperature characteristic information indicating the temperature characteristic of the laser light source 211 of the laser light outputting unit 210*a* included in the lidar device 200*a*, in which the control signal generating unit 140*a* generates the control signal for causing the lidar device 200*a* to emit the laser emission light having the wavelength corresponding to the transmission wavelength acquired by the transmission wavelength acquiring unit 130 on the basis of the light source temperature characteristic information acquired by the light source characteristic acquiring unit 150 and the transmission wavelength acquired by the transmission wavelength acquiring unit 130.

With such a configuration, the lidar control device 100*a* can control the lidar device 200*a* so that the background light cut filter 230 included in the lidar device 200*a* does not suppress transmission of the reflected laser light incident on the background light cut filter 230 even when the background light cut filter 230 has a filter temperature characteristic and the filter temperature of the background light cut filter 230 changes.

Furthermore, as described above, the lidar device 200*a* according to the second embodiment includes: the background light cut filter 230; the laser light outputting unit 210*a* to output the laser output light based on the laser light source light output from the laser light source 211; and the light receiving unit 240 to receive the reflected laser light transmitted through the background light cut filter 230 and to output an electric signal based on the reflected laser light that has been received. The lidar device 200*a* further includes: the filter temperature measuring unit 250 to measure the filter temperature of the background light cut filter 230 and to output the filter temperature that has been measured to the lidar control device 100*a* as the filter temperature information indicating the filter temperature; and the wavelength adjusting unit 212*a* to receive the control signal generated and output by the lidar control device 100*a* on the basis of the filter temperature information output by the filter temperature measuring unit 250 and to adjust the wavelength of the laser emission light emitted on the basis of the control signal.

In particular, the lidar device 200*a* according to the second embodiment includes, in addition to the above configuration, the light source temperature measuring unit 251 that measures the light source temperature of the laser light source 211 of the laser light outputting unit 210*a* and outputs the light source temperature that has been measured as the light source temperature information, and the wavelength adjusting unit 212*a* receives the control signal generated and output by the lidar control device 100*a* on the basis of the filter temperature information output by the filter temperature measuring unit 250 and adjusts the wavelength of the laser emission light to be emitted on the basis of the control signal and the light source temperature information output by the light source temperature measuring unit 251.

With such a configuration, the lidar device 200*a* can prevent the background light cut filter 230 included in the lidar device 200*a* from suppressing transmission of the reflected laser light incident on the background light cut filter 230 even when the background light cut filter 230 has a filter temperature characteristic and the filter temperature of the background light cut filter 230 changes.

Third Embodiment

A lidar control device 100*b*, a lidar device 200*b*, and a lidar system 10*b* according to a third embodiment will be described with reference to FIGS. 10 to 12.

FIG. 10 is a block diagram illustrating an example of a configuration of the main part of the lidar system 10*b* to which the lidar control device 100*b* and the lidar device 200*b* according to the third embodiment are applied.

The lidar system 10b is obtained by replacing the lidar control device 100a and the lidar device 200a in the lidar system 10a according to the second embodiment with the lidar control device 100b and the lidar device 200b.

That is, the lidar system 10b includes the lidar control device 100b, the lidar device 200b, the distance calculating device 11, and the storage device 12.

The lidar system 10b and the lidar system 10a according to the second embodiment are different in that, in the lidar system 10a, the control signal output from the lidar control device 100a to the lidar device 200a indicates the target value of the light source temperature, whereas in the lidar system 10b, the control signal output from the lidar control device 100b to the lidar device 200b is for controlling the temperature control device.

Note that in FIG. 10 the same symbol is given to a block similar to that illustrated in FIG. 6, and description thereof is omitted.

The lidar control device 100b controls the lidar device 200b. Specifically, the lidar control device 100b generates a control signal for causing the lidar device 200b to emit laser light (hereinafter, referred to as "laser emission light") having a predetermined wavelength. The lidar control device 100b outputs the control signal that has been generated to the lidar device 200b.

The lidar device 200b emits the laser emission light toward an object and receives reflected light (hereinafter, referred to as "reflected laser light") which is the laser emission light reflected by the object. The lidar device 200b outputs, to the distance calculating device 11, an electric signal based on the reflected laser light and a trigger signal indicating a time point as a reference for the lidar device 200b to emit the laser emission light toward the object. In addition, the lidar device 200b acquires the control signal output from the lidar control device 100b, adjusts the wavelength of the laser emission light emitted on the basis of the control signal (hereinafter referred to as "emission wavelength"), and emits the laser emission light having the adjusted wavelength toward the object.

The distance calculating device 11 receives the trigger signal indicating a time point as a reference for the lidar device 200b to emit the laser emission light toward the object, the trigger signal being output from the lidar device 200b, and an electric signal based on the reflected laser light output from the lidar device 200b and calculates a distance from a predetermined reference point to the object by, for example, the ToF method.

The storage device 12 stores predetermined information necessary for the lidar control device 100b to operate. The lidar control device 100b reads information necessary for operation from the storage device 12.

Figure 11:
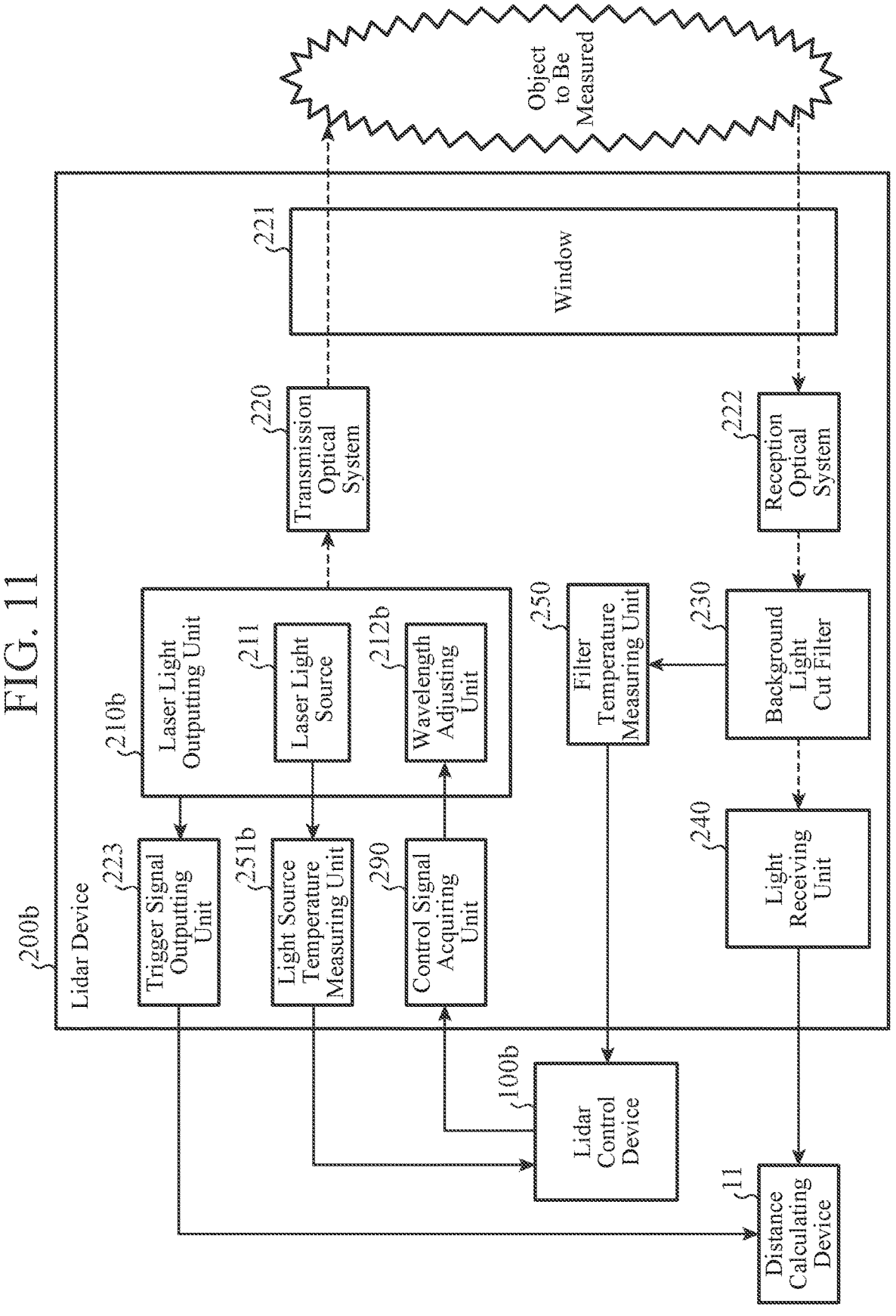
FIG. 11 is a block diagram illustrating an example of the configuration of the main part of a lidar device according to the third embodiment.

FIG. 11 is a block diagram illustrating an example of the configuration of the main part of the lidar device 200b according to the third embodiment.

The lidar device 200b is obtained by replacing the laser light outputting unit 210a and the light source temperature measuring unit 251 in the lidar device 200a according to the second embodiment with a laser light outputting unit 210b and a light source temperature measuring unit 251b.

That is, the lidar device 200b includes the laser light outputting unit 210b, the transmission optical system 220, the window 221, the reception optical system 222, the trigger signal outputting unit 223, the background light cut filter 230, the light receiving unit 240, the filter temperature measuring unit 250, the light source temperature measuring unit 251b, and the control signal acquiring unit 290.

Note that in FIG. 11 the same symbol is given to a block similar to that illustrated in FIG. 7, and description thereof is omitted.

The laser light outputting unit 210b outputs laser light (hereinafter, referred to as "laser output light"). The laser output light output by the laser light outputting unit 210b is transmitted through the transmission optical system 220 and the window 221 and emitted from the lidar device 200b. That is, the wavelength of the laser output light corresponds to the emission wavelength of the laser emission light of the lidar device 200b. Since the wavelength of the laser output light corresponds to the emission wavelength, hereinafter, the wavelength of the laser output light is also referred to as the emission wavelength.

The laser light outputting unit 210b adjusts the wavelength of the laser output light on the basis of the control signal acquired by the control signal acquiring unit 290 and outputs the laser output light having the adjusted wavelength.

As illustrated in FIG. 11 as an example, the laser light outputting unit 210b includes the laser light source 211 and a wavelength adjusting unit 212b.

The laser light outputting unit 210b outputs, as the laser output light, laser light based on laser light source light output from the laser light source 211.

The wavelength adjusting unit 212b controls the temperature control device such as a Peltier element or an electric heating wire on the basis of the control signal acquired by the control signal acquiring unit 290. With the wavelength adjusting unit 212b controlling the temperature control device, the wavelength adjusting unit 212b changes the light source temperature of the laser light source 211 having a light source temperature characteristic. The laser light outputting unit 210b can output laser output light having a predetermined emission wavelength with the wavelength adjusting unit 212b adjusting the light source temperature so that the light source temperature matches a predetermined temperature on the basis of the control signal acquired by the control signal acquiring unit 290.

The light source temperature measuring unit 251b measures the light source temperature of the laser light source 211. The light source temperature measuring unit 251b outputs the light source temperature that has been measured as light source temperature information. Specifically, the light source temperature measuring unit 251b outputs the light source temperature information to the lidar control device 100b.

Figure 12:
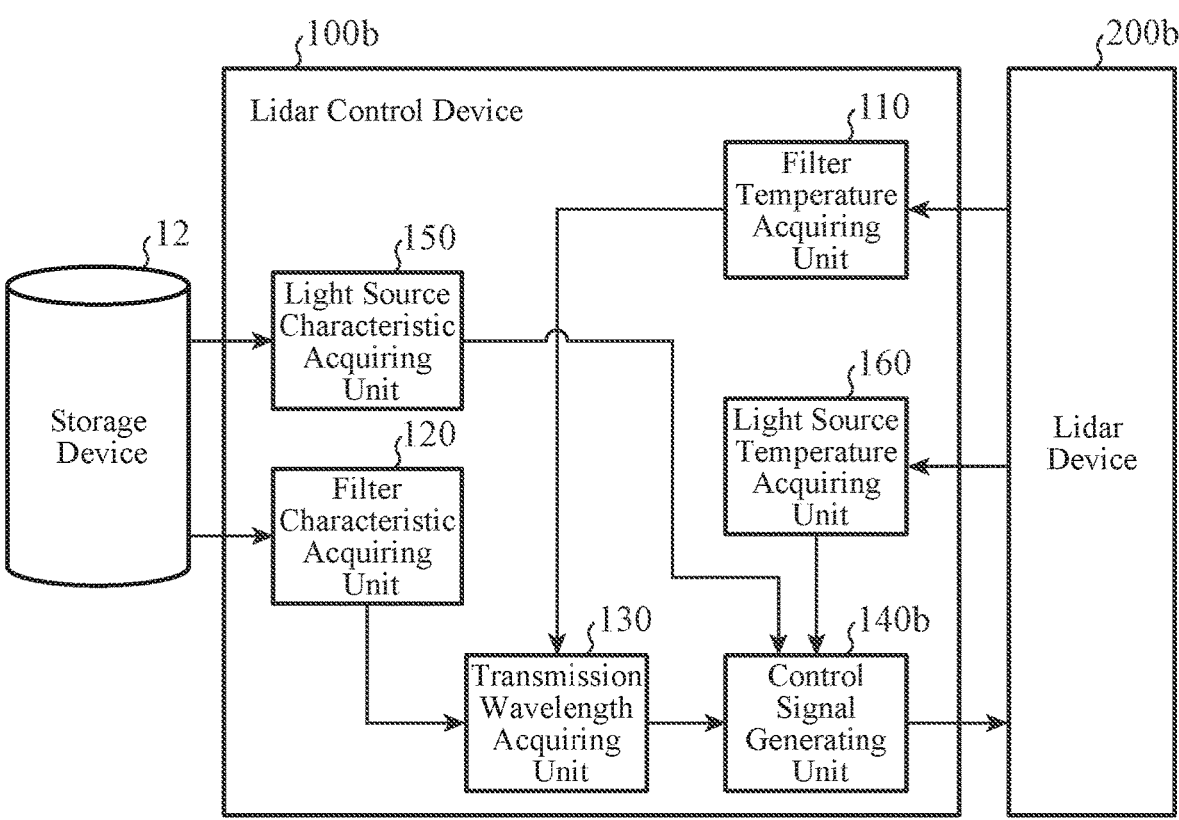
FIG. 12 is a block diagram illustrating an example of the configuration of the main part of a lidar control device according to the third embodiment.

FIG. 12 is a block diagram illustrating an example of the configuration of the main part of the lidar control device 100b according to the third embodiment.

The lidar control device 100b is obtained by replacing the control signal generating unit 140a in the lidar control device 100a according to the second embodiment with a control signal generating unit 140b and further adding a light source temperature acquiring unit 160.

That is, the lidar control device 100b includes the filter temperature acquiring unit 110, the filter characteristic acquiring unit 120, the transmission wavelength acquiring unit 130, the light source characteristic acquiring unit 150, the light source temperature acquiring unit 160, and the control signal generating unit 140b.

Note that in FIG. 12 the same symbol is given to a block similar to that illustrated in FIG. 8, and description thereof is omitted.

The light source temperature acquiring unit 160 acquires light source temperature information indicating the light source temperature of the laser light source 211 in the laser light outputting unit 210*b* included in the lidar device 200*b*. Specifically, the light source temperature acquiring unit 160 acquires the light source temperature information from the light source temperature measuring unit 251*b* included in the lidar device 200*b*.

On the basis of the light source temperature information acquired by the light source temperature acquiring unit 160, the light source temperature characteristic information acquired by the light source characteristic acquiring unit 150, and the transmission wavelength acquired by the transmission wavelength acquiring unit 130, the control signal generating unit 140*b* generates the control signal for causing the lidar device 200*b* to emit laser emission light having a wavelength corresponding to the transmission wavelength acquired by the transmission wavelength acquiring unit 130.

More specifically, for example, the control signal generating unit 140*b* calculates the target value of the light source temperature by substituting the transmission wavelength acquired by the transmission wavelength acquiring unit 130 into $\lambda_L$ of Equation (1) or Equation (2), which are relational expressions between the light source temperature and the light source wavelength indicated by the light source temperature characteristic information. Furthermore, the control signal generating unit 140*b* generates a control signal for controlling the temperature control device of the lidar device 200*b* so that the light source temperature indicated by the light source temperature information acquired by the light source temperature acquiring unit 160 approaches the calculated target value of the light source temperature. The control signal generating unit 140*a* outputs the control signal that has been generated to the lidar device 200*b*.

The control signal acquiring unit 290 in the lidar device 200*b* acquires the control signal output from the control signal generating unit 140*b*.

Note that the functions of the filter temperature acquiring unit 110, the filter characteristic acquiring unit 120, the transmission wavelength acquiring unit 130, the light source characteristic acquiring unit 150, the light source temperature acquiring unit 160, and the control signal generating unit 140*b* in the lidar control device 100*b* according to the third embodiment may be implemented by the processor 401 and the memory 402 or may be implemented by the processing circuit 403 in the hardware configurations exemplified in FIGS. 4A and 4B in the first embodiment.

The operation of the lidar control device 100*b* according to the third embodiment will be described with reference to FIG. 13.

FIG. 13 is a flowchart illustrating an example of processes of the lidar control device 100*b* according to the third embodiment. The lidar control device 100*b* repeatedly executes, for example, processes of the flowchart.

First, in step ST1301, the filter characteristic acquiring unit 120 acquires the filter temperature characteristic information.

Next, in step ST1302, the light source characteristic acquiring unit 150 acquires the light source temperature characteristic information.

Then, in step ST1303, the filter temperature acquiring unit 110 acquires the filter temperature information.

Next, in step ST1304, the light source temperature acquiring unit 160 acquires the light source temperature information.

Next, in step ST1305, the transmission wavelength acquiring unit 130 acquires the transmission wavelength.

Next, in step ST1306, the control signal generating unit 140*b* generates the control signal and outputs the control signal that has been generated.

After step ST1306, the lidar control device 100*b* ends the processes of the flowchart. After finishing the processes of the flowchart, the lidar control device 100*b* returns to step ST1301 and repeatedly executes the processes of the flowchart.

Note that the lidar control device 100*b* may omit the processes of steps ST1301 and ST1302 when the lidar control device 100*b* repeatedly executes the processes of the flowchart for a second time and thereafter.

In addition, the processes of steps ST1301 to ST1303 may be in any order.

Meanwhile, the process of step ST1304 is only required to be performed before the process of step ST1306.

As described above, the lidar control device 100*b* according to the third embodiment controls the lidar device 200*b* including the background light cut filter 230 that allows transmission of reflected laser light and suppresses transmission of background light out of the reflected laser light that is reflected light of laser emission light reflected by an object to be measured and the background light incident on the lidar device 200*b*, the lidar control device 100*b* including: the filter temperature acquiring unit 110 to acquire filter temperature information indicating the filter temperature of the background light cut filter 230 included in the lidar device 200*b*; the filter characteristic acquiring unit 120 to acquire filter temperature characteristic information indicating the filter temperature characteristic of the background light cut filter 230; the transmission wavelength acquiring unit 130 to acquire the transmission wavelength of the background light cut filter 230 on the basis of the filter temperature information acquired by the filter temperature acquiring unit 110 and the filter temperature characteristic information acquired by the filter characteristic acquiring unit 120; and the control signal generating unit 140*b* to generate a control signal for causing the lidar device 200*b* to emit the laser emission light having a wavelength corresponding to the transmission wavelength acquired by the transmission wavelength acquiring unit 130.

In particular, in addition to the above configuration, the lidar control device 100*b* according to the third embodiment includes the light source characteristic acquiring unit 150 to acquire the light source temperature characteristic information indicating the temperature characteristic of the laser light source 211 of the laser light outputting unit 210*b* included in the lidar device 200*b*, the light source temperature acquiring unit 160 that acquires the light source temperature information indicating the light source temperature of the laser light source 211, in which the control signal generating unit 140*b* generates the control signal for causing the lidar device 200*b* to emit the laser emission light having a wavelength corresponding to the transmission wavelength acquired by the transmission wavelength acquiring unit 130 on the basis of the light source temperature information acquired by the light source temperature acquiring unit 160, the light source temperature characteristic information acquired by the light source characteristic acquiring unit 150, and the transmission wavelength acquired by the transmission wavelength acquiring unit 130.

With such a configuration, the lidar control device 100*b* can control the lidar device 200*b* so that the background light cut filter 230 included in the lidar device 200*b* does not suppress transmission of the reflected laser light incident on the background light cut filter 230 even when the background light cut filter 230 has a filter temperature characteristic and the filter temperature of the background light cut filter 230 changes.

Furthermore, as described above, the lidar device 200*b* according to the third embodiment includes: the background light cut filter 230; the laser light outputting unit 210*b* to output the laser output light based on the laser light source light output from the laser light source 211; and the light receiving unit 240 to receive the reflected laser light transmitted through the background light cut filter 230 and to output an electric signal based on the reflected laser light that has been received. The lidar device 200*b* further includes: the filter temperature measuring unit 250 to measure the filter temperature of the background light cut filter 230 and to output the filter temperature that has been measured to the lidar control device 100*b* as the filter temperature information; and the wavelength adjusting unit 212*b* to receive the control signal generated and output by the lidar control device 100*b* on the basis of the filter temperature information output by the filter temperature measuring unit 250 and to adjust the wavelength of the laser emission light emitted on the basis of the control signal.

In particular, the lidar device 200*b* according to the third embodiment includes, in addition to the above configuration, the light source temperature measuring unit 251*b* that measures the light source temperature of the laser light source 211 of the laser light outputting unit 210*b* and outputs the light source temperature that has been measured as the light source temperature information, in which the light source temperature measuring unit 251*b* outputs the light source temperature information to the lidar control device 100*b*, and the wavelength adjusting unit 212*b* receives the control signal generated and output by the lidar control device 100*b* on the basis of the light source temperature information output by the light source temperature measuring unit 251*b* and the filter temperature information output by the filter temperature measuring unit 250 and adjusts the wavelength of the laser emission light to be emitted on the basis of the control signal.

With such a configuration, the lidar device 200*b* can prevent the background light cut filter 230 included in the lidar device 200*b* from suppressing transmission of the reflected laser light incident on the background light cut filter 230 even when the background light cut filter 230 has a filter temperature characteristic and the filter temperature of the background light cut filter 230 changes.

Fourth Embodiment

A lidar control device 100*c*, a lidar device 200*c*, and a lidar system 10*c* according to a fourth embodiment will be described with reference to FIGS. 14 to 16.

FIG. 14 is a block diagram illustrating an example of a configuration of the main part of the lidar system 10*c* to which the lidar control device 100*c* and the lidar device 200*c* according to the fourth embodiment are applied.

The lidar system 10*c* is obtained by replacing the lidar control device 100, the lidar device 200, and the distance calculating device 11 in the lidar system 10 according to the first embodiment with the lidar control device 100*c*, the lidar device 200*c*, and a distance calculating device 11*c*.

That is, the lidar system 10*c* includes the lidar control device 100*c*, the lidar device 200*c*, the distance calculating device 11*c*, and the storage device 12.

The lidar system 10*c* and the lidar system 10 according to the first embodiment are different in that, in the lidar system 10 according to the first embodiment, the lidar device 200 emits laser emission light in a predetermined direction, whereas in the lidar system 10*c*, the lidar device 200*c* temporally changes a direction in which the laser light (hereinafter, referred to as "laser emission light") is emitted.

Note that in FIG. 14 the same symbol is given to a block similar to that illustrated in FIG. 1, and description thereof is omitted.

The lidar control device 100*c* controls the lidar device 200*c*. Specifically, the lidar control device 100*c* generates a control signal for causing the lidar device 200*c* to emit laser emission light having a predetermined wavelength. The lidar control device 100*c* outputs the control signal that has been generated to the lidar device 200*c*. In the fourth embodiment, the control signal generated by the lidar control device 100*c* indicates, for example, the wavelength of the laser emission light.

The lidar device 200*c* emits the laser emission light toward the object while temporally changing the direction in which the laser emission light is emitted and receives reflected light (hereinafter, referred to as "reflected laser light") which is the laser emission light having been emitted and reflected by the object. The lidar device 200*c* outputs, to the distance calculating device 11*c*, an electric signal based on the reflected laser light and a trigger signal indicating a time point as a reference for the lidar device 200*c* to emit the laser emission light toward the object. In addition, the lidar device 200*c* acquires the control signal output from the lidar control device 100*c*, adjusts the wavelength of the laser emission light emitted on the basis of the control signal (hereinafter referred to as "emission wavelength"), and emits the laser emission light having the adjusted wavelength toward the object.

Note that, in the fourth embodiment, the control signal output from the lidar control device 100*c* to the lidar device 200*c* indicates, for example, the wavelength of the laser light.

The distance calculating device 11*c* receives emission direction information indicating a direction in which the lidar device 200*c* emits the laser emission light (hereinafter, referred to as "emission direction") in addition to the trigger signal indicating a time point as a reference for the lidar device 200*c* to emit the laser emission light toward the object, the trigger signal being output from the lidar device 200*c*, and electric signal based on the reflected laser light output from the lidar device 200*c* and calculates a distance from a predetermined reference point to the object in the emission direction by, for example, the ToF method. Since the method in which the distance calculating device 11*c* calculates the distance from a predetermined reference point to an object in the emission direction by the ToF method or the like is known, description of the method is omitted.

The storage device 12 stores predetermined information necessary for the lidar control device 100*c* or the lidar device 200*c* to operate. Each of the lidar control device 100*c* and the lidar device 200*c* reads information necessary for operation from the storage device 12.

Figure 15:
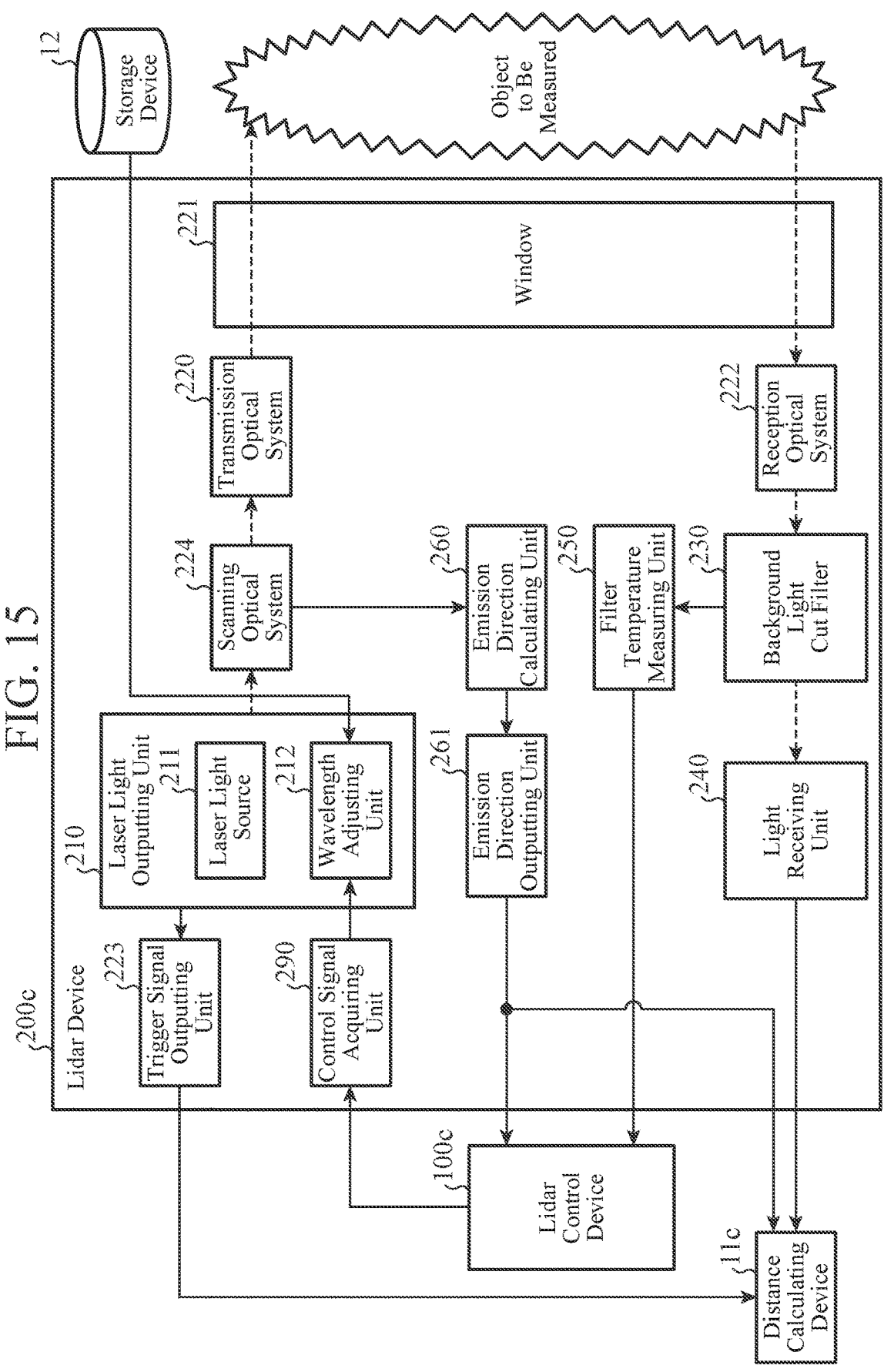
FIG. 15 is a block diagram illustrating an example of the configuration of the main part of a lidar device according to the fourth embodiment.

FIG. 15 is a block diagram illustrating an example of the configuration of the main part of the lidar device 200*c* according to the fourth embodiment.

The lidar device 200*c* is obtained by adding a scanning optical system 224, an emission direction calculating unit 260, and an emission direction outputting unit 261 to the lidar device 200 according to the first embodiment.

That is, the lidar device 200*c* includes the laser light outputting unit 210, the transmission optical system 220, the window 221, the reception optical system 222, the trigger signal outputting unit 223, the scanning optical system 224, the background light cut filter 230, the light receiving unit 240, the filter temperature measuring unit 250, the emission direction calculating unit 260, the emission direction outputting unit 261, and the control signal acquiring unit 290.

Note that in FIG. 15 the same symbol is given to a block similar to that illustrated in FIG. 2, and description thereof is omitted.

The scanning optical system 224 receives the laser output light output from the laser light outputting unit 210 and scans the laser output light. The scanning optical system 224 includes a polygon mirror or the like. The laser output light after scanning by the scanning optical system 224 is transmitted through the transmission optical system 220 and the window 221 and then emitted from the lidar device 200c as laser emission light. With the scanning optical system 224 scanning the laser output light output from the laser light outputting unit 210, the emission direction of the laser emission light emitted from the lidar device 200c changes with time.

Note that, since the scanning optical system 224 does not change the wavelength of the laser output light when scanning the laser output light output from the laser light outputting unit 210, the wavelength of the laser output light output from the laser light outputting unit 210 corresponds to the emission wavelength that is the wavelength of the laser emission light of the lidar device 200c. Since the wavelength of the laser output light corresponds to the emission wavelength, hereinafter, the wavelength of the laser output light is also referred to as the emission wavelength.

The emission direction calculating unit 260 calculates the emission direction that is a direction in which the lidar device 200c emits the laser emission light. The emission direction is, for example, an angle formed by the optical axis of the transmission optical system 220 and the direction of travel of the laser emission light emitted from the lidar device 200c.

Specifically, for example, the emission direction calculating unit 260 calculates the emission direction on the basis of the state of the scanning optical system 224. More specifically, for example, the emission direction calculating unit 260 calculates the emission direction on the basis of the rotation amount of the polygon mirror included in the scanning optical system 224.

The emission direction outputting unit 261 outputs the emission direction information indicating the emission direction calculated by the emission direction calculating unit 260 to the lidar control device 100c.

Figure 16:
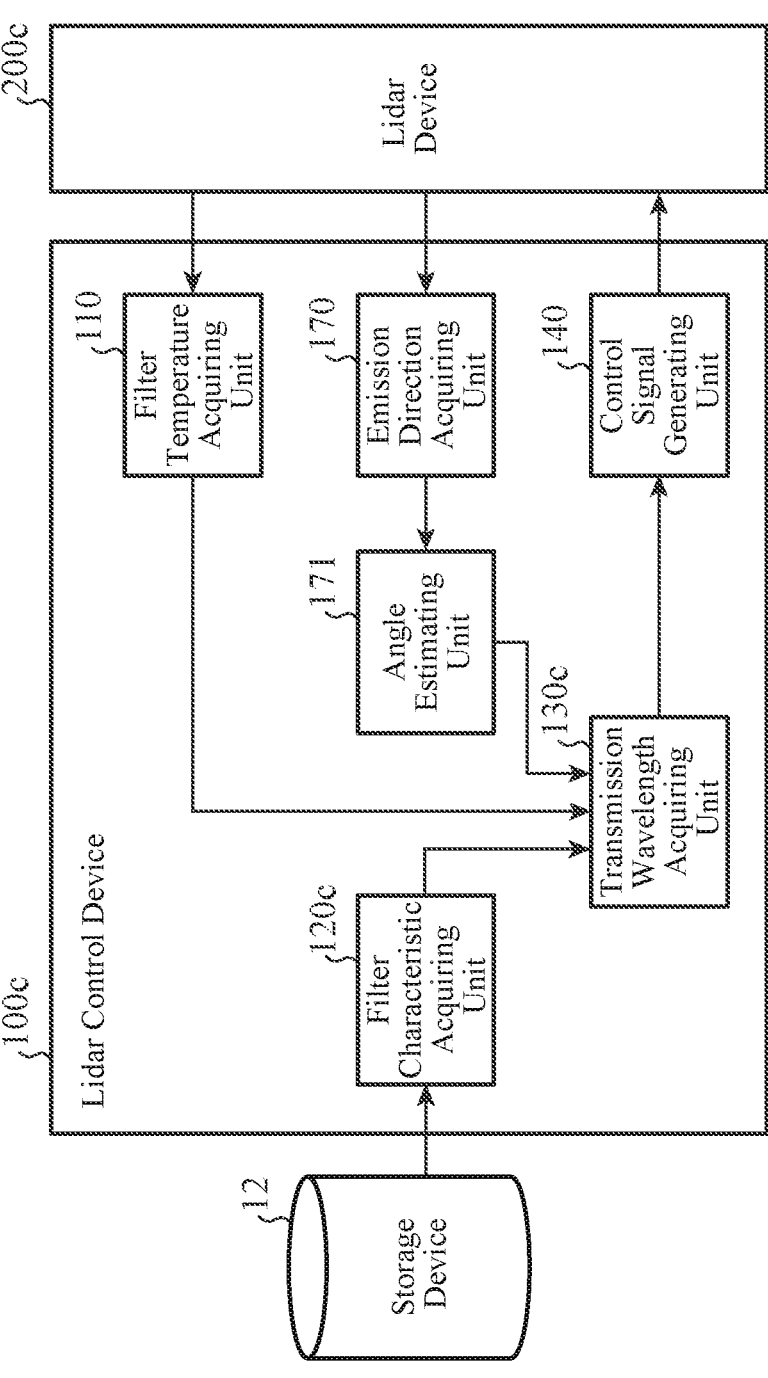
FIG. 16 is a block diagram illustrating an example of the configuration of the main part of a lidar control device according to the fourth embodiment.

FIG. 16 is a block diagram illustrating an example of the configuration of the main part of the lidar control device 100c according to the fourth embodiment.

The lidar control device 100c is obtained by replacing the filter characteristic acquiring unit 120 and the transmission wavelength acquiring unit 130 in the lidar control device 100 according to the first embodiment with a filter characteristic acquiring unit 120c and a transmission wavelength acquiring unit 130c and further adding an emission direction acquiring unit 170 and an angle estimating unit 171.

That is, the lidar control device 100c includes the filter temperature acquiring unit 110, the filter characteristic acquiring unit 120c, the transmission wavelength acquiring unit 130c, the emission direction acquiring unit 170, the angle estimating unit 171, and the control signal generating unit 140.

Note that in FIG. 16 the same symbol is given to a block similar to that illustrated in FIG. 3, and description thereof is omitted.

The emission direction acquiring unit 170 acquires the emission direction information indicating the direction in which the lidar device 200c emits the laser emission light. Specifically, the emission direction acquiring unit 170 acquires the emission direction information by receiving the emission direction information output by the emission direction outputting unit 261 in the lidar device 200c.

The angle estimating unit 171 estimates the angle at which the reflected laser light is incident on the background light cut filter 230 (hereinafter referred to as "incident angle") on the basis of the emission direction information acquired by the emission direction acquiring unit 170. The incident angle is, for example, an angle formed by the optical axis of the reception optical system 222 and the traveling direction of the reflected laser light when entering the background light cut filter 230.

The filter characteristic acquiring unit 120c acquires filter temperature characteristic information indicating the incident angle characteristic of the background light cut filter 230 and the filter temperature characteristic of the background light cut filter 230. Here, the incident angle characteristic refers to a characteristic that the transmission wavelength of the background light cut filter 230 changes in correspondence with the angle of the laser light incident on the background light cut filter 230 at a certain filter temperature.

The filter characteristic acquiring unit 120c acquires the filter temperature characteristic information by, for example, reading the filter temperature characteristic information from the storage device 12. The filter temperature characteristic information acquired by the filter characteristic acquiring unit 120c is provided from, for example, the manufacturer of the background light cut filter 230.

The filter temperature characteristic information acquired by the filter characteristic acquiring unit 120c is, for example, information in which the incident angle and the transmission wavelength are associated with each other for every filter temperature.

Alternatively, for example, the filter temperature characteristic information acquired by the filter characteristic acquiring unit 120c may indicate a relational expression among the filter temperature, the incident angle, and the transmission wavelength, the relational expression including the filter temperature and the incident angle as variables and allowing calculation of the transmission wavelength by substituting the filter temperature and the incident angle.

In the fourth embodiment, the filter temperature characteristic information indicates a relational expression among the filter temperature, the incident angle, and the transmission wavelength, and description will be given on the premise that the relational expression is the following Equation (4).

$$\lambda_F = a_{FT} \times T_F + a_{F\theta} \times \theta_F + b_F \qquad \text{Equation (4)}$$

Here, $\lambda_F$ denotes the transmission wavelength, $T_F$ denotes the filter temperature, $\theta_F$ denotes the incident angle, and $a_{FT}$, $a_{F\theta}$, and $b_F$ are predetermined constants.

The transmission wavelength acquiring unit 130c acquires the transmission wavelength of the background light cut filter 230 on the basis of the filter temperature information acquired by the filter temperature acquiring unit 110, the incident angle of the reflected laser light estimated by the angle estimating unit 171, and the filter temperature characteristic information acquired by the filter characteristic acquiring unit 120c.

Specifically, for example, the transmission wavelength acquiring unit 130c acquires the transmission wavelength of the background light cut filter 230 by calculating the transmission wavelength by substituting the filter temperature indicated by the filter temperature information acquired by the filter temperature acquiring unit 110 and the incident angle of the reflected laser light estimated by the angle estimating unit 171 into Equation (4) indicated by the filter temperature characteristic information acquired by the filter characteristic acquiring unit 120c.

The control signal generating unit 140 generates the control signal for causing the lidar device 200c to emit laser emission light having a wavelength corresponding to the transmission wavelength acquired by the transmission wavelength acquiring unit 130c. The control signal generating unit 140 outputs the control signal that has been generated to the lidar device 200c.

The control signal acquiring unit 290 in the lidar device 200c acquires the control signal output from the control signal generating unit 140.

Note that the functions of the filter temperature acquiring unit 110, the filter characteristic acquiring unit 120c, the transmission wavelength acquiring unit 130c, the emission direction acquiring unit 170, the angle estimating unit 171, and the control signal generating unit 140 in the lidar control device 100c according to the fourth embodiment may be implemented by the processor 401 and the memory 402 or may be implemented by the processing circuit 403 in the hardware configurations exemplified in FIGS. 4A and 4B in the first embodiment.

The operation of the lidar control device 100c according to the fourth embodiment will be described with reference to FIG. 17.

FIG. 17 is a flowchart illustrating an example of processes of the lidar control device 100c according to the fourth embodiment. The lidar control device 100c repeatedly executes, for example, processes of the flowchart.

First, in step ST1701, the filter characteristic acquiring unit 120c acquires the filter temperature characteristic information.

Then, in step ST1702, the filter temperature acquiring unit 110 acquires the filter temperature information.

Next, in step ST1703, the emission direction acquiring unit 170 acquires the emission direction information.

Next, in step ST1704, the angle estimating unit 171 estimates the incident angle.

Then, in step ST1705, the transmission wavelength acquiring unit 130c acquires the transmission wavelength.

Next, in step ST1706, the control signal generating unit 140 generates the control signal and outputs the control signal that has been generated.

After step ST1706, the lidar control device 100c ends the processes of the flowchart. After finishing the processes of the flowchart, the lidar control device 100c returns to step ST1701 and repeatedly executes the processes of the flowchart.

Note that the lidar control device 100c may omit the process of step ST1701 when the lidar control device 100c repeatedly executes the processes of the flowchart for a second time and thereafter.

In addition, the processes of steps ST1701 to ST1703 may be in any order.

Meanwhile, the process of step ST1702 is only required to be executed before the process of step ST1705.

As described above, the lidar control device 100c according to the fourth embodiment controls the lidar device 200c including the background light cut filter 230 that allows transmission of reflected laser light and suppresses transmission of background light out of the reflected laser light that is reflected light of laser emission light reflected by an object to be measured and the background light incident on the lidar device 200c, the lidar control device 100c including: the filter temperature acquiring unit 110 to acquire filter temperature information indicating the filter temperature of the background light cut filter 230 included in the lidar device 200c; the filter characteristic acquiring unit 120c to acquire filter temperature characteristic information indicating the filter temperature characteristic of the background light cut filter 230; the transmission wavelength acquiring unit 130c to acquire the transmission wavelength of the background light cut filter 230 on the basis of the filter temperature information acquired by the filter temperature acquiring unit 110 and the filter temperature characteristic information acquired by the filter characteristic acquiring unit 120c; and the control signal generating unit 140 to generate a control signal for causing the lidar device 200c to emit the laser emission light having a wavelength corresponding to the transmission wavelength acquired by the transmission wavelength acquiring unit 130c.

In particular, the lidar control device 100c according to the fourth embodiment includes, in addition to the above configuration, the emission direction acquiring unit 170 to acquire the emission direction information indicating a direction in which the lidar device 200c emits the laser emission light; and the angle estimating unit 171 to estimate an angle at which the reflected laser light is incident on the background light cut filter 230 on the basis of the emission direction information acquired by the emission direction acquiring unit 170, in which the filter characteristic acquiring unit 120c acquires the filter temperature characteristic information indicating the incident angle characteristic of the background light cut filter 230 and the filter temperature characteristic of the background light cut filter 230, and the transmission wavelength acquiring unit 130c acquires the transmission wavelength of the background light cut filter 230 on the basis of the filter temperature information acquired by the filter temperature acquiring unit 110, the incident angle of the reflected laser light estimated by the angle estimating unit 171, and the filter temperature characteristic information acquired by the filter characteristic acquiring unit 120c.

With such a configuration, the lidar control device 100c can control the lidar device 200c so that the background light cut filter 230 included in the lidar device 200c, in which the emission direction of the laser emission light emitted from the lidar device 200c changes with time, does not suppress transmission of the reflected laser light incident on the background light cut filter 230 even in a case where the background light cut filter 230 has a filter temperature characteristic and the filter temperature of the background light cut filter 230 changes.

Furthermore, as described above, the lidar device 200c according to the fourth embodiment includes: the background light cut filter 230; the laser light outputting unit 210 to output the laser output light based on the laser light source light output from the laser light source 211; and the light receiving unit 240 to receive the reflected laser light transmitted through the background light cut filter 230 and to output an electric signal based on the reflected laser light that has been received. The lidar device 200c further includes: the filter temperature measuring unit 250 to measure the filter temperature of the background light cut filter 230 and to output the filter temperature that has been measured to the lidar control device 100c as the filter temperature information indicating the filter temperature; and the wavelength adjusting unit 212 to receive the control signal generated and output by the lidar control device 100c on the basis of the filter temperature information output by the filter temperature measuring unit 250 and to adjust the wavelength of the laser emission light emitted on the basis of the control signal.

In particular, the lidar device 200c according to the fourth embodiment includes, in addition to the above configuration, the scanning optical system 224 to change the emission direction of the laser emission light and the emission direction outputting unit 261 to output the emission direction information indicating the emission direction having been changed by the scanning optical system 224 to the lidar control device 100c, and the wavelength adjusting unit 212 receives the control signal generated and output by the lidar control device 100c on the basis of the filter temperature information output by the filter temperature measuring unit 250 and the emission direction information output by the emission direction outputting unit 261 and adjusts the wavelength of the laser emission light to be emitted on the basis of the control signal.

With such a configuration, the lidar device 200c can cause the background light cut filter 230 included in the lidar device 200c, in which the emission direction of the laser emission light to be emitted changes with time, not to suppress transmission of the reflected laser light incident on the background light cut filter 230 even in a case where the background light cut filter 230 has a filter temperature characteristic and the filter temperature of the background light cut filter 230 changes.

Note that the lidar control device 100c can also be applied to a case where the filter temperature of the background light cut filter 230 included in the lidar device 200c according to the fourth embodiment is maintained at a predetermined desired temperature or a case where the background light cut filter 230 has no filter temperature characteristic.

In the above cases, the lidar control device 100c does not necessarily need to include the filter temperature acquiring unit 110 nor the filter characteristic acquiring unit 120c. In addition, in the above cases, the lidar device 200c does not necessarily need to include the filter temperature measuring unit 250.

In this case, for example, the lidar control device 100c includes, instead of the filter characteristic acquiring unit 120c, an incident angle characteristic acquiring unit (not illustrated) that acquires incident angle characteristic information indicating the incident angle characteristic of the background light cut filter 230 when the background light cut filter 230 is at a predetermined filter temperature from the storage device 12 or the like.

Furthermore, in this case, for example, the transmission wavelength acquiring unit 130c acquires the transmission wavelength of the background light cut filter 230 on the basis of the incident angle of the reflected laser light estimated by the angle estimating unit 171 and the incident angle characteristic information acquired by the incident angle characteristic acquiring unit.

With such a configuration, the lidar control device 100c can control the lidar device 200c so that the background light cut filter 230 included in the lidar device 200c, in which the emission direction of the laser emission light emitted from the lidar device 200c changes with time, does not suppress transmission of the reflected laser light incident on the background light cut filter 230 even in a case where the background light cut filter 230 has an incident angle characteristic and the incident angle of the reflected laser light incident on the background light cut filter 230 changes.

Fifth Embodiment

A lidar control device 100d, a lidar device 200d, and a lidar system 10d according to a fifth embodiment will be described with reference to FIGS. 18 to 20.

FIG. 18 is a block diagram illustrating an example of a configuration of the main part of the lidar system 10d to which the lidar control device 100d and the lidar device 200d according to the fifth embodiment are applied.

The lidar system 10d is obtained by replacing the lidar control device 100 and the lidar device 200 in the lidar system 10 according to the first embodiment with the lidar control device 100d and the lidar device 200d.

That is, the lidar system 10d includes the lidar control device 100d, the lidar device 200d, the distance calculating device 11, and the storage device 12.

Note that in FIG. 18 the same symbol is given to a block similar to that illustrated in FIG. 1, and description thereof is omitted.

There are cases where a laser light source included in a lidar device has a light source temperature characteristic different from a light source temperature characteristic indicated by light source temperature characteristic information provided from a manufacturer of the laser light source, for example, due to a difference in manufacturing time of the laser light source, an influence of aging deterioration of the laser light source, or the like.

There are also cases where a background light cut filter included in a lidar device has a filter temperature characteristic different from a filter temperature characteristic indicated by filter temperature characteristic information provided from a manufacturer of the background light cut filter, for example, due to a difference in manufacturing time of the background light cut filter, the influence of aging deterioration of the background light cut filter, or the like.

In addition, there are cases where the incident angle of reflected laser light incident on a background light cut filter does not match a predetermined desired incident angle due to an assembly error or the like at the time of assembling a lidar device. In this case, the background light cut filter may suppress transmission of the reflected laser light due to an incident angle characteristic of the background light cut filter.

In the lidar system 10d according to the fifth embodiment, even in the above cases, it is ensured that the background light cut filter does not suppress transmission of reflected laser light incident on the background light cut filter.

The lidar control device 100d controls the lidar device 200d. Specifically, the lidar control device 100d generates a control signal for causing the lidar device 200d to emit laser light (hereinafter, referred to as "laser emission light") having a predetermined wavelength. The lidar control device 100d outputs the control signal that has been generated to the lidar device 200d.

The lidar device 200d emits the laser emission light toward an object and receives reflected light (hereinafter, referred to as "reflected laser light") which is the laser emission light reflected by the object. The lidar device 200d outputs, to the distance calculating device 11 and the lidar control device 100d, an electric signal based on the reflected laser light and a trigger signal indicating a time point as a reference for the lidar device 200d to emit the laser emission light toward the object. In addition, the lidar device 200d acquires the control signal output from the lidar control device 100d, adjusts the wavelength of the laser emission light emitted on the basis of the control signal (hereinafter referred to as "emission wavelength"), and emits the laser emission light having the adjusted wavelength toward the object.

Note that, in the fifth embodiment, the control signal output from the lidar control device 100d to the lidar device 200d indicates, for example, the wavelength of the laser emission light.

The distance calculating device 11 receives the trigger signal indicating a time point as a reference for the lidar device 200d to emit the laser emission light toward the object, the trigger signal being output from the lidar device 200d, and an electric signal based on the reflected laser light output from the lidar device 200d and calculates a distance from a predetermined reference point to the object by, for example, the ToF method.

The storage device 12 stores predetermined information necessary for the lidar control device 100d or the lidar device 200d to operate. Each of the lidar control device 100d and the lidar device 200d reads information necessary for operation from the storage device 12.

Figure 19:
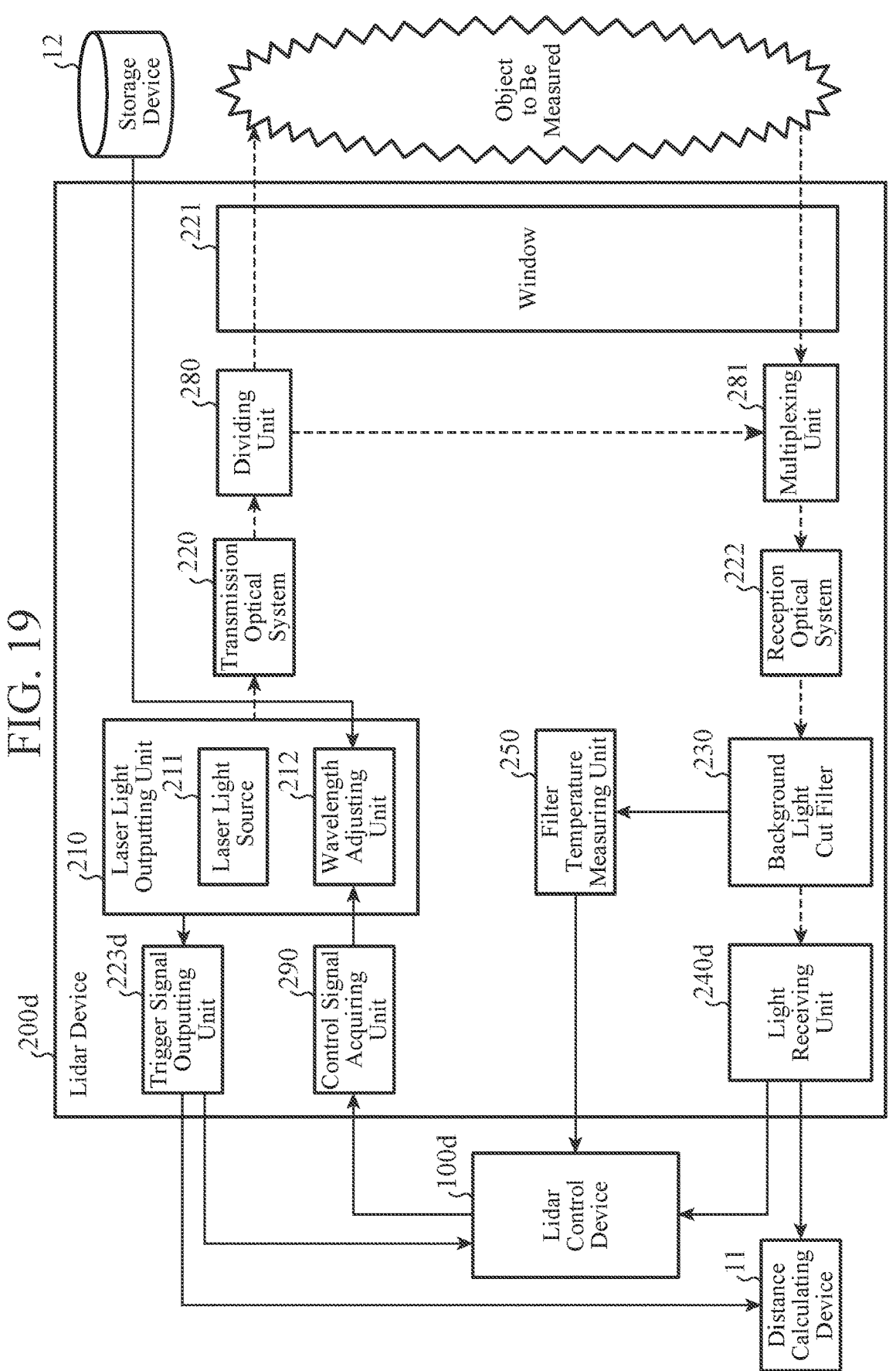
FIG. 19 is a block diagram illustrating an example of the configuration of the main part of a lidar device according to the fifth embodiment.

FIG. 19 is a block diagram illustrating an example of the configuration of the main part of the lidar device 200d according to the fifth embodiment.

The lidar device 200d is obtained by replacing the light receiving unit 240 and the trigger signal outputting unit 223 in the lidar device 200 according to the first embodiment with a light receiving unit 240d and a trigger signal outputting unit 223d and adding a dividing unit 280 and a multiplexing unit 281.

That is, the lidar device 200d includes the laser light outputting unit 210, the transmission optical system 220, the window 221, the reception optical system 222, the trigger signal outputting unit 223d, the background light cut filter 230, the light receiving unit 240d, the filter temperature measuring unit 250, the dividing unit 280, the multiplexing unit 281, and the control signal acquiring unit 290.

Note that in FIG. 19 the same symbol is given to a block similar to that illustrated in FIG. 2, and description thereof is omitted.

The dividing unit 280 divides laser output light output from the laser light outputting unit 210 and obtains a part of the laser output light as laser reference light. Specifically, the dividing unit 280 divides the laser output light to obtain a part thereof as the laser reference light and causes the remaining part of the laser output light to be emitted from the lidar device 200d as laser emission light. The laser emission light emitted from the lidar device 200d is reflected by the object, and the reflected laser light reflected by the object enters the lidar device 200d.

The dividing unit 280 includes a beam splitter or the like such as a half mirror.

As illustrated in FIG. 19, for example, the dividing unit 280 is disposed between the transmission optical system 220 and the window 221. The position where the dividing unit 280 is disposed is not limited to a position between the transmission optical system 220 and the window 221. For example, the dividing unit 280 may be disposed between the laser light outputting unit 210 and the transmission optical system 220. Furthermore, for example, a portion of the window 221 that receives the laser output light output by the laser light outputting unit 210 may function as the dividing unit 280.

The multiplexing unit 281 multiplexes the laser reference light divided by the dividing unit 280 and the reflected laser light incident on the lidar device 200d.

The multiplexing unit 281 includes a beam splitter or the like such as a half mirror.

As illustrated in FIG. 19, for example, the multiplexing unit 281 is disposed between the window 221 and the reception optical system 222. The position where the multiplexing unit 281 is disposed is not limited to a position between the window 221 and the reception optical system 222 as long as the multiplexing unit 281 is disposed so that laser light obtained after the laser reference light and the reflected laser light are multiplexed enters the background light cut filter 230. For example, multiplexing unit 281 may be disposed between the reception optical system 222 and background light cut filter 230. Furthermore, for example, a portion of the window 221 that receives the laser reference light and the reflected laser light may function as the multiplexing unit 281.

The background light cut filter 230 receives the reflected laser light and the laser reference light multiplexed by the multiplexing unit 281.

The light receiving unit 240d receives the reflected laser light and the laser reference light transmitted through the background light cut filter 230, converts the reflected laser light and the laser reference light that have been received into an electric signal, and outputs the electric signal to the lidar control device 100d. The light receiving unit 240d outputs the electric signal also to the distance calculating device 11.

The trigger signal outputting unit 223d outputs, to the distance calculating device 11 and the lidar control device 100d, a trigger signal indicating a reference time point when the lidar device 200d emits laser emission light toward the object, such as a time point when the laser light source 211 outputs the laser light source light, a time point when the laser light outputting unit 210 outputs the laser output light, or a time point when the lidar device 200d emits the laser emission light.

Figure 20:
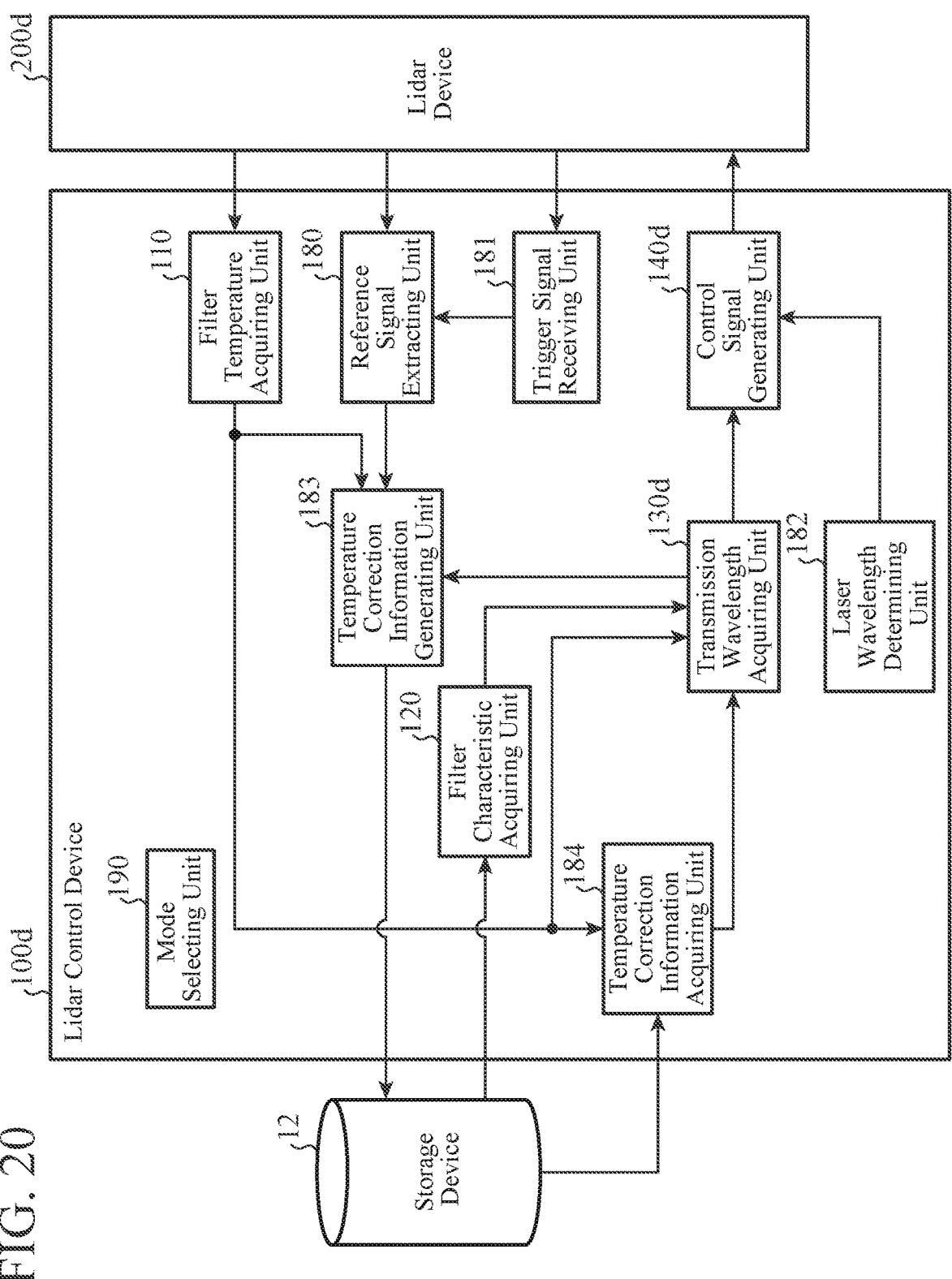
FIG. 20 is a block diagram illustrating an example of the configuration of the main part of a lidar control device according to the fifth embodiment.

FIG. 20 is a block diagram illustrating an example of the configuration of the main part of the lidar control device 100d according to the fifth embodiment.

The lidar control device 100d is obtained by replacing the transmission wavelength acquiring unit 130 and the control signal generating unit 140 in the lidar control device 100 according to the first embodiment with a transmission wavelength acquiring unit 130d and a control signal generating unit 140d and further adding a reference signal extracting unit 180, a trigger signal receiving unit 181, a laser wavelength determining unit 182, a temperature correction information generating unit 183, a temperature correction information acquiring unit 184, and a mode selecting unit 190.

That is, the lidar control device 100d includes the filter temperature acquiring unit 110, the filter characteristic acquiring unit 120, the transmission wavelength acquiring unit 130d, the reference signal extracting unit 180, the trigger signal receiving unit 181, the laser wavelength determining unit 182, the temperature correction information generating unit 183, the temperature correction information acquiring unit 184, the mode selecting unit 190, and the control signal generating unit 140d.

Note that in FIG. 20 the same symbol is given to a block similar to that illustrated in FIG. 3, and description thereof is omitted.

The lidar control device 100d has at least two operation modes including a temperature correction information generating mode and a laser wavelength controlling mode as operation modes, and the lidar control device 100d performs an operation corresponding to an operation mode having been selected from among the plurality of operation modes.

The mode selecting unit 190 selects one operation mode from the at least two operation modes including the temperature correction information generating mode and the laser wavelength controlling mode of the lidar control device 100*d*. The lidar control device 100*d* performs an operation corresponding to the operation mode selected by the mode selecting unit 190.

The temperature correction information generating mode is an operation mode in which the lidar control device 100*d* generates temperature correction information.

The laser wavelength controlling mode is an operation mode in which the lidar control device 100*d* performs control for causing the lidar device 200*d* to emit laser emission light having a wavelength corresponding to the transmission wavelength acquired by the transmission wavelength acquiring unit 130*d*.

For example, the mode selecting unit 190 receives information indicating an operation mode desired by the user via an operation reception unit (not illustrated) that receives operation input for selecting an operation mode from the user and selects the operation mode on the basis of the information.

In a case where the mode selecting unit 190 has selected the temperature correction information generating mode as the operation mode, the transmission wavelength acquiring unit 130*d* performs a similar operation to that of the transmission wavelength acquiring unit 130 in the lidar control device 100 according to the first embodiment. Specifically, in a case where the mode selecting unit 190 has selected the temperature correction information generating mode as the operation mode, the transmission wavelength acquiring unit 130*d* acquires the transmission wavelength of the background light cut filter 230 on the basis of filter temperature information acquired by the filter temperature acquiring unit 110 and filter temperature characteristic information acquired by the filter characteristic acquiring unit 120. More specifically, for example, in a case where the mode selecting unit 190 has selected the temperature correction information generating mode as the operation mode, the transmission wavelength acquiring unit 130*d* acquires the transmission wavelength of the background light cut filter 230 by substituting the filter temperature indicated by the filter temperature information acquired by the filter temperature acquiring unit 110 into Equation (1) indicated by the filter temperature characteristic information acquired by the filter characteristic acquiring unit 120 and thereby calculating the transmission wavelength.

The trigger signal receiving unit 181 operates in a case where the mode selecting unit 190 has selected the temperature correction information generating mode as the operation mode.

The trigger signal receiving unit 181 receives a trigger signal output from the lidar device 200*d*. Specifically, for example, the trigger signal receiving unit 181 receives the trigger signal output from the trigger signal outputting unit 223*d* in the lidar device 200*d*.

The reference signal extracting unit 180 operates in a case where the mode selecting unit 190 has selected the temperature correction information generating mode as the operation mode.

The reference signal extracting unit 180 receives an electric signal output from the lidar device 200*d*. Specifically, for example, the reference signal extracting unit 180 receives the electric signal output from the light receiving unit 240*d* in the lidar device 200*d*. The electric signal received by the reference signal extracting unit 180 is obtained by converting laser light obtained by multiplexing reflected laser light and laser reference light that have been transmitted through the background light cut filter 230 included in the lidar device 200*d* into an electric signal by the light receiving unit 240*d* in the lidar device 200*d*.

The reference signal extracting unit 180 extracts, as a reference signal, an electric signal based on the laser reference light in the received electric signals. Specifically, for example, the reference signal extracting unit 180 extracts an electric signal based on the laser reference light as a reference signal using a predetermined time gate based on a time point at which the trigger signal receiving unit 181 has received the trigger signal.

The laser wavelength determining unit 182 operates in a case where the mode selecting unit 190 has selected the temperature correction information generating mode as the operation mode.

The laser wavelength determining unit 182 determines the wavelength of the laser emission light to be emitted from the lidar device 200*d* so that laser emission light having a different wavelength is emitted from the lidar device 200*d* every time the reference signal extracting unit 180 extracts the reference signal.

Specifically, for example, every time the reference signal extracting unit 180 extracts the reference signal, the laser wavelength determining unit 182 sequentially determines the wavelength of the laser emission light to be emitted from the lidar device 200*d* so that laser emission light having an emission wavelength each different by a predetermined wavelength interval is emitted from the lidar device 200*d* within the range of emission wavelengths that can be emitted by the lidar device 200*d*.

In a case where the mode selecting unit 190 has selected the temperature correction information generating mode as the operation mode, the control signal generating unit 140*d* generates a control signal for causing the lidar device 200*d* to emit laser emission light having the wavelength determined by the laser wavelength determining unit 182. The control signal generating unit 140*d* outputs the control signal that has been generated to the lidar device 200*d*. The control signal acquiring unit 290 in the lidar device 200*d* acquires the control signal output from the control signal generating unit 140*d*. The lidar device 200*d* emits the laser emission light having the wavelength determined by the laser wavelength determining unit 182 on the basis of the control signal acquired by the control signal acquiring unit 290.

The temperature correction information generating unit 183 operates in a case where the mode selecting unit 190 has selected the temperature correction information generating mode as the operation mode.

The temperature correction information generating unit 183 estimates the transmission wavelength of the background light cut filter 230 on the basis of the signal intensity of a plurality of reference signals extracted by the reference signal extracting unit 180. The temperature correction information generating unit 183 calculates a correction coefficient of the transmission wavelength of the background light cut filter 230 on the basis of the transmission wavelength that has been estimated and the transmission wavelength acquired by the transmission wavelength acquiring unit 130*d*. The temperature correction information generating unit 183 generates temperature correction information in which the correction coefficient that has been calculated is associated with filter temperature information acquired by the filter temperature acquiring unit 110.

The configuration of the main part of the temperature correction information generating unit 183 in the lidar control device 100*d* according to the fifth embodiment will be described with reference to FIG. 21.

Figure 21:
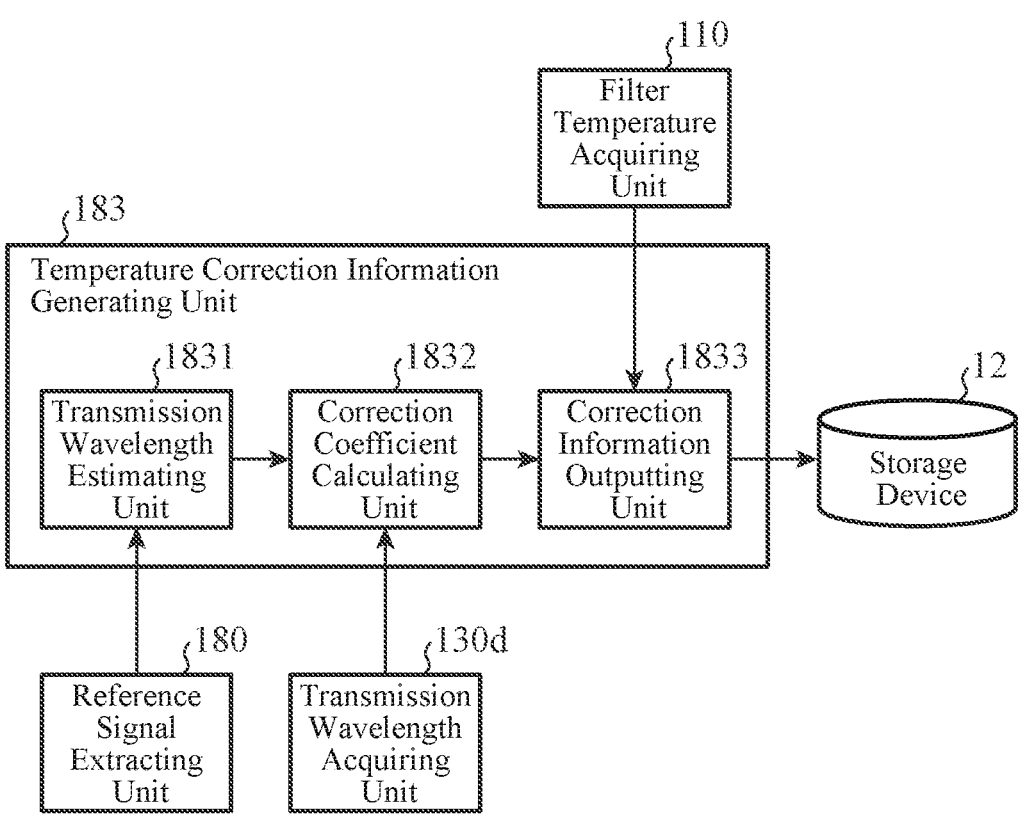
FIG. 21 is a block diagram illustrating an example of the configuration of the main part of a temperature correction information generating unit in the lidar control device according to the fifth embodiment.

FIG. 21 is a block diagram illustrating an example of the configuration of the main part of the temperature correction information generating unit 183 in the lidar control device 100*d* according to the fifth embodiment.

The temperature correction information generating unit 183 includes a transmission wavelength estimating unit 1831, a correction coefficient calculating unit 1832, and a correction information outputting unit 1833.

The transmission wavelength estimating unit 1831 estimates the transmission wavelength of the background light cut filter 230 on the basis of the signal intensity of the plurality of reference signals extracted by the reference signal extracting unit 180.

Specifically, for example, each of the plurality of reference signals extracted by the reference signal extracting unit 180 has been extracted by the reference signal extracting unit 180 from an electric signal obtained when the lidar device 200*d* has emitted the wavelength determined by the laser wavelength determining unit 182. The transmission wavelength estimating unit 1831 specifies a reference signal having the strongest signal intensity among the plurality of reference signals obtained by extraction by the reference signal extracting unit 180 performed for every electric signal obtained when the lidar device 200*d* emits the wavelength sequentially determined by the laser wavelength determining unit 182. The transmission wavelength estimating unit 1831 estimates that the wavelength determined by the laser wavelength determining unit 182 corresponding to a specified reference signal is the transmission wavelength.

The correction coefficient calculating unit 1832 calculates the correction coefficient of the transmission wavelength of the background light cut filter 230 on the basis of the transmission wavelength estimated by the transmission wavelength estimating unit 1831 and the transmission wavelength acquired by the transmission wavelength acquiring unit 130*d*.

Specifically, for example, the correction coefficient calculating unit 1832 calculates the correction coefficient by subtracting, from the transmission wavelength estimated by the transmission wavelength estimating unit 1831, the transmission wavelength calculated by the transmission wavelength acquiring unit 130*d* by substituting the filter temperature into Equation (1).

More specifically, for example, the correction coefficient calculated by the correction coefficient calculating unit 1832 in a case where the filter temperature indicated by filter temperature information acquired by the filter temperature acquiring unit 110 is $T_{F0}$ is calculated by the following Equation (5).

$$K_{TF0} = \lambda'_{TF0} - \lambda_{TF0} = \lambda'_{TF0} - (a_F \times T_{F0} + b_F) \qquad \text{Equation (5)}$$

Here, $K_{TF0}$ denotes a correction coefficient in a case where the filter temperature is $T_{F0}$, $\lambda'_{TF0}$ denotes a transmission wavelength estimated by the transmission wavelength estimating unit 1831 in a case where the filter temperature is $T_{F0}$, and $\lambda_{TF0}$ denotes the transmission wavelength acquired by the transmission wavelength acquiring unit 130*d* in a case where the filter temperature is $T_{F0}$.

The correction information outputting unit 1833 generates temperature correction information in which the correction coefficient calculated by the correction coefficient calculating unit 1832 is associated with the filter temperature information acquired by the filter temperature acquiring unit 110.

The correction information outputting unit 1833 writes and stores the temperature correction information that has been generated in the storage device 12 by, for example, outputting the temperature correction information to the storage device 12. The correction information outputting unit 1833 may hold the temperature correction information that has been generated in the memory 402 or the like.

In the description of the fifth embodiment, it is presumed that the correction information outputting unit 1833 writes and stores the temperature correction information that has been generated in the storage device 12 by outputting the temperature correction information to the storage device 12.

The temperature correction information acquiring unit 184 operates in a case where the mode selecting unit 190 has selected the laser wavelength controlling mode as the operation mode.

The temperature correction information acquiring unit 184 acquires temperature correction information corresponding to the filter temperature information acquired by the filter temperature acquiring unit 110 from among a plurality of pieces of temperature correction information generated in advance by the temperature correction information generating unit 183.

Each of the plurality of pieces of temperature correction information generated in advance by the temperature correction information generating unit 183 corresponds to, for example, one of a plurality of filter temperatures.

Specifically, for example, the temperature correction information acquiring unit 184 acquires temperature correction information corresponding to the filter temperature information acquired by the filter temperature acquiring unit 110 by reading the temperature correction information from the storage device 12.

Note that, in a case where temperature correction information corresponding to the filter temperature information acquired by the filter temperature acquiring unit 110 is not stored in the storage device 12, for example, the temperature correction information acquiring unit 184 acquires temperature correction information corresponding to filter temperature information of a filter temperature closest to the filter temperature indicated by the filter temperature information acquired by the filter temperature acquiring unit 110 from among the plurality of pieces of temperature correction information stored in the storage device 12.

For example, in this case, the temperature correction information acquiring unit 184 may acquire the temperature correction information by acquiring two pieces of temperature correction information including temperature correction information corresponding to filter temperature information indicating a filter temperature closest to the filter temperature indicated by the filter temperature information acquired by the filter temperature acquiring unit 110 and temperature correction information corresponding to filter temperature information indicating the filter temperature second closest to the filter temperature indicated by the filter temperature information acquired by the filter temperature acquiring unit 110 among the plurality of pieces of temperature correction information stored in the storage device 12 and obtaining a weighted average value of the correction coefficients indicated by the two pieces of temperature correction information.

Alternatively, for example, in this case, the temperature correction information acquiring unit 184 may cause the mode selecting unit 190 to select the temperature correction information generating mode as the operation mode and cause the temperature correction information generating unit 183 to generate temperature correction information at the filter temperature indicated by the filter temperature information acquired by the filter temperature acquiring unit 110. The temperature correction information generated by the temperature correction information generating unit 183 is stored in the storage device 12, for example.

In a case where the mode selecting unit 190 has selected the laser wavelength controlling mode as the operation mode, the transmission wavelength acquiring unit 130*d* acquires the transmission wavelength of the background light cut filter 230 on the basis of the filter temperature information acquired by the filter temperature acquiring unit 110, filter temperature characteristic information acquired by the filter characteristic acquiring unit 120, and the temperature correction information acquired by the temperature correction information acquiring unit 184.

Specifically, for example, where the filter temperature indicated by the filter temperature information acquired by the filter temperature acquiring unit 110 is denoted as $T_{F0}$, the transmission wavelength acquiring unit 130*d* acquires the transmission wavelength of the background light cut filter 230 using the following Equation (6).

$$\lambda''_{TF0} = (a_F \times T_{F0} + b_F) + K_{TF0} \qquad \text{Equation (6)}$$

Here, $\lambda''_{TF0}$ represents the transmission wavelength of the background light cut filter 230 acquired by the transmission wavelength acquiring unit 130*d* where the filter temperature indicated by the filter temperature information acquired by the filter temperature acquiring unit 110 is denoted by $T_{F0}$.

In a case where the mode selecting unit 190 has selected the laser wavelength controlling mode as the operation mode, the control signal generating unit 140*d* generates a control signal for causing the lidar device 200*d* to emit laser emission light having a wavelength corresponding to the transmission wavelength acquired by the transmission wavelength acquiring unit 130*d*. The control signal generating unit 140*d* outputs the control signal that has been generated to the lidar device 200*d*.

Note that the functions of the filter temperature acquiring unit 110, the filter characteristic acquiring unit 120, the transmission wavelength acquiring unit 130*d*, the reference signal extracting unit 180, the trigger signal receiving unit 181, the laser wavelength determining unit 182, the temperature correction information generating unit 183, the temperature correction information acquiring unit 184, the mode selecting unit 190, and the control signal generating unit 140*d* in the lidar control device 100*d* according to the fifth embodiment may be implemented by the processor 401 and the memory 402 or may be implemented by the processing circuit 403 in the hardware configurations exemplified in FIGS. 4A and 4B in the first embodiment.

The operation of the lidar control device 100*d* according to the fifth embodiment will be described with reference to FIGS. 22A and 22B.

Figure 22A:
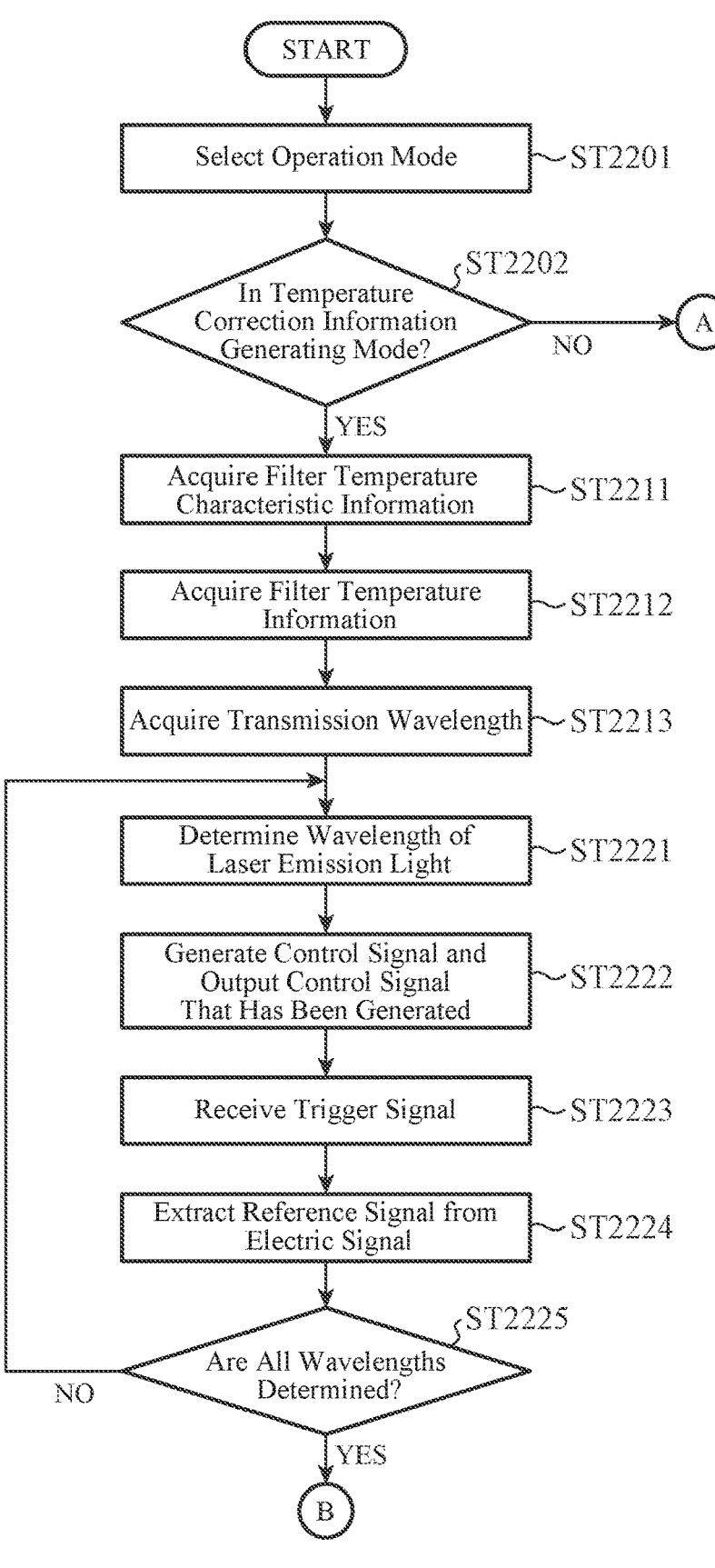
FIG. 22A is a part of a flowchart illustrating an example of processes of the lidar control device according to the fifth embodiment.
Figure 22B:
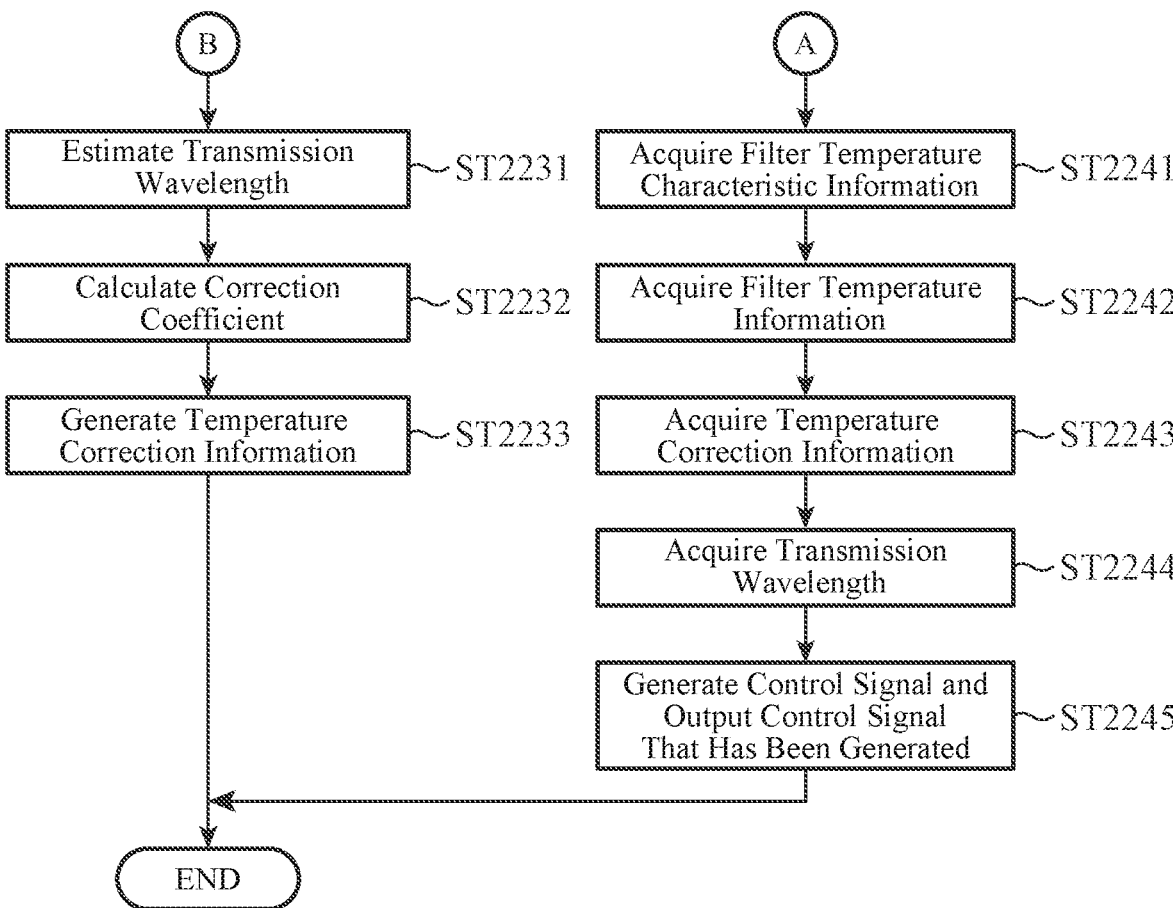
FIG. 22B is a remaining part of the flowchart illustrating an example of the processes of the lidar control device according to the fifth embodiment.

FIGS. 22A and 22B are flowcharts illustrating an example of processing of the lidar control device 100*d* according to the fifth embodiment. The lidar control device 100*d* repeatedly executes, for example, processes of the flowchart.

Note that the description is given on the assumption that, in the flowchart, the lidar control device 100*d* according to the fifth embodiment operates in either the temperature correction information generating mode or the laser wavelength controlling mode.

First, in step ST2201, the mode selecting unit 190 selects an operation mode.

In step ST2202, the lidar control device 100*d* checks whether or not the operation mode selected by the mode selecting unit 190 is the temperature correction information generating mode and executes a process of step ST2211 if the operation mode is the temperature correction information generating mode or executes a process of step ST2241 if the operation mode is not the temperature correction information generating mode, that is, if the operation mode is the laser wavelength controlling mode.

In a case where the operation mode is the temperature correction information generating mode, the filter characteristic acquiring unit 120 acquires filter temperature characteristic information in step ST2211.

After step ST2211, in step ST2212, the filter temperature acquiring unit 110 acquires the filter temperature information.

After step ST2212, in step ST2213, the transmission wavelength acquiring unit 130*d* acquires the transmission wavelength.

After step ST2213, in step ST2221, the laser wavelength determining unit 182 determines the wavelength of the laser emission light to be emitted from the lidar device 200*d*.

After step ST2221, in step ST2222, the control signal generating unit 140*d* generates a control signal for causing the lidar device 200*d* to emit laser emission light having the wavelength determined by the laser wavelength determining unit 182 and outputs the generated control signal to the lidar device 200*d*.

After step ST2222, in step ST2223, the trigger signal receiving unit 181 receives the trigger signal.

After step ST2223, in step ST2224, the reference signal extracting unit 180 receives the electric signals output from the lidar device 200*d* and extracts the reference signal from the electric signals.

After step ST2224, in step ST2225, the laser wavelength determining unit 182 determines whether or not all wavelengths to be determined by the laser wavelength determining unit 182 have been determined.

In step ST2225, the lidar control device 100*d* repeatedly executes the processes from steps ST2221 to ST2225 until the laser wavelength determining unit 182 determines that all the wavelengths to be determined have been determined.

If it is determined in step ST2225 that all the wavelengths to be determined by the laser wavelength determining unit 182 have been determined, the transmission wavelength estimating unit 1831 in the temperature correction information generating unit 183 estimates the transmission wavelength of the background light cut filter 230 in step ST2231.

After step ST2231, in step ST2232, the correction coefficient calculating unit 1832 in the temperature correction information generating unit 183 calculates a correction coefficient of the transmission wavelength of the background light cut filter 230.

After step ST2232, in step ST2233, the correction information outputting unit 1833 in the temperature correction information generating unit 183 generates temperature correction information in which the correction coefficient calculated by the correction coefficient calculating unit 1832 is associated with the filter temperature information acquired by the filter temperature acquiring unit 110 in step ST2212.

After step ST2233, the lidar control device 100*d* ends the processes of the flowchart. After finishing the processes of the flowchart, the lidar control device 100d returns to step ST2201 and repeatedly executes the processes of the flowchart.

Note that the lidar control device 100d may omit the process of step ST2211 when the lidar control device 100d repeatedly executes the process of step ST2211 in the flowchart for a second time and thereafter.

In addition, it is presumed that the filter temperature does not change from the end of execution of the process of step ST2212 to the start of execution of the process of step ST2231.

Meanwhile, the process of step ST2213 is only required to be executed before the process of step ST2232.

In addition, the processes of steps ST2211 and ST2212 may be in any order as long as the processes of step ST2211 and ST2212 are executed before the process of step ST2213.

In a case where the operation mode is the laser wavelength controlling mode, the filter characteristic acquiring unit 120 acquires filter temperature characteristic information in step ST2241.

After step ST2241, in step ST2242, the filter temperature acquiring unit 110 acquires the filter temperature information.

After step ST2242, in step ST2243, the temperature correction information acquiring unit 184 acquires temperature correction information corresponding to the filter temperature information acquired by the filter temperature acquiring unit 110.

After step ST2243, in step ST2244, the transmission wavelength acquiring unit 130d acquires the transmission wavelength of the background light cut filter 230 on the basis of the filter temperature information acquired by the filter temperature acquiring unit 110, the filter temperature characteristic information acquired by the filter characteristic acquiring unit 120, and the temperature correction information acquired by the temperature correction information acquiring unit 184.

After step ST2244, in step ST2245, the control signal generating unit 140d generates a control signal for causing the lidar device 200d to emit laser emission light having a wavelength corresponding to the transmission wavelength acquired by the transmission wavelength acquiring unit 130d and outputs the control signal that has been generated to the lidar device 200d.

After step ST2245, the lidar control device 100d ends the processes of the flowchart. After finishing the processes of the flowchart, the lidar control device 100d returns to step ST2201 and repeatedly executes the processes of the flowchart.

Note that the lidar control device 100d may omit the process of step ST2241 when the lidar control device 100d repeatedly executes the process of step ST2241 in the flowchart for a second time and thereafter.

In addition, the processes of steps ST2241 and ST2242 may be in any order.

As described above, the lidar control device 100d according to the fifth embodiment controls the lidar device 200d including the background light cut filter 230 that allows transmission of reflected laser light and suppresses transmission of background light out of the reflected laser light that is reflected light of laser emission light reflected by an object to be measured and the background light incident on the lidar device 200d, the lidar control device 100d including: the filter temperature acquiring unit 110 to acquire filter temperature information indicating the filter temperature of the background light cut filter 230 included in the lidar device 200d; the filter characteristic acquiring unit 120 to acquire filter temperature characteristic information indicating the filter temperature characteristic of the background light cut filter 230; the transmission wavelength acquiring unit 130d to acquire the transmission wavelength of the background light cut filter 230 on the basis of the filter temperature information acquired by the filter temperature acquiring unit 110 and the filter temperature characteristic information acquired by the filter characteristic acquiring unit 120; and the control signal generating unit 140d to generate a control signal for causing the lidar device 200d to emit the laser emission light having a wavelength corresponding to the transmission wavelength acquired by the transmission wavelength acquiring unit 130d.

In particular, in addition to the above configuration, the lidar control device 100d according to the fifth embodiment includes: the reference signal extracting unit 180 to receive an electric signal output from the light receiving unit 240d included in the lidar device 200d, which receives reflected laser light transmitted through the background light cut filter 230 and outputs the electric signal based on the reflected laser light that has been received, and to extract, as a reference signal, an electric signal based on laser reference light obtained by dividing, by the dividing unit 280 included in the lidar device 200d, laser output light output from the laser light outputting unit 210 included in the lidar device 200d and obtaining a part of the laser output light in the electric signal; the laser wavelength determining unit 182 to determine a wavelength of laser emission light to be emitted from the lidar device 200d so that laser emission light having a different wavelength is emitted from the lidar device 200d every time the reference signal extracting unit 180 extracts a reference signal; the temperature correction information generating unit 183 to estimate the transmission wavelength of the background light cut filter 230 on the basis of signal intensities of a plurality of reference signals extracted by the reference signal extracting unit 180, to calculate a correction coefficient of the transmission wavelength of the background light cut filter 230 on the basis of the transmission wavelength that has been estimated and the transmission wavelength acquired by the transmission wavelength acquiring unit 130d, and to generate temperature correction information in which the correction coefficient that has been calculated is associated with filter temperature information acquired by the filter temperature acquiring unit 110; the temperature correction information acquiring unit 184 to acquire temperature correction information corresponding to the filter temperature information acquired by the filter temperature acquiring unit 110 from among a plurality of pieces of temperature correction information having been generated in advance by the temperature correction information generating unit 183; and the mode selecting unit 190 to select one operation mode from among at least two operation modes including the temperature correction information generating mode in which temperature correction information is generated and the laser wavelength controlling mode for performing control for causing the lidar device 200d to emit laser emission light having a wavelength corresponding to the transmission wavelength acquired by the transmission wavelength acquiring unit 130d.

Furthermore, in the lidar control device 100d according to the fifth embodiment in the above configuration, in a case where the mode selecting unit 190 has selected the temperature correction information generating mode, the control signal generating unit 140d generates the control signal for causing the lidar device 200d to emit the laser emission light having the wavelength determined by the laser wavelength determining unit 182 and, in a case where the mode selecting unit 190 has selected the laser wavelength controlling mode, the transmission wavelength acquiring unit 130*d* acquires the transmission wavelength of the background light cut filter 230 on the basis of the filter temperature information acquired by the filter temperature acquiring unit 110, the filter temperature characteristic information acquired by the filter characteristic acquiring unit 120, and the temperature correction information acquired by the temperature correction information acquiring unit 184, and the control signal generating unit 140*d* generates the control signal for causing the lidar device 200*d* to emit laser emission light having a wavelength corresponding to the transmission wavelength acquired by the transmission wavelength acquiring unit 130*d*.

With this configuration, the lidar control device 100*d* can control the lidar device 200*d* so that the background light cut filter 230 does not suppress transmission of the reflected laser light incident on the background light cut filter 230 even in a case where the background light cut filter 230 has a filter temperature characteristic and the filter temperature of the background light cut filter 230 fluctuates in a case where the background light cut filter 230 included in the lidar device 200*d* suppresses transmission of the reflected laser light incident on the background light cut filter 230 due to the influence of an error in the assembly or the like in the lidar device 200*d*.

Furthermore, as described above, the lidar device 200*d* according to the fifth embodiment includes: the background light cut filter 230; the laser light outputting unit 210 to output the laser output light based on the laser light source light output from the laser light source 211; and the light receiving unit 240*d* to receive the reflected laser light transmitted through the background light cut filter 230 and to output an electric signal based on the reflected laser light that has been received. The lidar device 200*d* further includes: the filter temperature measuring unit 250 to measure the filter temperature of the background light cut filter 230 and to output the filter temperature that has been measured to the lidar control device 100*d* as the filter temperature information indicating the filter temperature; and the wavelength adjusting unit 212 to receive the control signal generated and output by the lidar control device 100*d* on the basis of the filter temperature information output by the filter temperature measuring unit 250 and to adjust the wavelength of the laser emission light emitted on the basis of the control signal.

With this configuration, the lidar device 200*d* can ensure that the background light cut filter 230 does not suppress transmission of the reflected laser light incident on the background light cut filter 230 even in a case where the background light cut filter 230 has a filter temperature characteristic and the filter temperature of the background light cut filter 230 fluctuates in a case where the background light cut filter 230 included in the lidar device 200*d* suppresses transmission of the reflected laser light incident on the background light cut filter 230 due to the influence of an error in the assembly or the like in the lidar device 200*d*.

In particular, in addition to the above configuration, the lidar device 200*d* according to the fifth embodiment includes the dividing unit 280 that divides the laser output light output from the laser light outputting unit 210 and obtains a part of the laser output light as the laser reference light, the background light cut filter 230 receives the reflected laser light and the laser reference light, and the light receiving unit 240*d* receives the reflected laser light and the laser reference light transmitted through the background light cut filter 230, converts the received reflected laser light and the laser reference light into an electric signal, and outputs the electric signal to the lidar control device 100*d*.

With this configuration, in the lidar device 200*d*, the background light cut filter 230 receives the laser reference light, and the light receiving unit 240*d* receives the laser reference light transmitted through the background light cut filter 230. Therefore, the lidar control device 100*d* can accurately estimate the transmission wavelength of the background light cut filter 230 based on the reference signal based on the laser reference light.

In the lidar system 10*d* according to the fifth embodiment, the description has been given on the premise that the control signal output from the lidar control device 100*d* to the lidar device 200*d* indicates the wavelength of the laser light. The control signal output from the lidar control device 100*d* to the lidar device 200*d* may indicate a target value of the light source temperature like in the lidar system 10*a* according to the second embodiment.

In the lidar system 10*d* according to the fifth embodiment, in order to modify the control signal output from the lidar control device 100*d* to the lidar device 200*d* to a control signal indicating the target value of the light source temperature, for example, the following configuration is adopted. The light source temperature measuring unit 251 according to the second embodiment is added to the lidar device 200*d*, and the laser light outputting unit 210 in the lidar device 200*d* is replaced with the laser light outputting unit 210*a* according to the second embodiment. Moreover, the light source characteristic acquiring unit 150 according to the second embodiment is added to the lidar control device 100*d*, and the control signal generating unit 140*d* in the lidar control device 100*d* is modified so as to generate and output a control signal indicating the target value of the light source temperature as in the control signal generating unit 140*a* according to the second embodiment.

Furthermore, the control signal output from the lidar control device 100*d* to the lidar device 200*d* may be a signal for controlling a temperature control device for adjusting the light source temperature of the laser light source 211 as in the lidar system 10*b* according to the third embodiment.

In the lidar system 10*d* according to the fifth embodiment, in order to modify the control signal output from the lidar control device 100*d* to the lidar device 200*d* to a signal for controlling a temperature control device, for example, the following configuration is adopted. The light source temperature measuring unit 251*b* according to the third embodiment is added to the lidar device 200*d*, and the laser light outputting unit 210 in the lidar device 200*d* is replaced with the laser light outputting unit 210*b* according to the third embodiment. In addition, the light source characteristic acquiring unit 150 and the light source temperature acquiring unit 160 according to the third embodiment are added to the lidar control device 100*d*, and furthermore, the control signal generating unit 140*d* in the lidar control device 100*d* is modified so as to generate and output a control signal for controlling a temperature control device for adjusting the light source temperature of the laser light source 211 like the control signal generating unit 140*b* according to the third embodiment.

Sixth Embodiment

A lidar control device 100*e*, a lidar device 200*e*, and a lidar system 10*e* according to a sixth embodiment will be described with reference to FIGS. 23 to 25.

Figure 23:
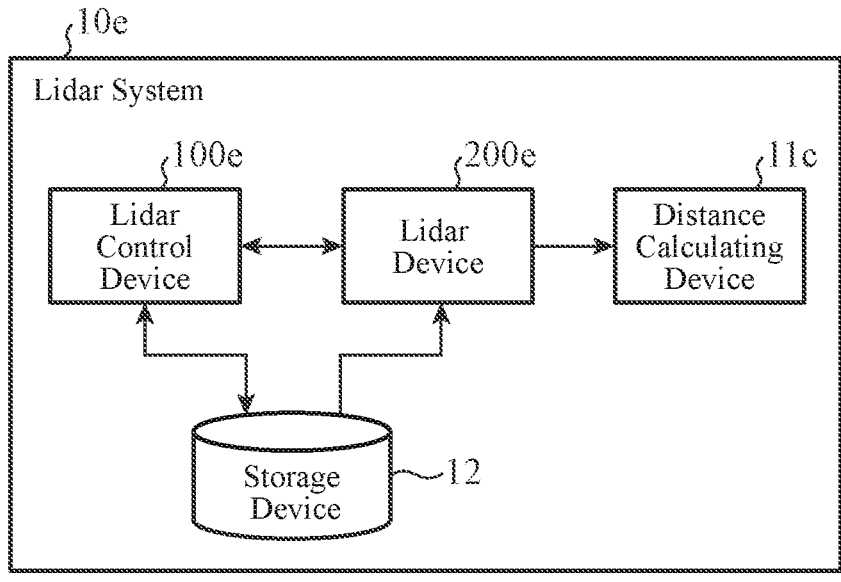
FIG. 23 is a block diagram illustrating an example of the configuration of the main part of a lidar system according to a sixth embodiment.

FIG. 23 is a block diagram illustrating an example of a configuration of the main part of the lidar system 10*e* to which the lidar control device 100e and the lidar device 200e according to the sixth embodiment are applied.

The lidar system 10e is obtained by replacing the lidar control device 100d, the lidar device 200d, and the distance calculating device 11 in the lidar system 10d according to the fifth embodiment with the lidar control device 100e, the lidar device 200e, and the distance calculating device 11c according to the fourth embodiment.

That is, the lidar system 10e includes the lidar control device 100e, the lidar device 200e, the distance calculating device 11c, and the storage device 12.

The lidar system 10e and the lidar system 10d according to the fifth embodiment are different in that, in the lidar system 10d according to the fifth embodiment, the lidar device 200d emits laser emission light in a predetermined direction, whereas in the lidar system 10e, the lidar device 200e temporally changes a direction in which the laser light (hereinafter, referred to as "laser emission light") is emitted.

Note that in FIG. 23 the same symbol is given to a block similar to that illustrated in FIG. 18 or FIG. 14, and description thereof is omitted.

The lidar control device 100e controls the lidar device 200e. Specifically, the lidar control device 100e generates a control signal for causing the lidar device 200e to emit laser emission light having a predetermined wavelength. The lidar control device 100e outputs the control signal that has been generated to the lidar device 200e.

The lidar device 200e emits the laser emission light toward the object while temporally changing the direction in which the laser emission light is emitted and receives reflected light (hereinafter, referred to as "reflected laser light") which is the laser emission light having been emitted and reflected by the object. The lidar device 200e outputs, to the distance calculating device 11c and the lidar control device 100e, an electric signal based on the reflected laser light and a trigger signal indicating a time point as a reference for the lidar device 200e to emit the laser emission light toward the object. In addition, the lidar device 200e acquires the control signal output from the lidar control device 100e, adjusts the wavelength of the laser emission light emitted on the basis of the control signal (hereinafter referred to as "emission wavelength"), and emits the laser emission light having the adjusted wavelength toward the object.

Note that, in the sixth embodiment, the control signal output by the lidar control device 100e to the lidar device 200e indicates, for example, the wavelength of the laser light.

The distance calculating device 11c receives emission direction information indicating a direction in which the lidar device 200e emits the laser emission light (hereinafter, referred to as "emission direction") in addition to the trigger signal indicating a time point as a reference for the lidar device 200e to emit the laser emission light toward the object, the trigger signal being output from the lidar device 200e, and an electric signal based on the reflected laser light output from the lidar device 200e and calculates a distance from a predetermined reference point to the object in the emission direction by, for example, the ToF method. Since the method in which the distance calculating device 11c calculates the distance from a predetermined reference point to an object in the emission direction by the ToF method or the like is known, description of the method is omitted.

The storage device 12 stores predetermined information necessary for the lidar control device 100e or the lidar device 200e to operate. Each of the lidar control device 100e and the lidar device 200e reads information necessary for operation from the storage device 12.

Figure 24:
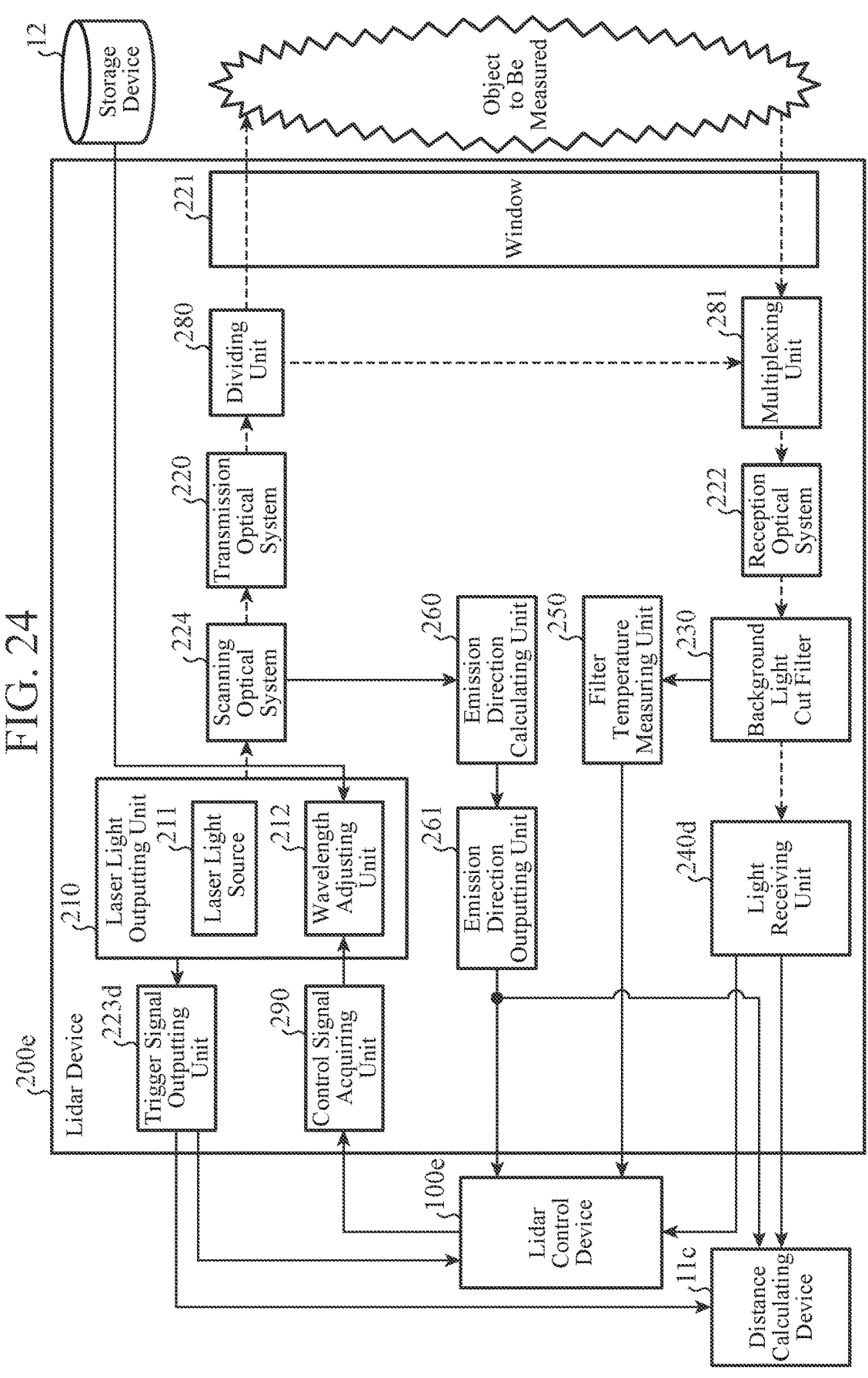
FIG. 24 is a block diagram illustrating an example of the configuration of the main part of a lidar device according to the sixth embodiment.

FIG. 24 is a block diagram illustrating an example of the configuration of the main part of the lidar device 200e according to the sixth embodiment.

The lidar device 200e is obtained by adding the scanning optical system 224, the emission direction calculating unit 260, and the emission direction outputting unit 261 according to the fourth embodiment to the lidar device 200d according to the fifth embodiment.

That is, the lidar device 200e includes the laser light outputting unit 210, the transmission optical system 220, the window 221, the reception optical system 222, the trigger signal outputting unit 223d, the scanning optical system 224, the background light cut filter 230, the light receiving unit 240d, the filter temperature measuring unit 250, the emission direction calculating unit 260, the emission direction outputting unit 261, the dividing unit 280, the multiplexing unit 281, and the control signal acquiring unit 290.

Note that in FIG. 24 the same symbol is given to a block similar to that illustrated in FIG. 19 or FIG. 15, and description thereof is omitted.

The control signal acquiring unit 290 acquires the control signal output from the lidar control device 100e.

The scanning optical system 224 receives the laser output light output from the laser light outputting unit 210 and scans the laser output light. With the scanning optical system 224 scanning the laser output light output from the laser light outputting unit 210, the emission direction of the laser emission light emitted from the lidar device 200e changes with time.

Note that, since the scanning optical system 224 does not change the wavelength of the laser output light when scanning the laser output light output from the laser light outputting unit 210, the wavelength of the laser output light output from the laser light outputting unit 210 corresponds to the emission wavelength that is the wavelength of the laser emission light of the lidar device 200e. Since the wavelength of the laser output light corresponds to the emission wavelength, hereinafter, the wavelength of the laser output light is also referred to as the emission wavelength.

A part of the laser output light after scanning by the scanning optical system 224 enters the background light cut filter 230 as laser reference light via the transmission optical system 220, the dividing unit 280, the multiplexing unit 281, and the reception optical system 222. The remainder of the laser output light after scanning by the scanning optical system 224 is transmitted through the transmission optical system 220, the dividing unit 280, and the window 221 and emitted as laser emission light from the lidar device 200e, and reflected laser light reflected by the object enters the background light cut filter 230 via the window 221, the multiplexing unit 281, and the reception optical system 222. That is, the background light cut filter 230 receives the reflected laser light and the laser reference light multiplexed by the multiplexing unit 281.

The emission direction calculating unit 260 calculates the emission direction that is a direction in which the lidar device 200e emits the laser emission light.

The emission direction outputting unit 261 outputs the emission direction information indicating the emission direction calculated by the emission direction calculating unit 260 to the lidar control device 100e.

The light receiving unit 240d receives the reflected laser light and the laser reference light transmitted through the background light cut filter 230, converts the reflected laser light and the laser reference light that have been received into an electric signal, and outputs the electric signal to the lidar control device 100e.

The trigger signal outputting unit 223d outputs, to the distance calculating device 11c and the lidar control device 100e, a trigger signal indicating a reference time point when the lidar device 200e emits laser emission light toward the object, such as a time point when the laser light source 211 outputs the laser light source light, a time point when the laser light outputting unit 210 outputs the laser output light, or a time point when the lidar device 200e emits the laser emission light.

Figure 25:
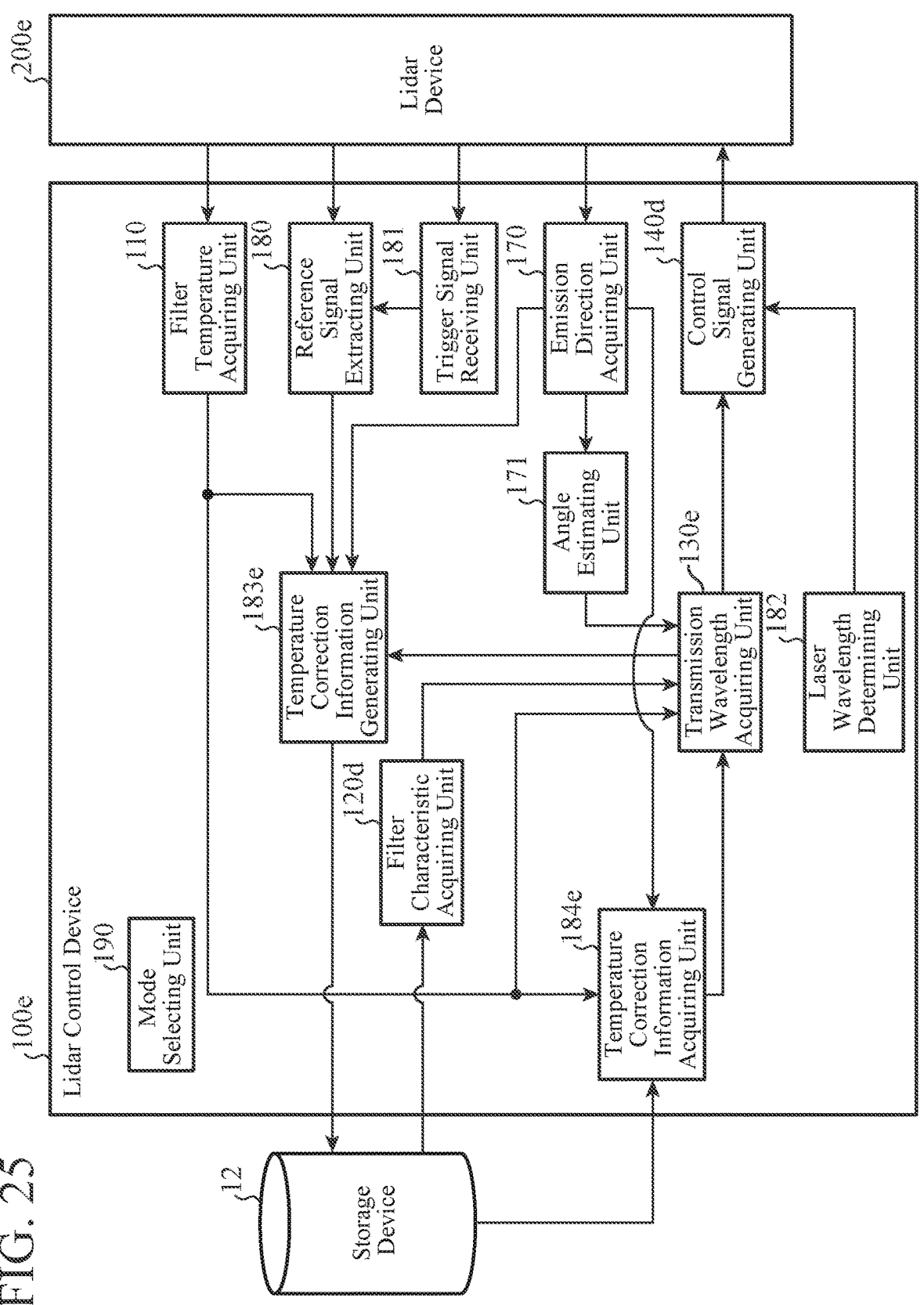
FIG. 25 is a block diagram illustrating an example of the configuration of the main part of a lidar control device according to the sixth embodiment.

FIG. 25 is a block diagram illustrating an example of the configuration of the main part of the lidar control device 100e according to the sixth embodiment.

The lidar control device 100e is obtained by replacing the transmission wavelength acquiring unit 130, the temperature correction information generating unit 183, the temperature correction information acquiring unit 184, and the filter characteristic acquiring unit 120 in the lidar control device 100d according to the fifth embodiment with a transmission wavelength acquiring unit 130e, a temperature correction information generating unit 183e, a temperature correction information acquiring unit 184e, and the filter characteristic acquiring unit 120d according to the fourth embodiment and further adding the emission direction acquiring unit 170 and the angle estimating unit 171 according to the fourth embodiment.

That is, the lidar control device 100e includes the filter temperature acquiring unit 110, the filter characteristic acquiring unit 120d, the transmission wavelength acquiring unit 130e, the emission direction acquiring unit 170, the angle estimating unit 171, the reference signal extracting unit 180, the trigger signal receiving unit 181, the laser wavelength determining unit 182, the temperature correction information generating unit 183e, the temperature correction information acquiring unit 184e, the mode selecting unit 190, and the control signal generating unit 140d.

Note that in FIG. 25 the same symbol is given to a block similar to that illustrated in FIG. 20 or FIG. 16, and description thereof is omitted.

The reference signal extracting unit 180 receives the electric signal output from the lidar device 200e.

The trigger signal receiving unit 181 receives the trigger signal output from the lidar device 200e.

The laser wavelength determining unit 182 determines the wavelength of the laser emission light to be emitted from the lidar device 200e so that laser emission light having a different wavelength is emitted from the lidar device 200e every time the reference signal extracting unit 180 extracts the reference signal.

In a case where the mode selecting unit 190 has selected the temperature correction information generating mode as the operation mode, the control signal generating unit 140d generates a control signal for causing the lidar device 200e to emit laser emission light having the wavelength determined by the laser wavelength determining unit 182. The control signal generating unit 140d outputs the control signal that has been generated to the lidar device 200e. The control signal acquiring unit 290 in the lidar device 200e acquires the control signal output from the control signal generating unit 140d. The lidar device 200e emits the laser emission light having the wavelength determined by the laser wavelength determining unit 182 on the basis of the control signal acquired by the control signal acquiring unit 290.

The filter temperature acquiring unit 110 acquires the filter temperature information indicating the filter temperature of the background light cut filter 230 included in the lidar device 200e.

The emission direction acquiring unit 170 acquires the emission direction information indicating the direction in which the lidar device 200e emits the laser emission light. Specifically, the emission direction acquiring unit 170 acquires the emission direction information by receiving the emission direction information output by the emission direction outputting unit 261 in the lidar device 200e.

The angle estimating unit 171 estimates the incident angle which is the angle at which the reflected laser light is incident on the background light cut filter 230 on the basis of the emission direction information acquired by the emission direction acquiring unit 170.

The filter characteristic acquiring unit 120d acquires filter temperature characteristic information indicating the incident angle characteristic of the background light cut filter 230 and the filter temperature characteristic of the background light cut filter 230.

In the sixth embodiment, the filter temperature characteristic information acquired by the filter characteristic acquiring unit 120d indicates a relational expression among the filter temperature, the incident angle, and the transmission wavelength as in the fourth embodiment, and description will be given on the assumption that the relational expression is the following Equation (4).

In a case where the mode selecting unit 190 has selected the temperature correction information generating mode as the operation mode, the transmission wavelength acquiring unit 130e acquires the transmission wavelength of the background light cut filter 230 on the basis of the filter temperature information acquired by the filter temperature acquiring unit 110, the incident angle of the reflected laser light estimated by the angle estimating unit 171, and filter temperature characteristic information acquired by the filter characteristic acquiring unit 120d. More specifically, for example, in a case where the mode selecting unit 190 has selected the temperature correction information generating mode as the operation mode, the transmission wavelength acquiring unit 130e acquires the transmission wavelength of the background light cut filter 230 by substituting the filter temperature indicated by the filter temperature information acquired by the filter temperature acquiring unit 110 and the incident angle of the reflected laser light estimated by the angle estimating unit 171 into Equation (4) indicated by the filter temperature characteristic information acquired by the filter characteristic acquiring unit 120d and thereby calculating the transmission wavelength.

The temperature correction information generating unit 183e operates in a case where the mode selecting unit 190 has selected the temperature correction information generating mode as the operation mode.

The temperature correction information generating unit 183e estimates the transmission wavelength of the background light cut filter 230 on the basis of the signal intensity of a plurality of reference signals extracted by the reference signal extracting unit 180. The temperature correction information generating unit 183e calculates a correction coefficient of the transmission wavelength of the background light cut filter 230 on the basis of the transmission wavelength that has been estimated by the temperature correction information generating unit 183e and the transmission wavelength acquired by the transmission wavelength acquiring unit 130e. The temperature correction information generating unit 183e generates temperature correction information in which the correction coefficient calculated by the temperature correction information generating unit 183e is associated with the filter temperature information acquired by the filter temperature acquiring unit 110 and the emission direction information acquired by the emission direction acquiring unit 170.

The configuration of the main part of the temperature correction information generating unit 183e in the lidar control device 100e according to the sixth embodiment will be described with reference to FIG. 26.

Figure 26:
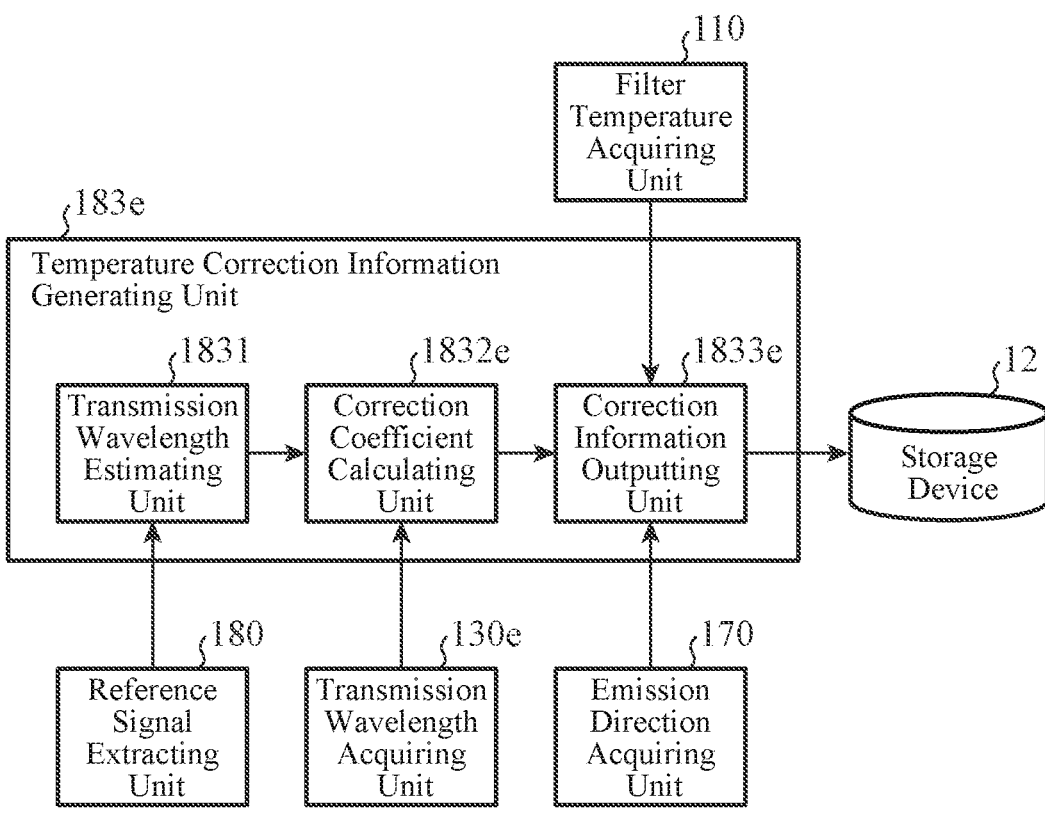
FIG. 26 is a block diagram illustrating an example of the configuration of the main part of a temperature correction information generating unit in the lidar control device according to the sixth embodiment.

FIG. 26 is a block diagram illustrating an example of the configuration of the main part of the temperature correction information generating unit 183e in the lidar control device 100e according to the sixth embodiment.

The temperature correction information generating unit 183e includes the transmission wavelength estimating unit 1831, a correction coefficient calculating unit 1832e, and a correction information outputting unit 1833e.

Note that in FIG. 26 the same symbol is given to a block similar to that illustrated in FIG. 21, and description thereof is omitted.

The transmission wavelength estimating unit 1831 estimates the transmission wavelength of the background light cut filter 230 on the basis of the signal intensity of the plurality of reference signals extracted by the reference signal extracting unit 180.

The correction coefficient calculating unit 1832e calculates the correction coefficient of the transmission wavelength of the background light cut filter 230 on the basis of the transmission wavelength estimated by the transmission wavelength estimating unit 1831 and the transmission wavelength acquired by the transmission wavelength acquiring unit 130e.

Specifically, for example, the correction coefficient calculating unit 1832e calculates the correction coefficient by subtracting, from the transmission wavelength estimated by the transmission wavelength estimating unit 1831, the transmission wavelength calculated by the transmission wavelength acquiring unit 130e by substituting the filter temperature and the incident angle into Equation (4).

More specifically, the correction coefficient calculated by the correction coefficient calculating unit 1832e is calculated by the following Equation (7) for example where the filter temperature indicated by the filter temperature information acquired by the filter temperature acquiring unit 110 is denoted by $T_{F0}$ and the incident angle at which the reflected laser light enters the background light cut filter 230 that is estimated by the angle estimating unit 171 is denoted by $\theta_{F0}$.

$$K_{TF0\cdot\theta F0} = \qquad\qquad \text{Equation (7)}$$
$$\lambda'_{TF0\cdot\theta Fo} - \lambda_{TF0\cdot\theta Fo} = \lambda'_{TF0\cdot\theta Fo} - (a_F \times T_{F0} + a_{F0} \times \theta_{F0} + b_F)$$

Here, $K_{TF0\cdot\theta F0}$ denotes a correction coefficient in a case where the filter temperature is $T_{F0}$ and the incident angle is $\theta_{F0}$, $\lambda'_{TF0\cdot\theta F0}$ denotes the transmission wavelength estimated by the transmission wavelength estimating unit 1831 in a case where the filter temperature is $T_{F0}$ and the incident angle is $\theta_{F0}$, and $\lambda_{TF0\cdot\theta F0}$ denotes the transmission wavelength acquired by the transmission wavelength acquiring unit 130e in a case where the filter temperature is $T_{F0}$ and the incident angle is $\theta_{F0}$.

The correction information outputting unit 1833e generates temperature correction information in which the correction coefficient calculated by the correction coefficient calculating unit 1832 is associated with the filter temperature information acquired by the filter temperature acquiring unit 110 and the emission direction information acquired by the emission direction acquiring unit 170. The correction information outputting unit 1833e writes and stores the temperature correction information that has been generated in the storage device 12 by, for example, outputting the temperature correction information to the storage device 12. The correction information outputting unit 1833e may hold the temperature correction information that has been generated in the memory 402 or the like.

In the description of the sixth embodiment, it is presumed that the correction information outputting unit 1833e writes and stores the temperature correction information that has been generated in the storage device 12 by outputting the temperature correction information to the storage device 12.

The temperature correction information acquiring unit 184e operates in a case where the mode selecting unit 190 has selected the laser wavelength controlling mode as the operation mode.

The temperature correction information acquiring unit 184e acquires temperature correction information corresponding to the filter temperature information acquired by the filter temperature acquiring unit 110 and the emission direction information acquired by the emission direction acquiring unit 170 from among a plurality of pieces of temperature correction information having been generated in advance by the temperature correction information generating unit 183e.

Each of the plurality of pieces of temperature correction information generated in advance by the temperature correction information generating unit 183e corresponds to, for example, one of a plurality of filter temperatures or a plurality of pieces of emission direction information.

Specifically, for example, the temperature correction information acquiring unit 184e acquires temperature correction information corresponding to the filter temperature information acquired by the filter temperature acquiring unit 110 and the emission direction information acquired by the emission direction acquiring unit 170 by reading the temperature correction information from the storage device 12.

Note that, in a case where temperature correction information corresponding to the filter temperature information acquired by the filter temperature acquiring unit 110 or the emission direction information acquired by the emission direction acquiring unit 170 is not stored in the storage device 12, for example, the temperature correction information acquiring unit 184e acquires temperature correction information corresponding to filter temperature information indicating a filter temperature closest to the filter temperature indicated by the filter temperature information acquired by the filter temperature acquiring unit 110 and the emission direction information acquired by the emission direction acquiring unit 170 from among a plurality of pieces of temperature correction information stored in the storage device 12.

For example, in this case, the temperature correction information acquiring unit 184e may acquire temperature correction information corresponding to filter temperature information acquired by the filter temperature acquiring unit 110 and emission direction information indicating an emission direction closest to the emission direction indicated by the emission direction information acquired by the emission direction acquiring unit 170 from among the plurality of pieces of temperature correction information stored in the storage device 12.

Alternatively, for example, in this case, the temperature correction information acquiring unit 184e may acquire the temperature correction information by acquiring two pieces of temperature correction information including temperature correction information corresponding to filter temperature information indicating a filter temperature closest to the filter temperature indicated by the filter temperature information acquired by the filter temperature acquiring unit 110 and the emission direction information acquired by the emission direction acquiring unit 170 and temperature correction information corresponding to filter temperature information indicating the filter temperature second closest to the filter temperature indicated by the filter temperature information acquired by the filter temperature acquiring unit 110 and the emission direction information acquired by the emission direction acquiring unit 170 from among the plurality of pieces of temperature correction information stored in the storage device 12 and obtaining a weighted average value of the correction coefficients indicated by the two pieces of temperature correction information.

Alternatively, for example, in this case, the temperature correction information acquiring unit 184e may acquire the temperature correction information by acquiring two pieces of temperature correction information including temperature correction information, which corresponds to the filter temperature information acquired by the filter temperature acquiring unit 110 and emission direction information indicating an emission direction closest to the emission direction indicated by the emission direction information acquired by the emission direction acquiring unit 170, and temperature correction information, which corresponds to the filter temperature information acquired by the filter temperature acquiring unit 110 and emission direction information indicating an emission direction second closest to the emission direction indicated by the emission direction information acquired by the emission direction acquiring unit 170, from among the plurality of pieces of temperature correction information stored in the storage device 12 and obtaining a weighted average value of the correction coefficients indicated by the two pieces of temperature correction information.

Alternatively, for example, in this case, the temperature correction information acquiring unit 184e may cause the mode selecting unit 190 to select the temperature correction information generating mode as the operation mode and cause the temperature correction information generating unit 183e to generate temperature correction information at the filter temperature indicated by the filter temperature information acquired by the filter temperature acquiring unit 110 and the emission direction information acquired by the emission direction acquiring unit 170.

In a case where the mode selecting unit 190 has selected the laser wavelength controlling mode as the operation mode, the transmission wavelength acquiring unit 130e acquires the transmission wavelength of the background light cut filter 230 on the basis of the filter temperature information acquired by the filter temperature acquiring unit 110, the incident angle of the reflected laser light estimated by the angle estimating unit 171, the filter temperature characteristic information acquired by the filter characteristic acquiring unit 120d, and the temperature correction information acquired by the temperature correction information acquiring unit 184e.

Specifically, for example, where the filter temperature indicated by the filter temperature information acquired by the filter temperature acquiring unit 110 is denoted as $T_{F0}$, the transmission wavelength acquiring unit 130e acquires the transmission wavelength of the background light cut filter 230 using the following Equation (8).

$$\lambda''_{TF0 \cdot \theta Fo} = (a_F \times T_{F0} + a_{F\theta} \times \theta_{F0} + b_F) + K_{TF0 \cdot \theta Fo} \qquad \text{Equation (8)}$$

Here, $\lambda''_{TF0 \cdot \theta F0}$ represents the transmission wavelength of the background light cut filter 230 acquired by the transmission wavelength acquiring unit 130e in a case where the filter temperature is $T_{F0}$ and the incident angle is $\theta_{F0}$.

In a case where the mode selecting unit 190 has selected the laser wavelength controlling mode as the operation mode, the control signal generating unit 140d generates a control signal for causing the lidar device 200e to emit laser emission light having a wavelength corresponding to the transmission wavelength acquired by the transmission wavelength acquiring unit 130e. The control signal generating unit 140d outputs the control signal that has been generated to the lidar device 200e.

The control signal acquiring unit 290 in the lidar device 200e acquires the control signal output from the control signal generating unit 140d.

Note that the functions of the filter temperature acquiring unit 110, the filter characteristic acquiring unit 120d, the transmission wavelength acquiring unit 130e, the emission direction acquiring unit 170, the angle estimating unit 171, the reference signal extracting unit 180, the trigger signal receiving unit 181, the laser wavelength determining unit 182, the temperature correction information generating unit 183e, the temperature correction information acquiring unit 184e, the mode selecting unit 190, and the control signal generating unit 140d in the lidar control device 100e according to the sixth embodiment may be implemented by the processor 401 and the memory 402 or may be implemented by the processing circuit 403 in the hardware configurations exemplified in FIGS. 4A and 4B in the first embodiment.

The operation of the lidar control device 100e according to the sixth embodiment will be described with reference to FIGS. 27A and 27B.

Figure 27A:
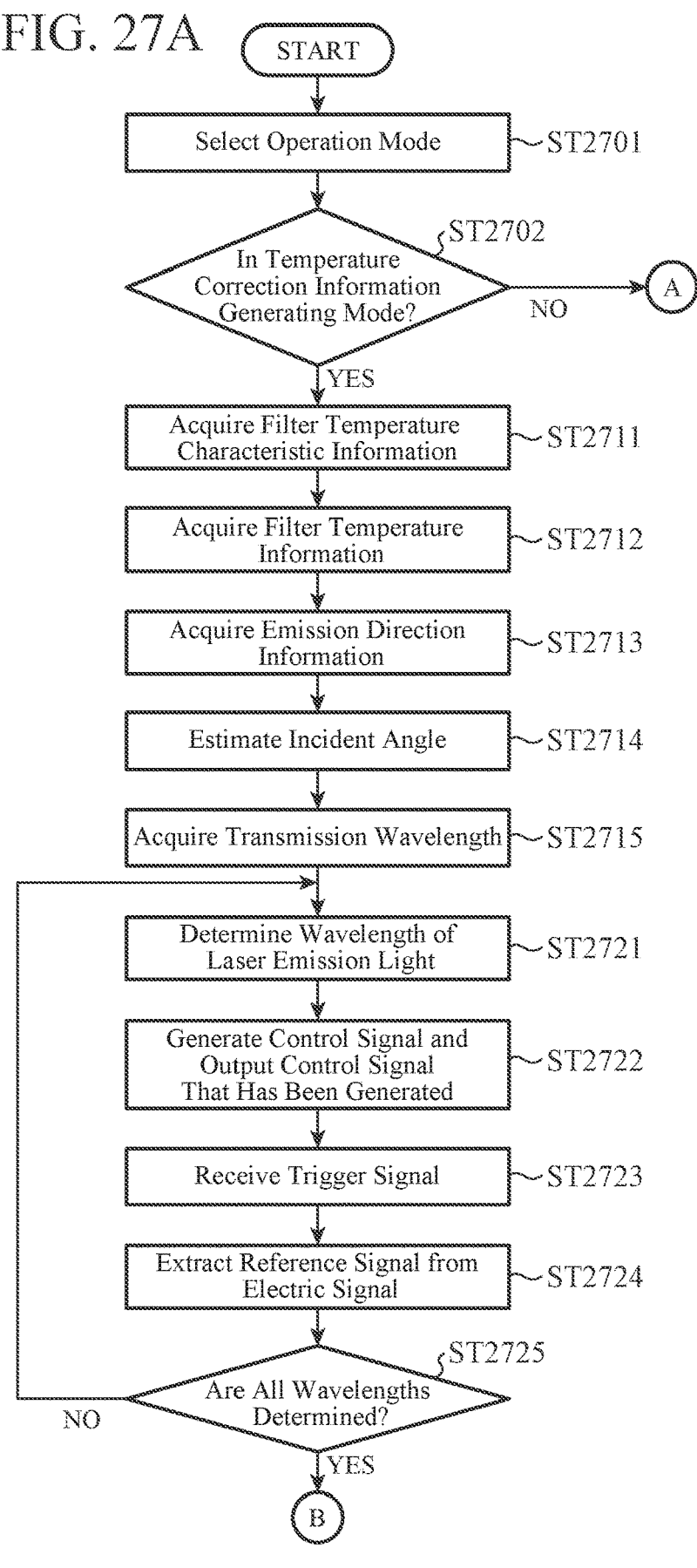
FIG. 27A is a part of a flowchart illustrating an example of processes of the lidar control device according to the sixth embodiment.
Figure 27B:
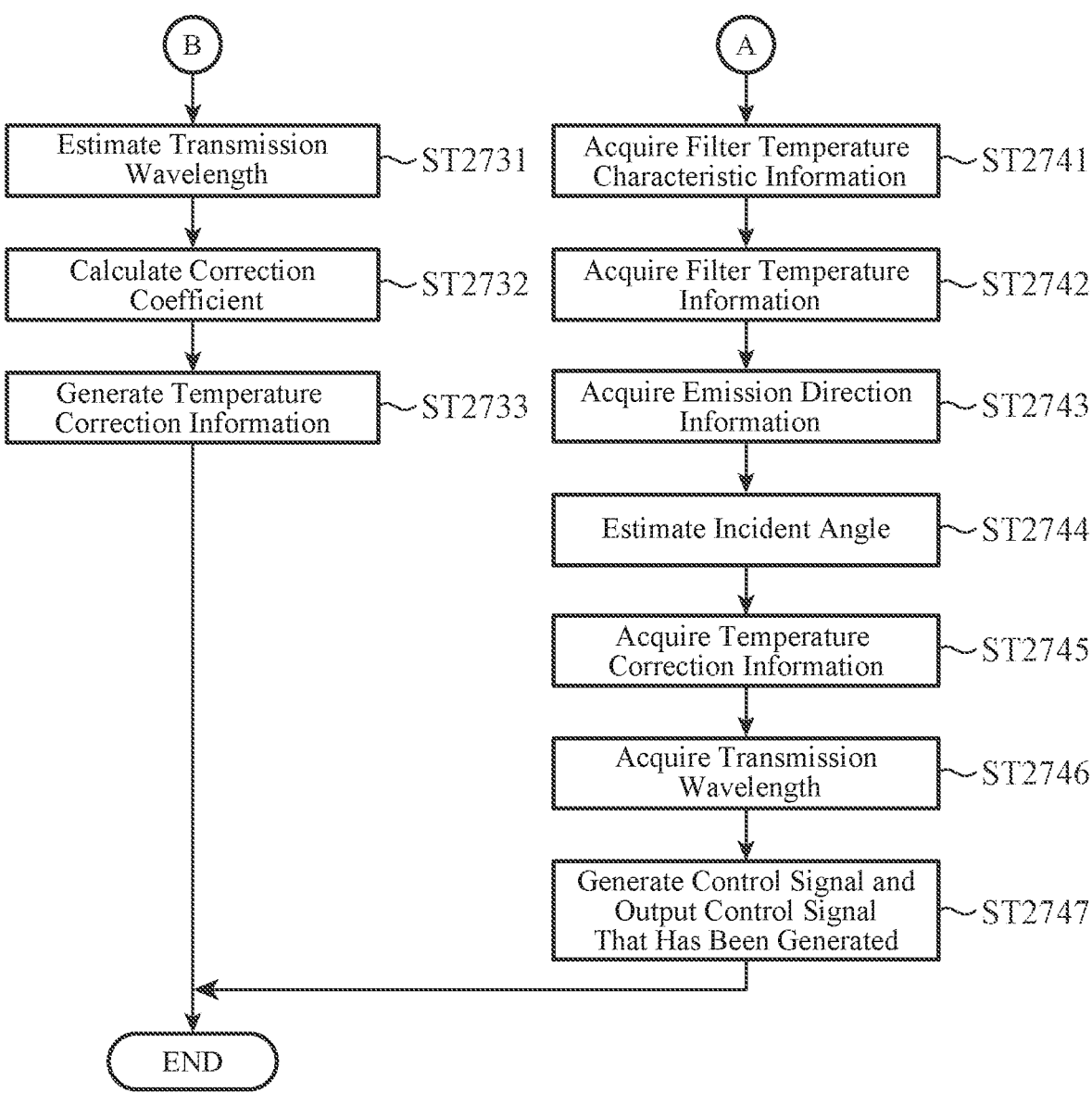
FIG. 27B is a remaining part of the flowchart illustrating an example of the processes of the lidar control device according to the sixth embodiment.

FIGS. 27A and 27B are flowcharts illustrating an example of processing of the lidar control device 100e according to the sixth embodiment. The lidar control device 100e repeatedly executes, for example, processes of the flowchart.

Note that the description is given on the assumption that, in the flowchart, the lidar control device 100e according to the sixth embodiment operates in either the temperature correction information generating mode or the laser wavelength controlling mode.

First, in step ST2701, the mode selecting unit 190 selects an operation mode.

In step ST2702, the lidar control device 100e checks whether or not the operation mode selected by the mode selecting unit 190 is the temperature correction information generating mode and executes a process of step ST2711 if the operation mode is the temperature correction information generating mode or executes a process of step ST2741 if the operation mode is not the temperature correction information generating mode, that is, if the operation mode is the laser wavelength controlling mode.

In a case where the operation mode is the temperature correction information generating mode, the filter characteristic acquiring unit 120d acquires filter temperature characteristic information in step ST2711.

After step ST2711, in step ST2712, the filter temperature acquiring unit 110 acquires filter temperature information.

After step ST2712, in step ST2713, the emission direction acquiring unit 170 acquires emission direction information.

After step ST2713, in step ST2714, the angle estimating unit 171 estimates the incident angle.

After step ST2714, in step ST2715, the transmission wavelength acquiring unit 130e acquires the transmission wavelength.

After step ST2715, in step ST2721, the laser wavelength determining unit 182 determines the wavelength of the laser emission light to be emitted from the lidar device 200e.

After step ST2721, in step ST2722, the control signal generating unit 140d generates a control signal for causing the lidar device 200e to emit laser emission light having the wavelength determined by the laser wavelength determining unit 182 and outputs the generated control signal to the lidar device 200e.

After step ST2722, in step ST2723, the trigger signal receiving unit 181 receives a trigger signal.

After step ST2723, in step ST2724, the reference signal extracting unit 180 receives an electric signal output from the lidar device 200e and extracts the reference signal from the electric signal.

After step ST2724, in step ST2725, the laser wavelength determining unit 182 determines whether or not all wavelengths to be determined by the laser wavelength determining unit 182 have been determined.

In step ST2725, the lidar control device 100e repeatedly executes the processes from steps ST2721 to ST2725 until the laser wavelength determining unit 182 determines that all the wavelengths to be determined have been determined.

If it is determined in step ST2725 that all the wavelengths to be determined by the laser wavelength determining unit 182 have been determined, the transmission wavelength estimating unit 1831 in the temperature correction information generating unit 183e estimates the transmission wavelength of the background light cut filter 230 in step ST2731.

After step ST2731, in step ST2732, the correction coefficient calculating unit 1832e in the temperature correction information generating unit 183e calculates the correction coefficient of the transmission wavelength of the background light cut filter 230.

After step ST2732, in step ST2733, the correction information outputting unit 1833e in the temperature correction information generating unit 183e generates temperature correction information in which the correction coefficient calculated by the correction coefficient calculating unit 1832e is associated with the filter temperature information acquired by the filter temperature acquiring unit 110 in step ST2712 and the emission direction information acquired by the emission direction acquiring unit 170 in step ST2713.

After step ST2733, the lidar control device 100e ends the processes of the flowchart. After finishing the processes of the flowchart, the lidar control device 100e returns to step ST2701 and repeatedly executes the processes of the flowchart.

Note that the lidar control device 100e may omit the process of step ST2711 when the lidar control device 100e repeatedly executes the process of step ST2711 in the flowchart for a second time and thereafter.

In addition, it is presumed that the filter temperature does not change from the end of execution of the process of step ST2712 to the start of execution of the process of step ST2731.

Meanwhile, the process of step ST2715 is only required to be executed before the process of step ST2732.

Meanwhile, the processes from step ST2711 to step ST2714 are only required to be executed before the process of step ST2715.

In addition, the processes of steps ST2711 to ST2714 may be in any order as long as the process of step ST2713 is executed before the process of step ST2714.

In a case where the operation mode is the laser wavelength controlling mode, the filter characteristic acquiring unit 120d acquires filter temperature characteristic information in step ST2741.

After step ST2741, in step ST2742, the filter temperature acquiring unit 110 acquires filter temperature information.

After step ST2742, in step ST2743, the emission direction acquiring unit 170 acquires emission direction information.

After step ST2743, in step ST2744, the angle estimating unit 171 estimates the incident angle.

After step ST2744, in step ST2745, the temperature correction information acquiring unit 184e acquires temperature correction information corresponding to the filter temperature information acquired by the filter temperature acquiring unit 110 and the emission direction information acquired by the emission direction acquiring unit 170.

After step ST2745, in step ST2746, the transmission wavelength acquiring unit 130e acquires the transmission wavelength of the background light cut filter 230 on the basis of the filter temperature information acquired by the filter temperature acquiring unit 110, the incident angle estimated by the angle estimating unit 171, the filter temperature characteristic information acquired by the filter characteristic acquiring unit 120d, and the temperature correction information acquired by the temperature correction information acquiring unit 184e.

After step ST2746, in step ST2747, the control signal generating unit 140d generates a control signal for causing the lidar device 200e to emit laser emission light having a wavelength corresponding to the transmission wavelength acquired by the transmission wavelength acquiring unit 130e and outputs the control signal that has been generated to the lidar device 200e.

After step ST2747, the lidar control device 100e ends the processes of the flowchart. After finishing the processes of the flowchart, the lidar control device 100e returns to step ST2701 and repeatedly executes the processes of the flowchart.

Note that the lidar control device 100e may omit the process of step ST2741 when the lidar control device 100e repeatedly executes the process of step ST2741 in the flowchart for a second time and thereafter.

In addition, the processes of steps ST2741 to ST2744 may be in any order as long as the process of step ST2743 is executed before the process of step ST2744.

As described above, the lidar control device 100e according to the sixth embodiment controls the lidar device 200e including the background light cut filter 230 that allows transmission of reflected laser light and suppresses transmission of background light out of the reflected laser light that is reflected light of laser emission light reflected by an object to be measured and the background light incident on the lidar device 200e, the lidar control device 100e including: the filter temperature acquiring unit 110 to acquire filter temperature information indicating the filter temperature of the background light cut filter 230 included in the lidar device 200e; the filter characteristic acquiring unit 120d to acquire filter temperature characteristic information indicating the filter temperature characteristic of the background light cut filter 230; the transmission wavelength acquiring unit 130e to acquire the transmission wavelength of the background light cut filter 230 on the basis of the filter temperature information acquired by the filter temperature acquiring unit 110 and the filter temperature characteristic information acquired by the filter characteristic acquiring unit 120d; and the control signal generating unit 140d to generate a control signal for causing the lidar device 200e to emit the laser emission light having a wavelength corresponding to the transmission wavelength acquired by the transmission wavelength acquiring unit 130e.

In particular, in addition to the above configuration, the lidar control device 100e according to the sixth embodiment includes: the reference signal extracting unit 180 to receive an electric signal output from the light receiving unit 240d included in the lidar device 200e, which receives reflected laser light transmitted through the background light cut filter 230 and outputs the electric signal based on the reflected laser light that has been received, and to extract, as a reference signal, an electric signal based on laser reference light obtained by dividing, by the dividing unit 280 included in the lidar device 200e, laser output light output from the laser light outputting unit 210 included in the lidar device 200e and obtaining a part of the laser output light in the electric signal; the laser wavelength determining unit 182 to determine a wavelength of laser emission light to be emitted from the lidar device 200e so that laser emission light having a different wavelength is emitted from the lidar device 200e every time the reference signal extracting unit 180 extracts a reference signal; the temperature correction information generating unit 183e to estimate the transmission wavelength of the background light cut filter 230 on the basis of signal intensities of a plurality of reference signals extracted by the reference signal extracting unit 180, to calculate a correction coefficient of the transmission wavelength of the background light cut filter 230 on the basis of the transmission wavelength that has been estimated and the transmission wavelength acquired by the transmission wavelength acquiring unit 130e, and to generate temperature correction information in which the correction coefficient that has been calculated is associated with filter temperature information acquired by the filter temperature acquiring unit 110; the temperature correction information acquiring unit 184e to acquire temperature correction information corresponding to the filter temperature information acquired by the filter temperature acquiring unit 110 from among a plurality of pieces of temperature correction information having been generated in advance by the temperature correction information generating unit 183e; the mode selecting unit 190 to select one operation mode from among at least two operation modes including the temperature correction information generating mode in which temperature correction information is generated and the laser wavelength controlling mode for performing control for causing the lidar device 200e to emit laser emission light having a wavelength corresponding to the transmission wavelength acquired by the transmission wavelength acquiring unit 130e; the emission direction acquiring unit 170 to acquire the emission direction information indicating a direction in which the lidar device 200e emits the laser emission light; and the angle estimating unit 171 to estimate the incident angle at which the reflected laser light is incident on the background light cut filter 230 on the basis of the emission direction information acquired by the emission direction acquiring unit 170.

Furthermore, in the lidar control device 100e according to the sixth embodiment in the above configuration, the filter characteristic acquiring unit 120d acquires the filter temperature characteristic information indicating the incident angle characteristic of the background light cut filter 230 and the filter temperature characteristic of the background light cut filter 230, the temperature correction information generating unit 183e estimates the transmission wavelength of the background light cut filter 230 on the basis of the signal intensities of a plurality of reference signals extracted by the reference signal extracting unit 180, calculates the correction coefficient of the transmission wavelength of the background light cut filter 230 on the basis of the transmission wavelength that has been estimated and the transmission wavelength acquired by the transmission wavelength acquiring unit 130e, and generates temperature correction information in which the correction coefficient that has been calculated is associated with the filter temperature information acquired by the filter temperature acquiring unit 110 and the emission direction information acquired by the emission direction acquiring unit 170, and, the temperature correction information acquiring unit 184e, on the basis of the filter temperature information acquired by the filter temperature acquiring unit 110 and the emission direction information acquired by the emission direction acquiring unit 170, acquires temperature correction information corresponding to the filter temperature information and the emission direction information from among the plurality of pieces of temperature correction information having been generated in advance by the temperature correction information generating unit 183e.

Furthermore, in the lidar control device 100e according to the sixth embodiment in the above configuration, in a case where the mode selecting unit 190 has selected the temperature correction information generating mode, the transmission wavelength acquiring unit 130e acquires the transmission wavelength of the background light cut filter 230 on the basis of the filter temperature information acquired by the filter temperature acquiring unit 110, the incident angle of the reflected laser light estimated by the angle estimating unit 171, and the filter temperature characteristic information acquired by the filter characteristic acquiring unit 120d, the control signal generating unit 140d generates the control signal for causing the lidar device 200e to emit the laser emission light having the wavelength determined by the laser wavelength determining unit 182 and, in a case where the mode selecting unit 190 has selected the laser wavelength controlling mode, the transmission wavelength acquiring unit 130e acquires the transmission wavelength of the background light cut filter 230 on the basis of the filter temperature information acquired by the filter temperature acquiring unit 110, the incident angle of the reflected laser light estimated by the angle estimating unit 171, the filter temperature characteristic information acquired by the filter characteristic acquiring unit 120d, and the temperature correction information acquired by the temperature correction information acquiring unit 184e, and the control signal generating unit 140d generates the control signal for causing the lidar device 200e to emit laser emission light having a wavelength corresponding to the transmission wavelength acquired by the transmission wavelength acquiring unit 130e.

With this configuration, the lidar control device 100e can control the lidar device 200e so that the background light cut filter 230 does not suppress transmission of the reflected laser light incident on the background light cut filter 230 even in a case where the background light cut filter 230 included in the lidar device 200e in which the emission direction of the laser emission light emitted from the lidar device 200e fluctuates with time, has a filter temperature characteristic and the filter temperature of the background light cut filter 230 fluctuates in a case where the background light cut filter 230 included in the lidar device 200e suppresses transmission of the reflected laser light incident on the background light cut filter 230 due to the influence of an error in the assembly or the like in the lidar device 200e.

Furthermore, as described above, the lidar device 200e according to the sixth embodiment includes: the background light cut filter 230; the laser light outputting unit 210 to output the laser output light based on the laser light source light output from the laser light source 211; and the light receiving unit 240d to receive the reflected laser light transmitted through the background light cut filter 230 and to output an electric signal based on the reflected laser light that has been received. The lidar device 200e further includes: the filter temperature measuring unit 250 to measure the filter temperature of the background light cut filter 230 and to output the filter temperature that has been measured to the lidar control device 100e as the filter temperature information indicating the filter temperature; and the wavelength adjusting unit 212 to receive the control signal generated and output by the lidar control device 100e on the basis of the filter temperature information output by the filter temperature measuring unit 250 and to adjust the wavelength of the laser emission light emitted on the basis of the control signal.

In particular, the lidar device 200e according to the sixth embodiment includes, in addition to the above configuration, the scanning optical system 224 to change the emission direction of the laser emission light and the emission direction outputting unit 261 to output the emission direction information indicating the emission direction having been changed by the scanning optical system 224 to the lidar control device 100e, and the wavelength adjusting unit 212 receives the control signal generated and output by the lidar control device 100e on the basis of the filter temperature information output by the filter temperature measuring unit 250 and the emission direction information output by the emission direction outputting unit 261 and adjusts the wavelength of the laser emission light to be emitted on the basis of the control signal.

With such a configuration, in the lidar device 200e, when the background light cut filter 230 included in the lidar device 200e suppresses the transmission of the reflected laser light incident on the background light cut filter 230 due to the influence of the assembly error or the like in the lidar device 200e, even when the background light cut filter 230 included in the lidar device 200e in which the emission direction of the laser emission light emitted from the lidar device 200e fluctuates with time has the filter temperature characteristic and the filter temperature of the background light cut filter 230 fluctuates, the background light cut filter 230 can prevent the transmission of the reflected laser light incident on the background light cut filter 230.

In particular, in addition to the above configuration, the lidar device 200e according to the sixth embodiment includes the dividing unit 280 that divides the laser output light output from the laser light outputting unit 210 and obtains a part of the laser output light as the laser reference light, the background light cut filter 230 receives the reflected laser light and the laser reference light, and the light receiving unit 240d receives the reflected laser light and the laser reference light transmitted through the background light cut filter 230, converts the received reflected laser light and the laser reference light into an electric signal, and outputs the electric signal to the lidar control device 100e.

With this configuration, in the lidar device 200e, the background light cut filter 230 receives the laser reference light, and the light receiving unit 240d receives the laser reference light transmitted through the background light cut filter 230. Therefore, the lidar control device 100e can accurately estimate the transmission wavelength of the background light cut filter 230 based on the reference signal based on the laser reference light.

Note that the lidar control device 100e can also be applied to a case where the filter temperature of the background light cut filter 230 included in the lidar device 200e according to the sixth embodiment is maintained at a predetermined desired temperature or a case where the background light cut filter 230 has no filter temperature characteristic.

In the above cases, the lidar control device 100e does not necessarily need to include the filter temperature acquiring unit 110 nor the filter characteristic acquiring unit 120d. In addition, in the above cases, the lidar device 200e does not necessarily need to include the filter temperature measuring unit 250.

In this case, for example, the lidar control device 100e includes, instead of the filter characteristic acquiring unit 120d, an incident angle characteristic acquiring unit (not illustrated) that acquires incident angle characteristic information indicating the incident angle characteristic of the background light cut filter 230 when the background light cut filter 230 is at a predetermined filter temperature from the storage device 12 or the like.

In this case, for example in a case where the mode selecting unit 190 has selected the temperature correction information generating mode as the operation mode, the transmission wavelength acquiring unit 130e acquires the transmission wavelength of the background light cut filter 230 on the basis of the incident angle of the reflected laser light estimated by the angle estimating unit 171 and the incident angle characteristic information acquired by the incident angle characteristic acquiring unit.

Moreover, in this case, for example, the temperature correction information generating unit 183e generates the temperature correction information in which the correction coefficient calculated by the temperature correction information generating unit 183e is associated with the emission direction information acquired by the emission direction acquiring unit 170.

Furthermore, in this case, for example, the temperature correction information acquiring unit 184e acquires temperature correction information corresponding to the emission direction information acquired by the emission direction acquiring unit 170 from among a plurality of pieces of temperature correction information having been generated in advance by the temperature correction information generating unit 183e.

In addition, this case, for example in a case where the mode selecting unit 190 has selected the laser wavelength controlling mode as the operation mode, the transmission wavelength acquiring unit 130e acquires the transmission wavelength of the background light cut filter 230 on the basis of the incident angle of the reflected laser light estimated by the angle estimating unit 171, the incident angle characteristic information acquired by the incident angle characteristic acquiring unit, and the temperature correction information acquired by the temperature correction information acquiring unit 184e.

With such a configuration, the lidar control device 100e can control the lidar device 200e so that the background light cut filter 230 does not suppress the transmission of the reflected laser light incident on the background light cut filter 230 even when the background light cut filter 230 included in the lidar device 200e in which the emission direction of the laser emission light emitted from the lidar device 200e fluctuates with time has the incident angle characteristic and the incident angle of the reflected laser light incident on the background light cut filter 230 fluctuates in a case where the background light cut filter 230 included in the lidar device 200e suppresses the transmission of the reflected laser light incident on the background light cut filter 230 due to the influence of the assembly error or the like in the lidar device 200e.

Note that, in the lidar devices 200, 200a, 200b, and 200c according to the first, second, third, and fourth embodiments, respectively, the light receiving unit 240 may receive the reflected laser light and the laser reference light transmitted through the background light cut filter 230, convert the reflected laser light and the laser reference light that have been received into an electric signal, and output the electric signal obtained by the conversion. For example, in order for the light receiving units 240 of the lidar devices 200, 200a, 200b, and 200c to receive the reflected laser light and the laser reference light transmitted through the background light cut filter 230, the lidar devices 200, 200a, 200b, and 200c each include, for example, the dividing unit 280 and the multiplexing unit 281 included in the lidar devices 200d and 200e according to the fifth and sixth embodiments in addition to the configurations of the lidar devices 200, 200a, 200b, and 200c, respectively, and the light receiving units 240 in the lidar devices 200, 200a, 200b, and 200c are replaced with the light receiving unit 240d.

In addition, the distance calculating devices 11 and 11c according to the fifth and sixth embodiments, respectively, are not limited to those that receive the trigger signal output from the trigger signal outputting unit 223d in the lidar devices 200d and 200e, respectively, and the electric signal output from the light receiving unit 240d and measure the distance to the object by the ToF method on the basis of the trigger signal and the electric signal. For example, the distance calculating devices 11 and 11c according to the fifth and sixth embodiments may extract an electric signal corresponding to the laser reference light and an electric signal corresponding to the reflected laser light from the electric signal output from the light receiving unit 240d, calculate a period between the time when the laser reference light has arrived and the time when the reflected laser light has arrived, and measure the distance to the object by the ToF method on the basis of the period that has been calculated.

Note that the present invention may include a flexible combination of the embodiments, a modification of any component of the embodiments, or an omission of any component in the embodiments within the scope of the present invention.

INDUSTRIAL APPLICABILITY

A lidar control device of the present invention can be applied to a lidar system or a lidar device that measures a distance to an object.

REFERENCE SIGNS LIST

10, 10a, 10b, 10c, 10d, 10e: lidar system, 11, 11c: distance calculating device, 12: storage device, 100, 100a, 100b, 100c, 100d, 100e: lidar control device, 110: filter temperature acquiring unit, 120, 120c, 120d: filter characteristic acquiring unit, 130, 130c, 130d, 130e: transmission wavelength acquiring unit, 140, 140a, 140b, 140d: control signal generating unit, 150: light source characteristic acquiring unit, 160: light source temperature acquiring unit, 170: emission direction acquiring unit, 171: angle estimating unit, 180: reference signal extracting unit, 181: trigger signal receiving unit, 182: laser wavelength determining unit, 183, 183e: temperature correction information generating unit, 184, 184e: temperature correction information acquiring unit, 190: mode selecting unit, 200, 200a, 200b, 200c, 200d, 200e: lidar device, 210, 210a, 210b: laser light outputting unit, 211: laser light source, 212, 212a, 212b: wavelength adjusting unit, 220: transmission optical system, 221: window, 222: reception optical system, 223, 223d: trigger signal outputting unit, 224: scanning optical system, 230: background light cut filter, 240, 240d: light receiving unit, 250: filter temperature measuring unit, 251, 251b: light source temperature measuring unit, 260: emission direction calculating unit, 261: emission direction outputting unit, 280: dividing unit, 281: multiplexing unit, 290: control signal acquiring unit, 401: processor, 402: memory, 403: processing circuit, 1831: transmission wavelength estimating unit, 1832, 1832e: correction coefficient calculating unit, 1833, 1833e: correction information outputting unit

The invention claimed is:

1. A lidar control device to control a lidar device, the lidar device comprising a background light cut filter that allows transmission of reflected laser light and suppresses transmission of background light out of the reflected laser light that is reflected light of laser emission light reflected by an object to be measured and the background light incident on the lidar device, the lidar control device comprising:

a filter temperature acquirer to acquire filter temperature information indicating a filter temperature of the background light cut filter comprised in the lidar device;

a filter characteristic acquirer to acquire filter temperature characteristic information indicating a filter temperature characteristic of the background light cut filter;

a transmission wavelength acquirer to acquire a transmission wavelength of the background light cut filter on the basis of the filter temperature information acquired by the filter temperature acquirer and the filter temperature characteristic information acquired by the filter characteristic acquirer;

a control signal generator to generate a control signal for directly causing the lidar device to emit the laser emission light having a wavelength corresponding to the transmission wavelength acquired by the transmission wavelength acquirer;

an emission direction acquirer to acquire emission direction information indicating an emission direction in which the lidar device emits the laser emission light; and an angle estimator to estimate an incident angle at which the reflected laser light is incident on the background light cut filter on the basis of the emission direction information acquired by the emission direction acquirer, wherein the filter characteristic acquirer acquires the filter temperature characteristic information indicating an incident angle characteristic of the background light cut filter and the filter temperature characteristic of the background light cut filter, and the transmission wavelength acquirer acquires the transmission wavelength of the background light cut filter on the basis of the filter temperature information acquired by the filter temperature acquirer, the incident angle of the reflected laser light estimated by the angle estimator, and the filter temperature characteristic information acquired by the filter characteristic acquirer.

2. The lidar control device according to claim 1, further comprising:

a light source characteristic acquirer to acquire light source temperature characteristic information indicating a light source temperature characteristic of a laser light source of a laser light outputter comprised in the lidar device, wherein the control signal generator generates the control signal for causing the lidar device to emit the laser emission light having a wavelength corresponding to the transmission wavelength acquired by the transmission wavelength acquirer on the basis of the light source temperature characteristic information acquired by the light source characteristic acquirer and the transmission wavelength acquired by the transmission wavelength acquirer.

3. The lidar control device according to claim 2, further comprising:

a light source temperature acquirer to acquire light source temperature information indicating a light source temperature of the laser light source, wherein the control signal generator generates the control signal for causing the lidar device to emit the laser emission light having a wavelength corresponding to the transmission wavelength acquired by the transmission wavelength acquirer on the basis of the light source temperature information acquired by the light source temperature acquirer, the light source temperature characteristic information acquired by the light source characteristic acquirer, and the transmission wavelength acquired by the transmission wavelength acquirer.

4. A lidar control device to control a lidar device, the lidar device comprising a background light cut filter that allows transmission of reflected laser light and suppresses transmission of background light out of the reflected laser light that is reflected light of laser emission light reflected by an object to be measured and the background light incident on the lidar device, the lidar control device comprising:

a filter temperature acquirer to acquire filter temperature information indicating a filter temperature of the background light cut filter comprised in the lidar device;

a filter characteristic acquirer to acquire filter temperature characteristic information indicating a filter temperature characteristic of the background light cut filter;

a transmission wavelength acquirer to acquire a transmission wavelength of the background light cut filter on the basis of the filter temperature information acquired by the filter temperature acquirer and the filter temperature characteristic information acquired by the filter characteristic acquirer;

a control signal generator to generate a control signal for directly causing the lidar device to emit the laser emission light having a wavelength corresponding to the transmission wavelength acquired by the transmission wavelength acquirer;

a reference signal extractor to receive an electric signal output from a light receiver comprised in the lidar device, which receives the reflected laser light transmitted through the background light cut filter and outputs the electric signal based on the reflected laser light that has been received, and to extract, as a reference signal, the electric signal based on laser reference light obtained by dividing, by the divider comprised in the lidar device, laser output light output from the laser light outputter comprised in the lidar device and obtaining a part of the laser output light in the electric signal;

a laser wavelength determiner to determine a wavelength of the laser emission light to be emitted from the lidar device so that the laser emission light having a different wavelength is emitted from the lidar device every time the reference signal extractor extracts the reference signal;

a temperature correction information generator to estimate the transmission wavelength of the background light cut filter on the basis of signal intensities of a plurality of the reference signals extracted by the reference signal extractor, to calculate a correction coefficient of the transmission wavelength of the background light cut filter on the basis of the transmission wavelength that has been estimated and the transmission wavelength acquired by the transmission wavelength acquirer, and to generate temperature correction information in which the correction coefficient that has been calculated is associated with the filter temperature information acquired by the filter temperature acquirer;

a temperature correction information acquirer to acquire the temperature correction information corresponding to the filter temperature information acquired by the filter temperature acquirer from among a plurality of pieces of the temperature correction information having been generated in advance by the temperature correction information generator; and a mode selecter to select one operation mode from among at least two operation modes including a temperature correction information generating mode in which the temperature correction information is generated and a laser wavelength controlling mode for performing control for causing the lidar device to emit the laser emission light having a wavelength corresponding to the transmission wavelength acquired by the transmission wavelength acquirer, wherein, in a case where the mode selecter has selected the temperature correction information generating mode, the control signal generator generates the control signal for causing the lidar device to emit the laser emission light having the wavelength determined by the laser wavelength determiner, in a case where the mode selecter has selected the laser wavelength controlling mode, the transmission wavelength acquirer acquires the transmission wavelength of the background light cut filter on the basis of the filter temperature information acquired by the filter temperature acquirer, the filter temperature characteristic information acquired by the filter characteristic acquirer, and the temperature correction information acquired by the temperature correction information acquirer, and the control signal generator generates the control signal for causing the lidar device to emit the laser emission light having a wavelength corresponding to the transmission wavelength acquired by the transmission wavelength acquirer.

5. The lidar control device according to claim 4, further comprising:

a light source characteristic acquirer to acquire light source temperature characteristic information indicating a light source temperature characteristic of a laser light source of the laser light outputter comprised in the lidar device, wherein, in a case where the mode selecter has selected the laser wavelength controlling mode, the control signal generator generates the control signal for causing the lidar device to emit the laser emission light having a wavelength corresponding to the transmission wavelength acquired by the transmission wavelength acquirer on the basis of the light source temperature characteristic information acquired by the light source characteristic acquirer and the transmission wavelength acquired by the transmission wavelength acquirer.

6. The lidar control device according to claim 5, further comprising:

a light source temperature acquirer to acquire light source temperature information indicating a light source temperature of the laser light source, wherein, in a case where the mode selecter has selected the laser wavelength controlling mode, the control signal generator generates the control signal for causing the lidar device to emit the laser emission light having a wavelength corresponding to the transmission wavelength acquired by the transmission wavelength acquirer on the basis of the light source temperature information acquired by the light source temperature acquirer, the light source temperature characteristic information acquired by the light source characteristic acquirer, and the transmission wavelength acquired by the transmission wavelength acquirer.

7. The lidar control device according to claim 5, further comprising:

an emission direction acquirer to acquire emission direction information indicating an emission direction of the laser emission light by the lidar device; and an angle estimator to estimate an incident angle at which the reflected laser light is incident on the background light cut filter on the basis of the emission direction information acquired by the emission direction acquirer, wherein the filter characteristic acquirer acquires the filter temperature characteristic information indicating an incident angle characteristic of the background light cut filter and the filter temperature characteristic of the background light cut filter, the temperature correction information generator estimates the transmission wavelength of the background light cut filter on the basis of the signal intensities of the plurality of the reference signals extracted by the reference signal extractor, calculates the correction coefficient of the transmission wavelength of the background light cut filter on the basis of the transmission wavelength that has been estimated and the transmission wavelength acquired by the transmission wavelength acquirer, and generates the temperature correction information in which the correction coefficient that has been calculated is associated with the filter temperature information acquired by the filter temperature acquirer and the emission direction information acquired by the emission direction acquirer, the temperature correction information acquirer acquires the temperature correction information corresponding to the filter temperature information and the emission direction information from among a plurality of pieces of the temperature correction information having been generated in advance by the temperature correction information generator on the basis of the filter temperature information acquired by the filter temperature acquirer and the emission direction information acquired by the emission direction acquirer, in a case where the mode selecter has selected the temperature correction information generating mode, the transmission wavelength acquirer acquires the transmission wavelength of the background light cut filter on the basis of the filter temperature information acquired by the filter temperature acquirer, the incident angle of the reflected laser light estimated by the angle estimator, and the filter temperature characteristic information acquired by the filter characteristic acquirer, and the control signal generator generates the control signal for causing the lidar device to emit the laser emission light having the wavelength determined by the laser wavelength determiner, and in a case where the mode selecter has selected the laser wavelength controlling mode, the transmission wavelength acquirer acquires the transmission wavelength of the background light cut filter on the basis of the filter temperature information acquired by the filter temperature acquirer, the incident angle of the reflected laser light estimated by the angle estimator, the filter temperature characteristic information acquired by the filter characteristic acquirer, and the temperature correction information acquired by the temperature correction information acquirer, and the control signal generator generates the control signal for causing the lidar device to emit the laser emission light having a wavelength corresponding to the transmission wavelength acquired by the transmission wavelength acquirer.

8. A lidar device comprising:

a background light cut filter;

a laser light outputter to output laser output light based on a laser light source light output from a laser light source; and a light receiver to receive reflected laser light transmitted through the background light cut filter and to output an electric signal based on the reflected laser light that has been received, wherein the lidar device further comprises: a filter temperature measurer to measure a filter temperature of the background light cut filter and to output the filter temperature that has been measured to the lidar control device as filter temperature information;

a wavelength adjuster to receive a control signal generated and output by the lidar control device on the basis of the filter temperature information output by the filter temperature measurer and to directly adjust a wavelength of laser emission light emitted on the basis of the control signal;

a scanning optical system to change the emission direction of the laser emission light output from the laser light outputter; and an emission direction outputter to output emission direction information indicating the emission direction having been changed by the scanning optical system to the lidar control device, wherein the wavelength adjuster receives the control signal generated and output by the lidar control device on the basis of the filter temperature information output by the filter temperature measurer and the emission direction information output by the emission direction outputter and adjusts the wavelength of the laser emission light to be emitted on the basis of the control signal.

9. The lidar device according claim 8, further comprising:

a light source temperature measurer to measure a light source temperature of the laser light source of the laser light outputter and to output the light source temperature that has been measured as light source temperature information, wherein the wavelength adjuster receives the control signal generated and output by the lidar control device on the basis of the filter temperature information output by the filter temperature measurer and adjusts a wavelength of the laser emission light to be emitted on the basis of the control signal and the light source temperature information output by the light source temperature measurer.

10. The lidar device according claim 8, further comprising:

a light source temperature measurer to measure a light source temperature of the laser light source of the laser light outputter and to output the light source temperature that has been measured as light source temperature information, wherein the light source temperature measurer outputs the light source temperature information to the lidar control device, and the wavelength adjuster receives the control signal generated and output by the lidar control device on the basis of the light source temperature information output by the light source temperature measurer and the filter temperature information output by the filter temperature measurer and adjusts the wavelength of the laser emission light to be emitted on the basis of the control signal.

11. A lidar device comprising:

a background light cut filter;

a laser light outputter to output laser output light based on a laser light source light output from a laser light source; and a light receiver to receive reflected laser light transmitted through the background light cut filter and to output an electric signal based on the reflected laser light that has been received, wherein the lidar device further comprises: a filter temperature measurer to measure a filter temperature of the background light cut filter and to output the filter temperature that has been measured to the lidar control device as filter temperature information;

a wavelength adjuster to receive a control signal generated and output by the lidar control device on the basis of the filter temperature information output by the filter temperature measurer and to directly adjust a wavelength of laser emission light emitted on the basis of the control signal;

a divider to divide the laser output light output by the laser light outputter and to obtain a part of the laser output light as laser reference light, wherein the background light cut filter receives the laser reference light and the reflected laser light that is reflected light of the laser emission light reflected by the object to be measured, and the light receiver receives the reflected laser light transmitted through the background light cut filter and the laser reference light transmitted through the background light cut filter, converts the reflected laser light and the laser reference light that have been received into the electric signal, and outputs the electric signal obtained from the conversion to the lidar control device.

12. A lidar control method to control a lidar device, the lidar device comprising a background light cut filter that allows transmission of reflected laser light and suppresses transmission of background light out of the reflected laser light that is reflected light of laser emission light reflected by an object to be measured and the background light incident on the lidar device, the lidar control method comprising:

acquiring filter temperature information indicating a filter temperature of the background light cut filter comprised in the lidar device;

acquiring filter temperature characteristic information indicating a filter temperature characteristic of the background light cut filter;

acquiring a transmission wavelength of the background light cut filter on the basis of the filter temperature acquired and the filter temperature characteristic information acquired;

generating a control signal for directly causing the lidar device to emit the laser emission light having a wavelength corresponding to the transmission wavelength acquired;

acquiring emission direction information indicating an emission direction in which the lidar device emits the laser emission light; and estimating an incident angle at which the reflected laser light is incident on the background light cut filter on the basis of the emission direction information acquired, wherein the method acquires the filter temperature characteristic information indicating an incident angle characteristic of the background light cut filter and the filter temperature characteristic of the background light cut filter, and the method acquires the transmission wavelength of the background light cut filter on the basis of the filter temperature information acquired, the incident angle of the reflected laser light estimated, and the filter temperature characteristic information acquired.

\* \* \* \* \*